(12) United States Patent
Kunishige et al.

(10) Patent No.: US 9,019,400 B2
(45) Date of Patent: Apr. 28, 2015

(54) IMAGING APPARATUS, IMAGING METHOD AND COMPUTER-READABLE STORAGE MEDIUM

(75) Inventors: Keiji Kunishige, Hachioji (JP); Manabu Ichikawa, Hachioji (JP)

(73) Assignee: Olympus Imaging Corp. (JP)

( * ) Notice: Subject to any disclaimer, the term of this patent is extended or adjusted under 35 U.S.C. 154(b) by 0 days.

(21) Appl. No.: 13/459,803

(22) Filed: Apr. 30, 2012

(65) Prior Publication Data

US 2012/0307103 A1 Dec. 6, 2012

(30) Foreign Application Priority Data

May 31, 2011 (JP) .................................. 2011-122657
Mar. 29, 2012 (JP) .................................. 2012-078247

(51) Int. Cl.
H04N 5/262 (2006.01)
H04N 5/76 (2006.01)
H04N 5/232 (2006.01)

(52) U.S. Cl.
CPC ....... *H04N 5/23245* (2013.01); *H04N 5/23293* (2013.01); *H04N 5/2621* (2013.01)

(58) Field of Classification Search
USPC .......................................................... 348/239
See application file for complete search history.

(56) References Cited

U.S. PATENT DOCUMENTS

2005/0264669 A1* 12/2005 Ota ........................... 348/333.12
2010/0238324 A1*  9/2010 Toyoda ........................ 348/239

FOREIGN PATENT DOCUMENTS

| CN | 1705363 | 12/2005 |
|---|---|---|
| CN | 101841651 A | 9/2010 |
| JP | 2002-142148 | 5/2002 |
| JP | 2003204510 A | 7/2003 |
| JP | 2004200950 A | 7/2004 |
| JP | 2005123849 A | 5/2005 |
| JP | 2005217483 A | 8/2005 |
| JP | 2010-062836 | 3/2010 |
| JP | 2010050599 A | 3/2010 |
| JP | 2010-074244 | 4/2010 |
| JP | 2010219905 A | 9/2010 |

OTHER PUBLICATIONS

Office Action mailed in counterpart Chinese Patent Application No. 201210174856.1 on Jun. 26, 2014, consisting of 8 pp.
Notice of Rejection mailed in counterpart Japanese Patent Application No. 2011-122657 on Dec. 24, 2014, consisting of 8 pp. (English Translation Provided).

* cited by examiner

*Primary Examiner* — Twyler Haskins
*Assistant Examiner* — Padma Haliyur
(74) *Attorney, Agent, or Firm* — Volpe and Koenig, P.C.

(57) ABSTRACT

An imaging apparatus that includes: an imaging unit that generates electronic image data; a display unit that displays an image; an image processor that produces a visual effect on the image data in combination with a plurality of image processes to generate processed image data; a release input unit that accepts an input of a release signal of instructing the imaging apparatus to execute shooting; an image process controller that executes the plural kinds of special effect processes on one piece of image data generated after the acceptance of the input of the release signal and to generate plural pieces of processed image data; and a display controller that controls the display unit to display, for a predetermined time, one of an image corresponding to the piece of image data and at least one processed image corresponding to at least a part of the plural pieces of processed image data.

20 Claims, 33 Drawing Sheets

FIG.3

|  | NAME | PROCESS TIME |
|---|---|---|
| FINISH EFFECT PROCESS | NATURAL | NORMAL |
| | VIVID | NORMAL |
| | FLAT | NORMAL |
| | MONOTONE | NORMAL |
| SPECIAL EFFECT PROCESS | POP ART | NORMAL |
| | FANTASTIC FOCUS | TWICE NORMAL |
| | TOY PHOTO | TWICE NORMAL |
| | DIORAMA | FOUR TIMES NORMAL |
| | ROUGH MONOCHROME | THREE TIMES NORMAL |

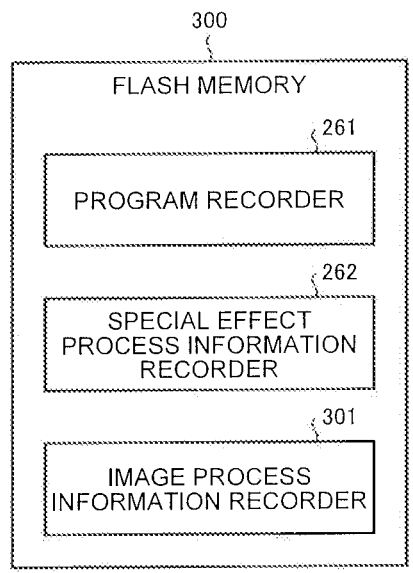

FIG.17

| NAME | | VISUAL INFORMATION | | | | T2 |
|---|---|---|---|---|---|---|
| | | VISUAL EFFECT | INTEN-SITY | CONTRAST | WB | |
| FINISH EFFECT PROCESS | NATURAL | NONE | MIDDLE | MIDDLE | WHITE | |
| | VIVID | NONE | HIGH | HIGH | WHITE | |
| | FLAT | NONE | LOW | LOW | WHITE | |
| | MONOTONE | NONE | NONE | MIDDLE | NONE | |
| SPECIAL EFFECT PROCESS | POP ART | NONE | HIGH | HIGH | WHITE | |
| | FANTASTIC FOCUS | SOFT FOCUS | MIDDLE | LOW | WHITE | |
| | TOY PHOTO | SHADING | MIDDLE | HIGH | YEL-LOW | |
| | DIORAMA | TOP AND BOTTOM FEATHERING | HIGH | HIGH | WHITE | |
| | ROUGH MONOCHROME | NOISE SUPERIMPOSITION | NONE | HIGH | NONE | |

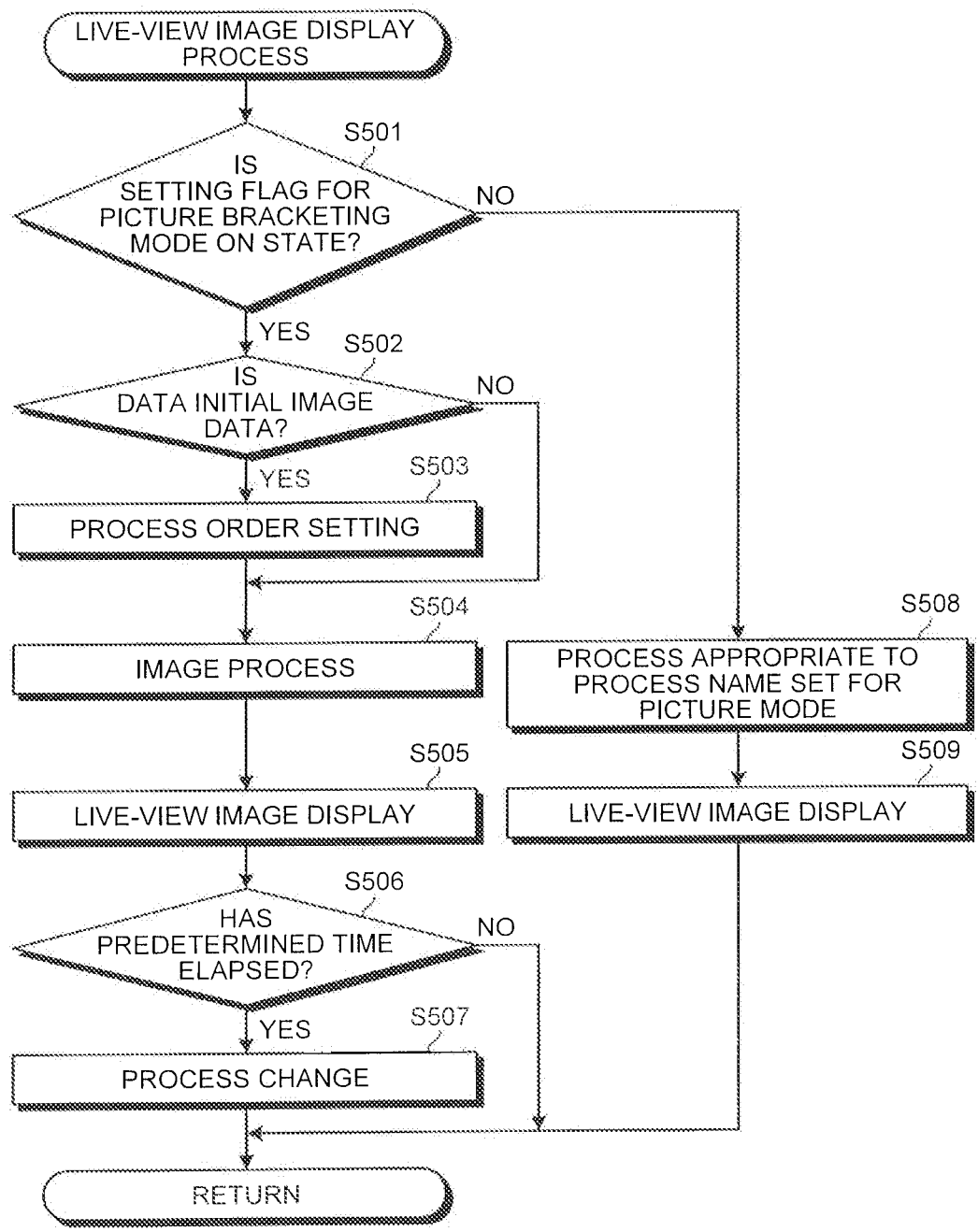

IMAGING APPARATUS, IMAGING METHOD AND COMPUTER-READABLE STORAGE MEDIUM

CROSS-REFERENCE TO RELATED APPLICATIONS

This application is based upon and claims the benefit of priority from Japanese Patent Application No. 2011-122657, filed on May 31, 2011; and Japanese Patent Application No. 2012-078247, filed on Mar. 29, 2012, the entire contents of both of which are incorporated herein by reference.

BACKGROUND OF THE INVENTION

1. Field of the Invention

The present invention relates to an imaging apparatus, an imaging method, and an imaging program in which electronic image data is generated by capturing an image of a subject and executing a photoelectric conversion.

2. Description of the Related Art

In recent years, an imaging apparatus such as a digital camera and a digital video camera has come to equip various shooting modes including a shooting mode enabling capturing a natural image in any shooting scenes and a shooting mode enabling capturing a brighter image. In such shooting modes, shooting conditions of various types such as contrast, sharpness, and intensity are set so that a natural image quality in shooting can be obtained in various scenes.

In contrast, known has been an imaging apparatus equipping a special effect shooting mode which enables a special effect process (art filter) by which an impressive image beyond a traditional image can be generated by intentionally adding a shading or a noise and executing an adjustment into an intensity or a contrast the extent of which is nearly beyond a realm of a traditionally-satisfying end result. For example, known has been a technique of separating image data into data of luminance component and data of color component and adding, to the data of the luminance component, a shading with an emphasis beyond optical characteristics of an optical system to produce a shading effect in the captured image (see Japanese Patent Application Laid-Open No. 2010-74244, for example).

Besides, known has been a technique of superimposing a predetermined granular pattern on synchronized image data and correcting a contrast to make the captured image appear granular (see Japanese Patent Application Laid-Open No. 2010-62836, for example).

Besides, known has been an imaging apparatus that equips a bracketing shooting mode which enables recording plural pieces of image data by one shooting, operation while changing shooting conditions of various types in shooting, for example, parameters for a white balance, an ISO sensitivity, and an exposure value (see Japanese Patent Application Laid-Open No. 2002-142148, for example).

SUMMARY OF THE INVENTION

According to an aspect of the present invention, an imaging apparatus includes an imaging unit that captures an image of a subject and executes a photoelectric conversion to generate electronic image data; a display unit that displays an image corresponding to the image data; an image processor that executes a special effect process of producing a visual effect on the image data in combination with a plurality of image processes to generate processed image data; a release input unit that accepts an input of a release signal of instructing the imaging apparatus to execute shooting; an image process controller that, when there are plural kinds of special effect processes to be executed by the image processor, controls the image processor to execute the plural kinds of special effect processes on one piece of the image data generated right after the acceptance of the input of the release signal and to generate plural pieces of processed image data; and a display controller that controls the display unit to display, for a predetermined time, one of an image corresponding to the one piece of the image data and at least one processed image corresponding to at least a part of the plural pieces of processed image data generated by the image processor.

According to another aspect of the present invention, an imaging method executed by an imaging apparatus provided with an imaging unit that captures an image of a subject and executes a photoelectric conversion to generate electronic image data, and a display unit that displays an image corresponding to the image data, includes generating processed image data via a special effect process of producing a visual effect on the image data in combination with a plurality of image processes; accepting an input of a release signal of instructing the imaging apparatus to execute shooting; generating plural pieces of processed image data, when there are plural kinds of special effect processes, via the plural kinds of special effect processes on one piece of the image data generated right after the acceptance of the input of the release signal; and controlling the display unit to display, for a predetermined time, one of an image corresponding to the one piece of the image data and at least one processed image corresponding to at least a part of the plural pieces of processed image data.

According to still another aspect of the present invention, a non-transitory computer-readable storage medium causes execution of generating processed image data via a special effect process of producing a visual effect on the image data in combination with a plurality of image processes; accepting an input of a release signal of instructing the imaging apparatus to execute shooting; generating plural pieces of processed image data, when there are plural kinds of special effect processes, via the plural kinds of special effect processes on one piece of the image data generated right after the acceptance of the input of the release signal; and controlling the display unit to display, for a predetermined time, one of an image corresponding to the one piece of the image data and at least one processed image corresponding to at least a part of the plural pieces of processed image data.

The above and other objects, features, advantages, and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 shows an example of a table of image process information as image process information recorded in an image process information recorder provided in the imaging apparatus according to the first embodiment of the present invention;

FIG. 16 is a block diagram of a configuration of a flash memory according to a third embodiment of the present invention;

FIG. 17 shows an example of a table of image process information as visual information recorded in an image process information recorder according to the third embodiment of the present invention;

FIG. 18 is a flowchart of an outline of a live-view image display process by an imaging apparatus according to the third embodiment of the present invention;

FIG. 22;

DETAILED DESCRIPTION OF THE PREFERRED EMBODIMENTS

Exemplary embodiments of the present invention (hereinafter referred to as "embodiments") will be explained below with reference to the accompanying drawings. It should be noted that the present invention is not limited to the embodiments. The same part will be assigned with the same reference symbol in the description of the accompanying drawings.

First Embodiment

Figure 1:
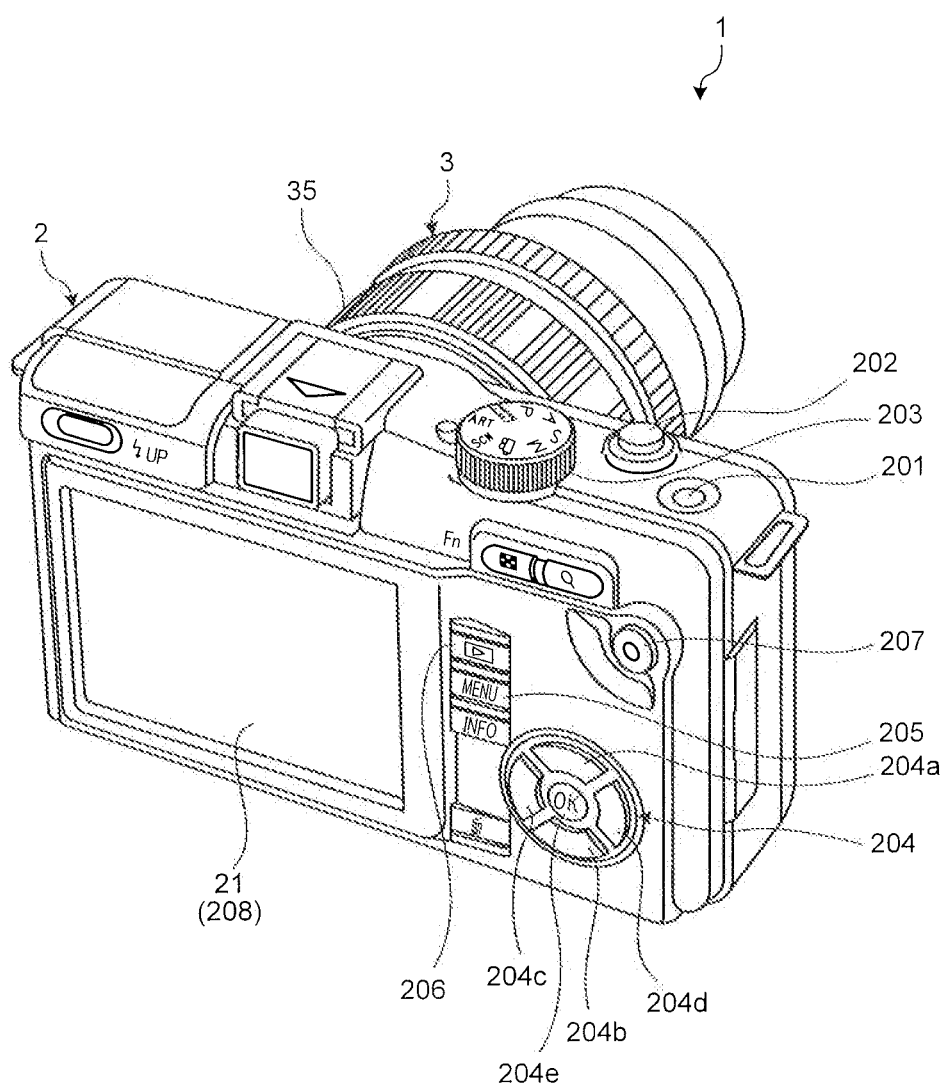
FIG. 1 is perspective view of a configuration at a side facing a user of an imaging apparatus according to a first embodiment of the present invention.
Figure 2:
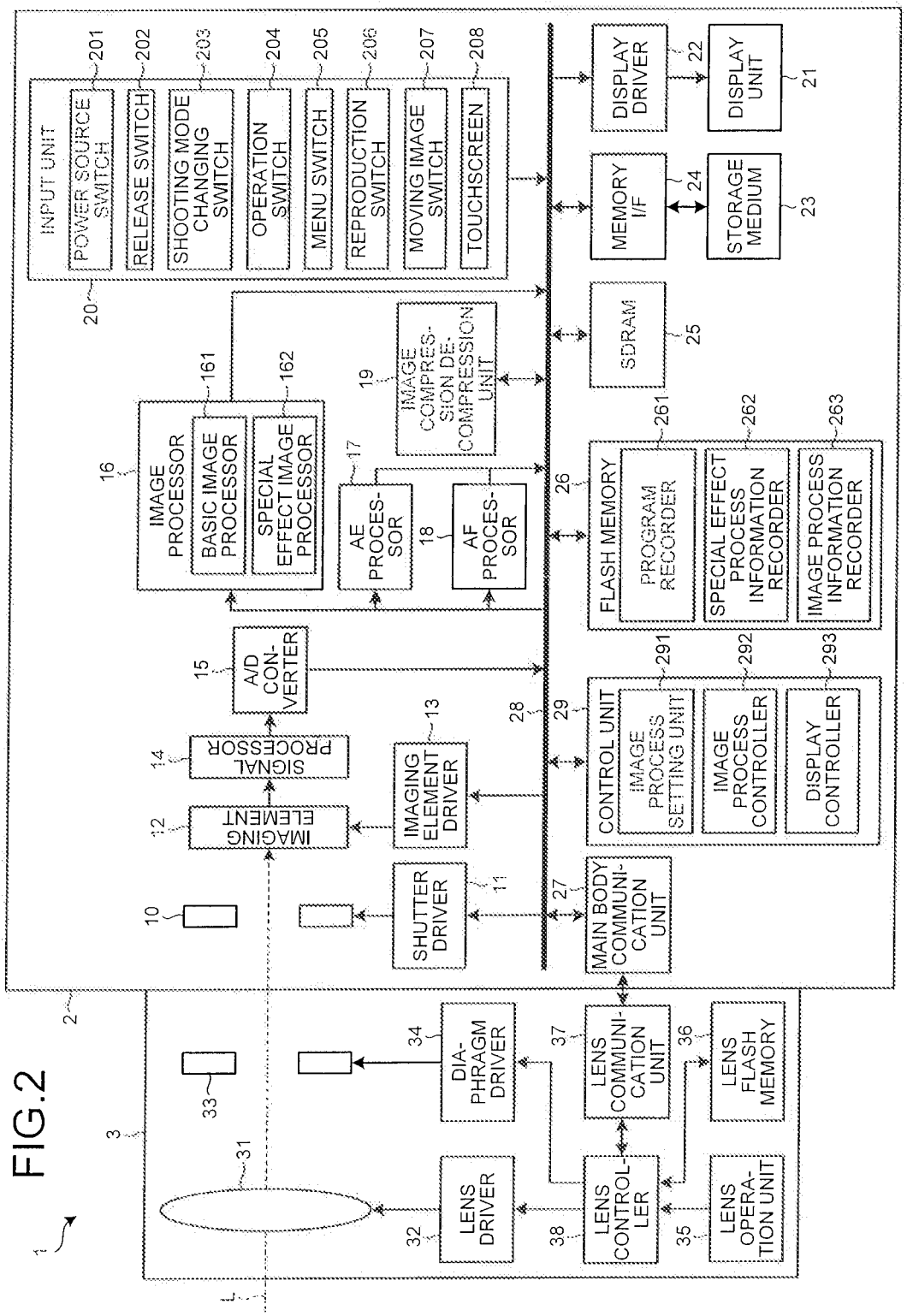
FIG. 2 is a block diagram of a configuration of the imaging apparatus according to the first embodiment of the present invention.

FIG. 1 is a perspective view of a configuration at a side facing a user (a front face side) of an imaging apparatus according to a first embodiment of the present invention. FIG. 2 is a block diagram of a configuration of the imaging apparatus according to the first embodiment of the present invention. An imaging apparatus 1 shown in FIGS. 1 and 2 is provided with a main body unit 2 and a lens unit 3 which can be detachably attached to the main body unit 2.

The main body unit 2 is provided with a shutter 10, a shutter driver 11, an imaging element 12, an imaging element driver 13, a signal processor 14, an A/D converter 15, an image processor 16, an AE processor 17, an AF processor 18, an image compression decompression unit 19, an input unit 20, a display unit 21, a display driver 22, a storage medium 23, a memory I/F 24, a synchronous dynamic random access memory (SDRAM) 25, a flash memory 26, a main body communication unit 27, a bus 28, and a control unit 29.

The shutter 10 sets a state of the imaging element 12 to a light exposure state or a light shielding state. The shutter driver 11 is configured by using a stepper motor and the like and drives the shutter 10 in response to an instruction signal input from the control unit 29.

The imaging element 12 is configured by using a charge coupled device (CCD), a complementary metal oxide semiconductor (CMOS), or the like which receives and converts into an electric signal a light condensed by the lens unit 3. The imaging element driver 13 makes the imaging element 12 output image data (analogue signal) to the signal processor 14 at a predetermined time. In this sense, the imaging element driver 13 functions as an electronic shutter.

The signal processor 14 executes an analogue process on the analogue signal input from the imaging element 12 and the outputs it to the A/D converter 15. Specifically, the signal processor 14 executes a noise reduction process, a gain-up process, and the like on the analogue signal. For example, the signal processor 14 executes, after executing a reduction of a reset noise and the like, a waveform shaping and additionally a gain-up to obtain an intended brightness on the analogue signal.

By executing an A/D conversion on the analogue signal input from the signal processor 14, the A/D converter 15 generates and outputs to the SDRAM 25 via the bus 28 digital image data.

The image processor 16 obtains image data from the SDRAM 25 via the bus 28 and executes image processes of various types on the obtained image data (raw data) to generate processed image data. The processed image data is output to the SDRAM 25 via the bus 28. The image processor 16 is provided with a basic image processor 161 and a special effect image processor 162.

The basic image processor 161 executes basic image processes including at least an optical black subtraction process, a white balance adjustment process, a synchronization process of image data in a case where the imaging element has a Bayer pattern, a color matrix computing process, a gamma correction process, a color reproduction process, an edge emphasis process, and the like on the image data. The basic image processor 161 executes a finish effect process by which a natural image is reproduced to generate finish effect image data based on preset parameters of respective image processes. Here, the parameters of respective image processes means values for contrast, sharpness, intensity, white balance, and gradation.

The special effect image processor 162 executes a special effect process which produces a visual effect in combination with a plurality of image processes on image data to generate processed image data (hereinbelow referred to as "special effect image data"). The combination for the special effect process includes, for example, any one of a tone reproduction curve process, a feathering process, a shading addition process, an image composition process, a noise superimposition process, an intensity adjustment process, and an image composition process.

The AE processor 17 obtains image data recorded in the SDRAM 25 via the bus 28 and sets exposure conditions in executing a still image shooting or a moving image shooting based on the obtained image data. Specifically, the AE processor 17 executes an automatic exposure of the imaging apparatus 1 by calculating a luminance from the image data and determining a setting value for aperture value (F-number), a shutter speed, and the like, for example, based on the calculated luminance.

The AF processor 18 obtains image data recorded in the SDRAM 25 via the bus 28 and executes an adjustment of an autofocus of the imaging apparatus 1 based on the obtained image data. For example, the AF processor 18 executes the autofocus adjustment of the imaging apparatus 1 by taking out a signal of high frequency component from the image data, executing an autofocus (AF) computing process on the signal of the high frequency component, and thereby determining a full-focus evaluation of the imaging apparatus 1.

The image compression decompression unit 19 obtains image data recorded in the SDRAM 25 via the bus 28, compresses the obtained image data in accordance with a predetermined format, and outputs the compressed image data to the SDRAM 25. Here, the predetermined format may be the joint photographic experts group (JPEG) system, the motion JPEG system, the MP4 (H.264) system, and the like. Besides, the image compression decompression unit 19 obtains the image data (compressed image data) recorded in the storage medium 23 via the bus 28 and the memory I/F 24, and decompresses (expands) and outputs to the SDRAM 25 the obtained image data.

The input unit 20 is provided with a power source switch 201 that switches a power state of the imaging apparatus 1 between ON state and OFF state, a release switch 202 that accepts an input of a still image release signal instructing a shooting of a still image, a shooting mode changing switch 203 that allows a switching among various shooting modes set in the imaging apparatus 1, an operation switch 204 that allows a switching among various settings of the imaging apparatus 1, a menu switch 205 that causes the display unit 21 to display the settings of various types of the imaging apparatus 1, a reproduction switch 206 that causes the display unit 21 to display an image corresponding to the image data recorded in the storage medium 23, a moving image switch 207 that accepts an input of a moving image release signal instructing a shooting of a moving image, and a touchscreen 208 that is provided in a manner of being superposed on a display window of the display unit 21.

The release switch 202 can move by an external depression and accepts an input of a second release signal instructing a shooting of a still image when fully depressed while accepting an input of a first release signal instructing a preparation operation for shooting when depressed halfway.

The operation switch 204 is provided with directional switches 204a to 204d that allow selective settings in a menu window and the like in the vertical and horizontal directions and a determination switch 204e (OK switch) that allows determining an operation via the directional switches 204a to 204d in the menu window and the like (see FIG. 1). The operation switch 204 may be configured by using a dial switch and the like.

The touchscreen 208 detects a touch by an external object and outputs to the control unit 29 a positional signal (signal indicating a coordinate position) appropriate to the detected touch position. The touchscreen 208 may detect a position (coordinate position) touched by a user based on information, for example, an icon image and a thumbnail image, displayed in the display unit 21 and may accept an input of an instruction signal instructing an operation to be executed by the imaging apparatus 1 depending on the detected touch position or an instruction signal instructing a selection of an image. In general, a resistance film system, an electrostatic capacitance system, optical system, and the like are adopted for the touchscreen 208. In the first embodiment, a touchscreen of any system can be applied.

The display unit 21 is configured by using a display panel formed by a liquid crystal, an organic electro luminescence (EL), and the like. The display driver 22 obtains image data recorded in the SDRAM 25 via the bus 28 or image data recorded in the storage medium 23 and causes the display unit 21 to display an image corresponding to the obtained image data. Here, a rec-view display in which image data right after the shooting is displayed for a predetermine time (three seconds, for example); a reproduction display in which image data recorded in the storage medium 23 is reproduced; a live-view display in which live-view images corresponding to image data continuously generated by the imaging element 12 are sequentially displayed in chronological order; and the like are included in the image display. The display unit 21 arbitrarily displays operational information of the imaging apparatus 1 and information concerning the shooting.

The storage medium 23 is configured by using a memory card and the like attached from an outside of the imaging apparatus 1. The storage medium 23 is detachably attached to the imaging apparatus 1 via the memory I/F 24. Image data on which the image processor 16 and the image compression decompression unit 19 have executed processes is written by a not shown reading/writing device appropriate to is type in the storage medium 23, and the image data recorded in the storage medium 23 is read out by the reading/writing device. The storage medium 23 may output imaging program and information of various types to the flash memory 26 via the memory I/F 24 and the bus 28 under the control of the control unit 29.

The SDRAM 25 is configured by using a volatile memory. The SDRAM 25 temporarily records the image data input from the A/D converter 15 via the bus 28, the processed image data input from the image processor 16, and information in process in the imaging apparatus 1. For example, the SDRAM 25 temporarily records image data sequentially output for each frame by the imaging element 12 via the signal processor 14, the A/D converter 15, and the bus 28.

The flash memory 26 is configured by using a non-volatile memory. The flash memory 26 is provided with a program recorder 261, a special effect process information recorder 262, and an image process information recorder 263. The program recorder 261 records programs of various types for operating the imaging apparatus 1, an imaging program and data of various types used during an execution of the program, parameters of various types necessary for the operation of image processes by the image processor 16, and the like. The special effect process information recorder 262 records combination information of image processes in each special effect process executed by the special effect image processor 162. The image process information recorder 263 records image process information in which an image process which can be executed by the image processor 16 is associated with a process time. The flash memory 26 records a product serial number for specifying the imaging apparatus 1 and the like.

Here, the image process information recorded in the image process information recorder 263 will be explained. FIG. 3 shows an example of a table of image process information as image process information recorded in the image process information recorder 263.

As shown in FIG. 3, a finish effect process and a special effect process which can be executed on image data by the image processor 16 are associated with process times required for respective image processes and listed in an image process information table T1. For example, when the finish effect process set in the image processor 16 is "NATURAL", "NORMAL" is listed for the process time. Here, the "NORMAL" means a process time in which the basic image processor 161 is able to execute the image process without delay on image data that the imaging element 12 generates continuously at a predetermined frame rate (60 fps, for example). In contrast to this, when the special effect process set in the image processor 16 is "FANTASTIC FOCUS", "TWICE THE NORMAL" is listed for the process time.

In this manner, respective process times are associated with the finish effect process and the special effect process to be executed by the image processor 16 and listed in the image process information table T1.

Here, each of the finish effect process and the special effect process explained above will be explained. In the first embodiment, the basic image processor 161 has a function of executing four finish effect processes. Items for the finish effect process are "NATURAL", "VIVID", "FLAT", and "MONOTONE". The special effect image processor 162 has a function of executing five special effect processes. Items for the special effect process have respective functions of executing "POP ART", "FANTASTIC FOCUS", "TOY PHOTO", "DIORAMA", and "ROUGH MONOCHROME".

The contents of the finish effect processes will be explained first.

The finish effect process corresponding to the item "NATURAL" is a process of finishing a shot image to have a natural color.

The finish effect process corresponding to the item "VIVID" is a process of finishing a shot image to have vividness.

The finish effect process corresponding to the item "FLAT" is a process of finishing an image with emphasis on a nature of a material of a subject to be shot.

The finish effect process corresponding to the item "MONOTONE" is a process of finishing a shot image to have a monochrome tone.

Next, the contents of the special effect processes will be explained.

The finish effect process corresponding to the item "POP ART" is a process of emphasizing colors to be colorful and making a representation with bright and pleasant atmosphere. The combination of image processes for the "POP ART" includes, for example, an intensity emphasizing process, a contrast emphasizing process, and the like.

The finish effect process corresponding to the item "FANTASTIC FOCUS" is a process of making a representation with an aerial feeling in a soft tone, beautifully and fantastically like a light of happiness surrounds with a detail of a subject kept. The combination of image processes for the "FANTASTIC FOCUS" includes, for example, a tone reproduction curve process, a feathering process, an image composition process, and the like.

The finish effect process corresponding to the item "TOY PHOTO" is a process of depicting a past time appearance and a nostalgic atmosphere by providing a periphery of an image with a shading effect. The combination of image processes for the "TOY PHOTO" includes, for example, a low-pass filter process, a white balance process, a contrast process, a shading process, a hue/intensity process, and the like.

The finish effect process corresponding to the item "DIORAMA" is a process of depicting a toy-like appearance and an artificial appearance by providing a periphery of an image with an immoderate feathering effect. The combination of image processes for "DIORAMA" includes, for example, a hue/intensity process, a contrast process, a feathering process, a composition process, and the like (see Japanese Patent Application Laid-Open No. 2010-74244 for the details of the toy photo and the shading, for example).

The finish effect process corresponding to the item "ROUGH MONOCHROME" is a process of depicting a roughness by adding an immoderate contrast and a granular noise of a film. The combination of image processes for the "ROUGH MONOCHROME" includes, for example, an edge emphasizing process, a level correction optimizing process, a noise pattern superimposition process, a contrast process, and the like (see Japanese Patent Application Laid-Open No. 2010-62836 for the details of the rough monochrome, for example).

The main body communication unit 27 is a communication interface that executes a communication with the lens unit 3 attached to the main body unit 2.

The bus 28 is configured by using a transmission channel and the like connecting each component of the imaging apparatus 1. The bus 28 transmits data of various types generated in the inside of the imaging apparatus 1 to each component of the imaging apparatus 1.

The control unit 29 is configured by using a central processing unit (CPU) and the like. The control unit 29 gives an instruction appropriate to each of units constituting the imaging apparatus 1, executes a transmission of data, and the like in response to an instruction signal or a release signal from the input unit 20 to overall control the operation of the imaging apparatus 1. When the second release signal is input, the control unit 29 executes a control of starting a shooting operation in the imaging apparatus 1. Here, the shooting operation in the imaging apparatus 1 means an operation in which the signal processor 14, the A/D converter 15, and the image processor 16 execute predetermined processes on image data output by the imaging element 12 by the driving of the shutter driver 11 and the imaging element driver 13. The image data on which the processes are executed in this manner is compressed by the image compression decompression unit 19 and recorded in the storage medium 23 via the bus and the memory I/F 24 under the control of an image process controller 292.

A detailed configuration of the control unit 29 will be explained. The control unit 29 is provided with an image process setting unit 291, the image process controller 292, and a display controller 293.

The image process setting unit 291 sets a content of an image process that should be executed by the image processor 16 in response to an instruction signal input from the input unit 20 via the bus 28. Specifically, the image process setting unit 291 sets a plurality of special effect processes and finish effect processes whose process contents are different from each other in response to an instruction signal from the input unit 20.

When a plurality of special effect processes and finish effect processes which should be executed by the image processor 16 are present, the image process controller 292 controls the image processor 16 to execute plural kinds of special effect processes and finish effect processes on one piece of image data to generate plural pieces of processed image data. Specifically, when a picture bracketing mode is set in the imaging apparatus 1, the image process controller 292 controls the image processor 16 to execute, on image data, each of the plurality of special effect processes set in the image processor 16 by the image process setting unit 291 and to generate plural pieces of special effect image data, and controls the SDRAM 25 to record the data. Moreover, the image process setting unit 291 controls the image processor 16 to execute plural kinds of special effect processes and finish effect processes on one piece of image data generated right after an acceptance of the input of the second release signal and to generate plural pieces of processed image data.

The display controller 293 controls a display mode of the display unit 21. Specifically, the display controller 293 drives the display driver 22 and controls the display unit 21 to display a live-view image corresponding to the processed image data that the image process controller 292 controls the image processor 16 to generate. Besides, the display controller 293 controls the display unit 21 to display a live-view image or at least one special effect image corresponding to at least a part of the plural pieces of special effect image data that the image process controller 292 controls the image processor 16 to generate. For example, the display controller 293 controls the display unit 21 to display, by superimposing on a live-view image displayed consecutively along a chronological order in the display unit 21, a plurality of special effect images corresponding to the plural pieces of special effect image data generated by the special effect image processor 162 via the plurality of respective special effect processes whose process contents are different from each other on one piece of image data. In addition, the display controller 293 controls the display unit 21 to display a reduced image obtained by reducing a special effect image into a predetermined size (a thumbnail image). Moreover, the display controller 293 controls to display, by superimposing, information concerning a name of a process of the special effect image displayed in the display unit 21, icons and letters, for example.

The main body unit 2 having the configuration explained above may be provided with a voice input/output function, a flash function, a detachable electronic viewfinder (EVF), a communication unit that can communicate interactively with an external processor (not shown) such as a personal computer via the Internet, and the like.

The lens unit 3 is provided with an optical system 31, a lens driver 32, a diaphragm 33, a diaphragm driver 34, a lens operation unit 35, a lens flash memory 36, a lens communication unit 37, and a lens controller 38.

The optical system 31 is configured by using at least one lens. The optical system 31 condenses a light from a predetermined field of view area. The optical system 31 has an optical zoom function of changing an angle of field and a focusing function of changing a focal point. The lens driver 32 is configured by using a DC motor, a stepper motor, or the like and changes a point of focus, an angle of field, and the like of the optical system 31 by making a lens of the optical system 31 move on an optical axis L.

The diaphragm 33 limits an amount of an incident light condensed by the optical system 31 to adjust the exposure. The diaphragm driver 34 is configured by using a stepper motor and the like and drives the diaphragm 33.

The lens operation unit 35 is a ring provided around a lens barrel of the lens unit 3 as shown in FIG. 1 and accepts an input of an operation signal of starting an operation of an optical zoom in the lens unit 3 or an input of an instruction signal of instructing an adjustment of a point of focus in the lens unit 3. The lens operation unit 35 may be realized by a touch-tone switch and the like.

The lens flash memory 36 records a control program for determining a position and a movement of the optical system 31, lens characteristics of the optical system 31, and parameters of various types.

The lens communication unit 37 is a communication interface for executing a communication with the main body communication unit 27 of the main body unit 2 when the lens unit 3 is attached to the main body unit 2.

The lens controller 38 is configured by using a central processing unit (CPU) and the like. The lens controller 38 controls an operation of the lens unit 3 in response to an operation signal of the lens operation unit 35 or an instruction signal from the main body unit 2. Specifically, the lens controller 38 drives the lens driver 32 to bring the lens unit 3 into focus and to change a zoom and also drives the diaphragm driver 34 to change an aperture value in response to the operation signal of the lens operation unit 35. The lens controller 38 may be configured to transmit information of a point of focus of the lens unit 3, a distance of the focal point, unique information that allows identifying the lens unit 3, and the like to the main body unit 2 when the lens unit 3 is attached to the main body unit 2.

The imaging apparatus 1 having the configuration explained above includes a picture mode and a picture bracketing mode. Here, the picture mode is a mode of selecting one of finish effect processes and special effect processes and making the image processor 16 execute a process corresponding to the selected process item and generate a live-view image or a still image. The picture bracketing mode is a mode in which the image processor 16 is made to select and execute a desired combination among the finish effect processes and special effect processes, and thereby to generate a plurality of images whose processes are different from each other by one shooting operation, and the storage medium 23 is made to record the generated images. Respective setting methods of the picture mode and the picture bracketing mode to be executed by the imaging apparatus 1 will be explained below.

First, when a user operates the menu switch 205 in a situation where the display unit 21 displays a live-view image in association with a start-up of the imaging apparatus 1 in response to an operation of the power source switch 201 by the user, the display controller 293 controls the display unit 21 to display a menu operation window.

Figure 4:
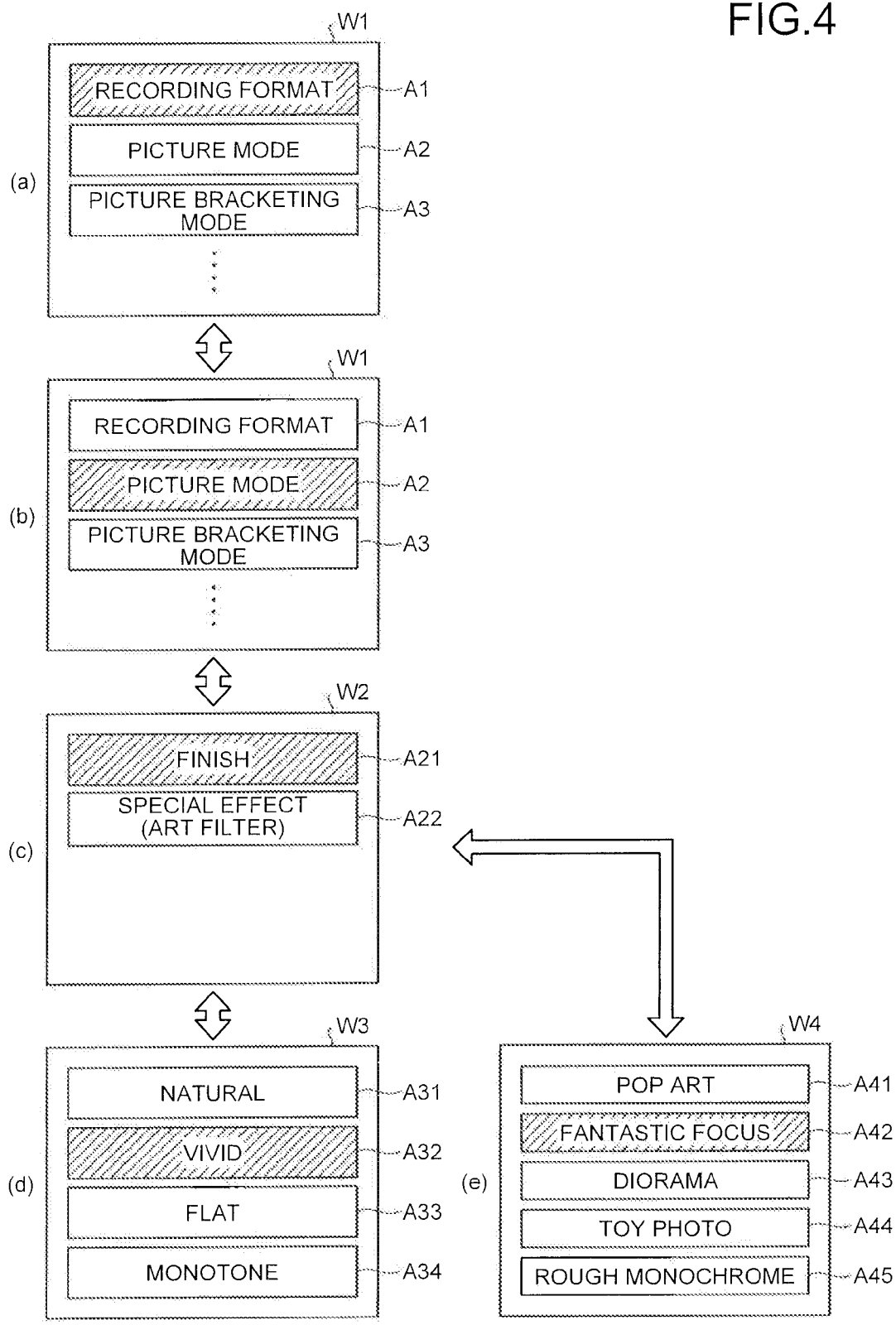
FIG. 4 shows an example of a window transition in a menu window displayed in a display unit when a menu switch of the imaging apparatus according to the first embodiment of the present invention is operated.

FIG. 4 shows an example of a window transition in a menu window displayed in the display unit 21 when the menu switch 205 is operated, showing a window transition when the picture mode is set.

As shown in FIG. 4, the display controller 293 controls the display unit 21 to display a menu window W1 (FIG. 4(a)) which indicates a setting content of the imaging apparatus 1 when the menu switch 205 is operated. In the menu window W1, a recording format icon A1, a picture mode icon A2, a picture bracketing mode icon A3, and the like are displayed. At a time when the menu image W1 is displayed, the recording format icon A1 is selected by default and highlighted in display (changed in color) (FIG. 4(a)). In FIG. 4, the highlight display is shaded by diagonal lines.

The recording format icon A1 accepts an input of an instruction signal instructing the display unit 21 to display a recording format menu window in which respective recording formats of a still image and a moving image are set. The picture mode icon A2 accepts an input of an instruction signal instructing the display unit 21 to display a picture mode selecting window. The picture bracketing mode icon A3 accepts an input of an instruction signal instructing the display unit 21 to display a picture bracketing mode setting window.

When the picture mode icon A2 is selected in response to an operation of the up switch 204a, the down button 204b, or the like of the operation switch 204 by the user in a state where the display unit 21 displays the menu window W1, the display controller 293 highlights and displays in the display unit 21 the picture mode icon A2 (FIG. 4(b)). The display controller 293 may control the display unit 21 to display the icons A1 to A3 selected by the user by changing the font and the size thereof.

When the picture mode icon A2 is selected in response to an operation of the determination button 204e of the operation switch 204 by the user in the state where the display unit 21 displays the menu window W1 (FIG. 4(b)), the display controller 293 controls the display unit 21 to display a picture mode setting image W2 (FIG. 4(c)). In the picture mode setting window W2, a finish icon A21 and a special effect icon A22 are displayed. When the user operates the left switch 204c of the operation switch 204 in the state where the display unit 21 displays the picture mode setting window W2, the display controller 293 controls the display unit 21 to display the menu window W1 (FIG. 4(b)).

The finish icon A21 accepts an input of an instruction signal instructing the display unit 21 to display a finish mode selecting window. The special effect icon A22 accepts an input of an instruction signal instructing the display unit 21 to display a shooting mode selecting window.

When the finish icon A21 is set by the user in the state where the display unit 21 displays the picture mode setting window W2, the display controller 293 controls the display unit 21 to display a finish mode selecting window W3 (FIG. 4(d)). In the finish mode selecting window W3, a natural icon A31, a vivid icon A32, a flat icon A33, and a monotone icon A34 are displayed as icons for selectable process items of the finish effect processes. Each of the icons A31 to A34 accepts an input of an instruction signal instructing a setting of a process corresponding to a finish effect process to be executed by the basic image processor 161. FIG. 4(d) shows a state where the vivid icon A32 is selected and highlighted in the display.

When the determination button 204e of the operation switch 204 is operated by the user in the state where the display unit 21 displays the finish mode selecting window W3, the image process setting unit 291 sets a finish effect process ("VIVID" in the case shown in FIG. 4(d)) corresponding to the icon highlighted in the finish mode selecting window W3 displayed in the display unit 21 as a process to be executed in the picture mode.

When the special effect icon A22 is selected and set in response to the operation of the operation switch 204 by the user in the state where the display unit 21 displays the picture mode setting window W2, the display controller 293 controls the display unit 21 to display a special effect setting window W4 in which a content of a special effect process to be executed by the special effect image processor 162 is set (FIG. 4(e)). In the special effect setting window W4, a pop art icon A41, a fantastic focus icon A42, a diorama icon A43, a toy photo icon A44, and a rough monochrome icon A45 are displayed as icons for selectable process items of the special effect processes. Each of the icons A41 to A45 accepts an input of an instruction signal instructing a setting of a special effect process to be executed by the special effect image processor 162. FIG. 4(e) shows a state where the fantastic focus icon A42 is selected and highlighted in the display.

When the determination button 204e of the operation switch 204 is operated by the user in the state where the display unit 21 displays the special effect setting window W4, the image process setting unit 291 sets a special effect process ("FANTASTIC FOCUS" in the case shown in FIG. 4(e)) corresponding to the icon highlighted in the special effect setting window W4 displayed in the display unit 21 as a process to be executed in the picture mode. Here, information concerning the set special effect process is recorded in the SDRAM 25.

Figure 5:
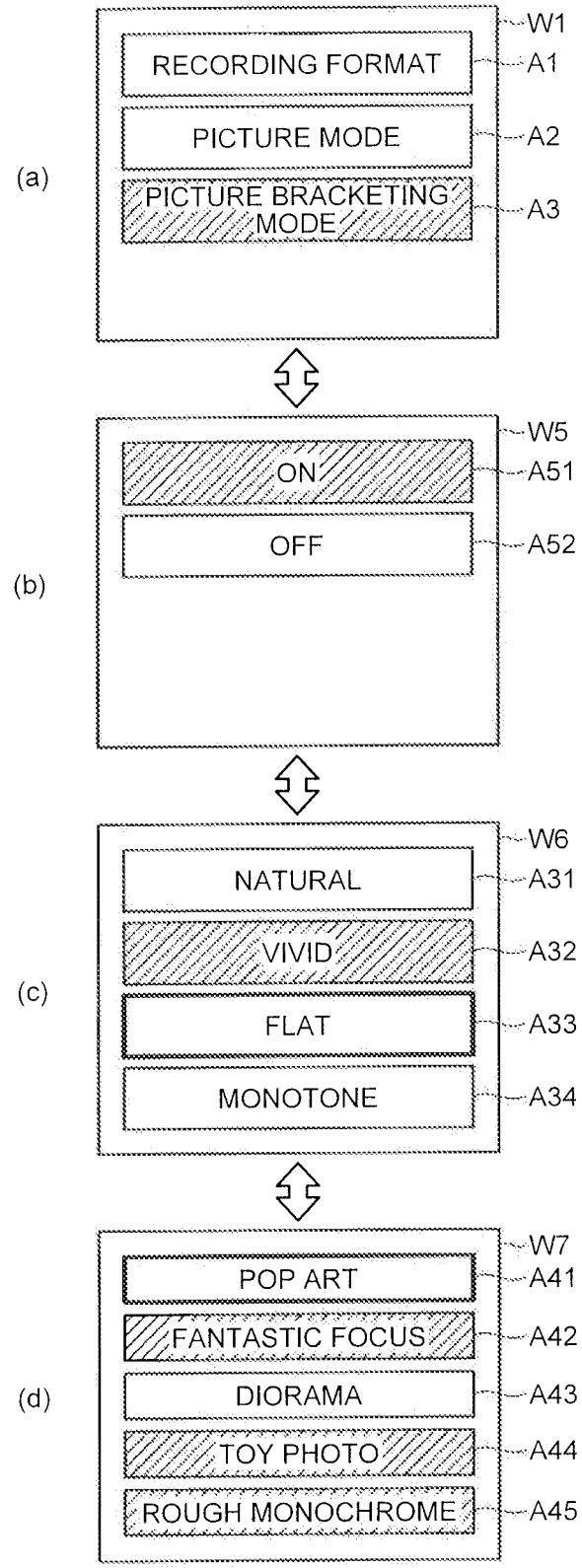
FIG. 5 shows another example of a window transition in the menu window displayed in the display unit when the menu switch of the imaging apparatus according to the first embodiment of the present invention is operated.

FIG. 5 shows another example of a window transition in the menu window displayed in the display unit 21 when the menu switch 205 is operated, showing a window transition when the picture bracketing mode is set.

As shown in FIG. 5(a), when the user selects the picture bracketing mode icon A3 in the state where the display unit 21 displays the menu window W1, the picture bracketing mode icon A3 is highlighted in the display.

When the user operates the determination switch 204e of the operation switch 204 in the state where the display unit 21 displays the menu window W1, the display controller 293 controls the display unit 21 to display a picture bracketing mode setting window W5 (FIG. 5(b)). In the picture bracketing mode setting window W5, an ON icon A51 and an OFF icon A52 are displayed.

The ON icon A51 accepts an input of an instruction signal of setting the picture bracketing mode in the imaging apparatus 1 and sets a setting flag for the picture bracketing mode to ON state. The OFF icon A52 accepts an input of an instruction signal of not setting the picture bracketing mode in the imaging apparatus 1 and sets the setting flag for the picture bracketing mode to OFF state. FIG. 5(b) shows a state where the ON icon A51 is selected and highlighted in the display.

When the ON icon A51 is selected and set in response to the operation of the operation switch 204 by the user in the state where the display unit 21 displays the picture bracketing mode setting window W5, the display controller 293 controls the display unit 21 to display a picture bracketing mode selecting window W6 (FIG. 5(c)). In the picture bracketing mode selecting window W6, the icons A31 to A34 for the respective process items which can be executed by image processor 16 in the picture bracketing mode are displayed.

By operating the determination button 204e or the down button 204b of the operation switch 204 in the state where the display unit 21 displays the picture bracketing mode selecting window W6, the user selects a predetermined icon in the picture bracketing mode selecting window w6 and sets a process item to be executed in the picture bracketing mode. On this occasion, the display controller 293 controls the display unit 21 to display the icon selected by the user as an active icon in response to the operation signal input from the operation switch 204. FIG. 5(c) shows a state where a process corresponding to the vivid icon A32 is set as a process to be executed in the picture bracketing mode and the flat icon A33 is selected and displayed as an active icon. Here, an icon displayed as an active icon is presented with its frame thickened in FIG. 5.

When the down button 204b of the operation switch 204 is operated by the user in the state where the monotone icon A34 is displayed as an active icon in the state where the display unit 21 displays the picture bracketing mode selecting window W6, the display controller 293 controls the display unit 21 to display a picture bracketing mode selecting window W7 by scrolling the picture bracketing mode selecting window W6 (FIG. 5(d)). In the picture bracketing mode selecting window W7, the icons A41 to A45 for respective process items of the plurality of special effect processes that can be executed by the special effect image processor 162 in the picture bracketing mode. Specifically, the pop art icon A41, the fantastic focus icon A42, the diorama icon A43, the toy photo icon A44, and the rough monochrome icon A45 are displayed.

The user then ends the setting of the picture bracketing mode by operating the left button 204c of the operation switch 204 or the release switch 202.

Figure 6:
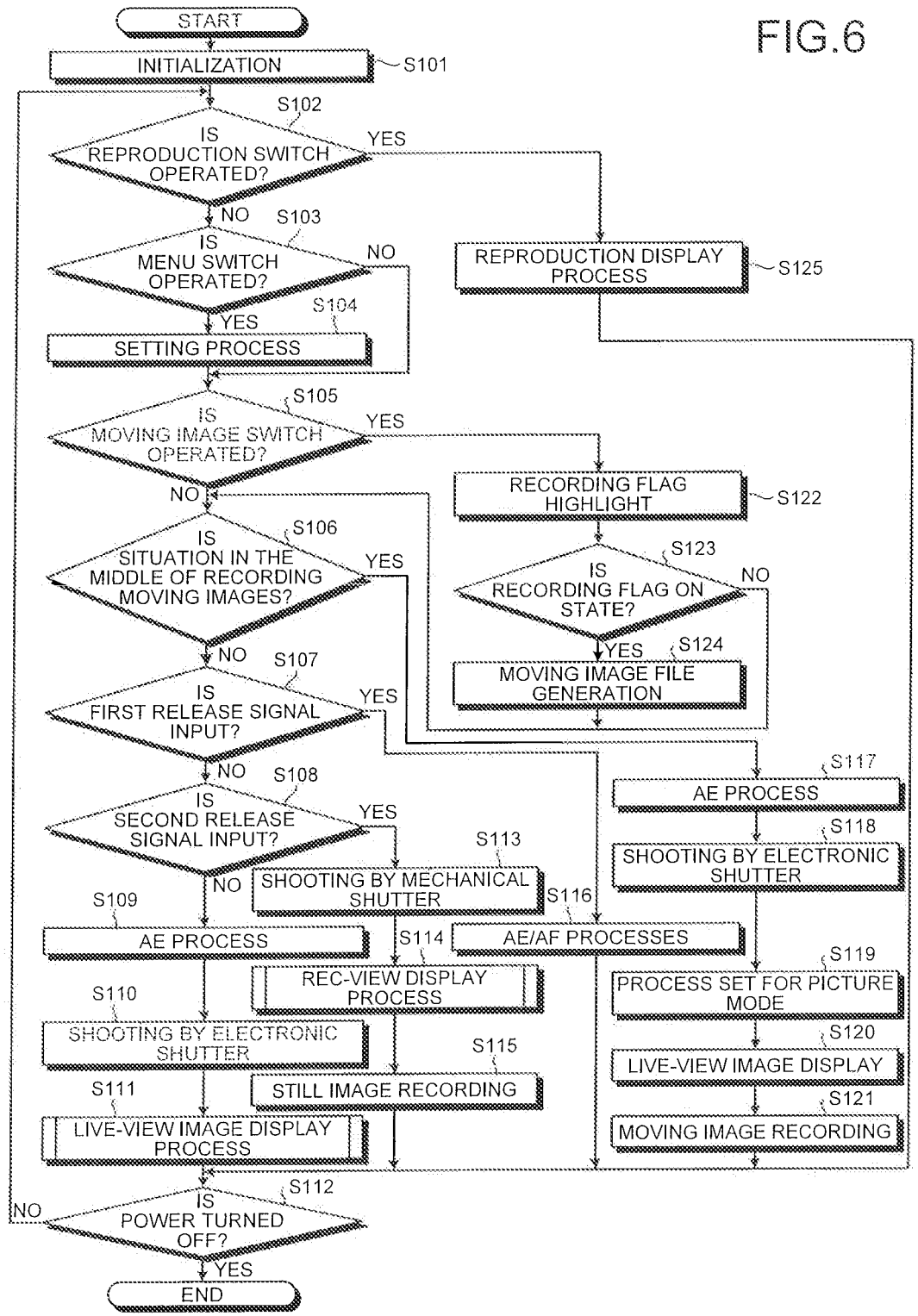
FIG. 6 is a flowchart of an outline of a process executed by the imaging apparatus according to the first embodiment of the present invention.

A process of the imaging apparatus 1 in which the picture mode and the picture bracketing mode are set via the steps explained above will be explained. FIG. 6 is a flowchart of an outline of a process executed by the imaging apparatus 1.

As shown in FIG. 6, when the power source switch 201 is operated by the user and the power of the imaging apparatus 1 is turned on, the control unit 29 initializes the imaging apparatus 1 (step S101). Specifically, the control unit 29 executes an initialization of turning a recording flag that indicates being in the middle of recording moving images to OFF state. The recording flag becomes ON state while shooting moving images and OFF state while not shooting moving images.

When the menu switch 205 is operated ("Yes" at step S103) without an operation of the reproduction switch 206 ("No" at step S102), the imaging apparatus 1 then displays the menu window W1 explained above (see FIG. 4), executes a setting process of setting various conditions in response to a selecting operation by the user (step S104), and moves to step S105.

On the other hand, when the menu switch 205 is not operated ("No" at step S103) without the operation of the reproduction switch 206 ("No" at step S102), the imaging apparatus 1 moves to step S105.

The control unit 29 then determines whether or not the moving image switch 207 is operated (step S105). When the control unit 29 determines that the moving image switch 207 is operated ("Yes" at step S105), the imaging apparatus 1 moves to step S122 which will be explained later. On the other hand, when the control unit 29 determines that the moving image switch 207 is not operated ("No" at step S105), the imaging apparatus 1 moves to step S106 which will be explained later.

At step S106, when the first release signal is input from the release switch 202 ("Yes" at step S107) in the situation where the imaging apparatus 1 is not in the middle of recording moving images ("No" at step S106), the imaging apparatus 1 moves to step S116 which will be explained later. On the other hand, when the first release signal is not input via the release switch 202 ("No" at step S107), the imaging apparatus 1 moves to step S108 which will be explained later.

At step S108, the case where the second release signal is not input via the release switch 202 ("No" at step S108) will be explained. In this case, the control unit 29 controls the AE processor 17 to execute an AE process of adjusting exposure (step S109).

The control unit 29 then drives the imaging element driver 13 to execute a shooting by the electronic shutter (step S110).

After that, the imaging apparatus 1 executes a live-view image display process by which the display unit 21 is made to display a live-view image corresponding to image data generated by the imaging element 12 by the shooting by the electronic shutter (step S111). A detail of the live-view image display process will be explained later.

The control unit 29 then determines whether or not the power of the imaging apparatus 1 is turned off by the operation of the power source switch 201 (step S112). When the control unit 29 determines that the power of the imaging apparatus 1 is turned off ("Yes" at step S112), the imaging apparatus 1 ends the process. On the other hand, when the control unit 29 determines that the power of the imaging apparatus 1 is not turned off ("No" at step S112), the imaging apparatus 1 returns to step S102.

At step S108, the case where the second release signal is input from the release switch 202 ("Yes" at step S108) will be explained. In this case, the control unit 29 drives the shutter driver 11 and the imaging element driver 13 to execute a shooting by a mechanical shutter (step S113).

The imaging apparatus 1 then executes a rec-view display process of displaying, only for a predetermined time (three seconds, for example), a shot still image (step S114). A detail of the rec-view display process will be explained later.

After that, the control unit 29 controls the image compression decompression unit 19 to compress image data in the JEPG format and the storage medium 23 to record the compressed image data (step S115). The imaging apparatus 1 then moves to step S112. Here, the control unit 29 may control the storage medium 23 to record the image data compressed in the JEPG format by the image compression decompression unit 19 by making the compressed image data associated with raw data on which an image process is not executed by the image processor 16.

At step S107, the case where the first release signal is input from the release switch 202 ("Yes" at step S107) will be explained. In this case, the control unit 29 controls the AE processor 17 to execute an AE process of adjusting exposure and the AF processor 18 to execute an AF process of adjusting a point of focus (step S116). After that, the imaging apparatus 1 moves to step S112.

At step S106, the case where the imaging apparatus 1 is in the middle of recording moving images ("Yes" at step S106) will be explained. In this case, the control unit 29 controls the AE processor 17 to execute the AE process of adjusting exposure (step S117).

The control unit 29 then drives the imaging element driver 13 to execute a shooting by the electronic shutter (step S118).

After that, the image process controller 292 controls the image processor 16 to execute a process corresponding to the process item set in the picture mode on the image data (step S119). For example, when the process item "VIVID" among the finish processes is set in the picture mode, the image process controller 292 controls the basic image processor 161 to execute a finish process corresponding to the "VIVID" on the image data. Besides, when the process item "FANTASTIC FOCUS" among the special effect processes is set in the picture mode, the image process controller 292 controls the special effect image processor 162 to execute special effect process corresponding to the "FANTASTIC FOCUS" on the image data.

The display controller 293 then controls the display unit 21 to display a live-view image corresponding to the image data on which the image process is exec by the image processor 16 (step S120).

After that, the control unit 29 controls the image compression decompression unit 19 to compress the image data and controls the storage medium 23 to record the compressed image data in a moving image file generated therein as moving images (step S121). After that, the imaging apparatus 1 moves to step S112.

At step S105, the case where the moving image switch 207 is operated ("Yes" step S105) will be explained. In this case, the control unit 29 highlights the recording flag indicating being at ON state and in the middle of recording moving images (step S122).

The control unit 29 then determines whether or not the recording flag recorded in the SDRAM 25 is ON state (step S123). When the control unit 29 determines that the recording flag is ON state ("Yes" at step S123), the control unit 29 generates, in the storage medium 23, a moving image file for recording image data in the storage medium 23 along a chronological order (step S124), and the imaging apparatus 1 moves to step S106. On the other hand, when the control unit 29 determines that the recording flag is not ON state ("No" at step S123), the imaging apparatus 1 moves to step S106.

At step S102, the case where the reproduction switch 206 is operated ("Yes" step S102) will be explained. In this case, the display controller 293 executes a reproduction display process of obtaining image data from the storage medium 23 via the bus 28 and the memory I/F 24, and controlling the image compression decompression unit 19 to decompress the obtained image data and the display unit 21 to display the image data (step S125). After that, the imaging apparatus 1 moves to step S112.

Figure 7:
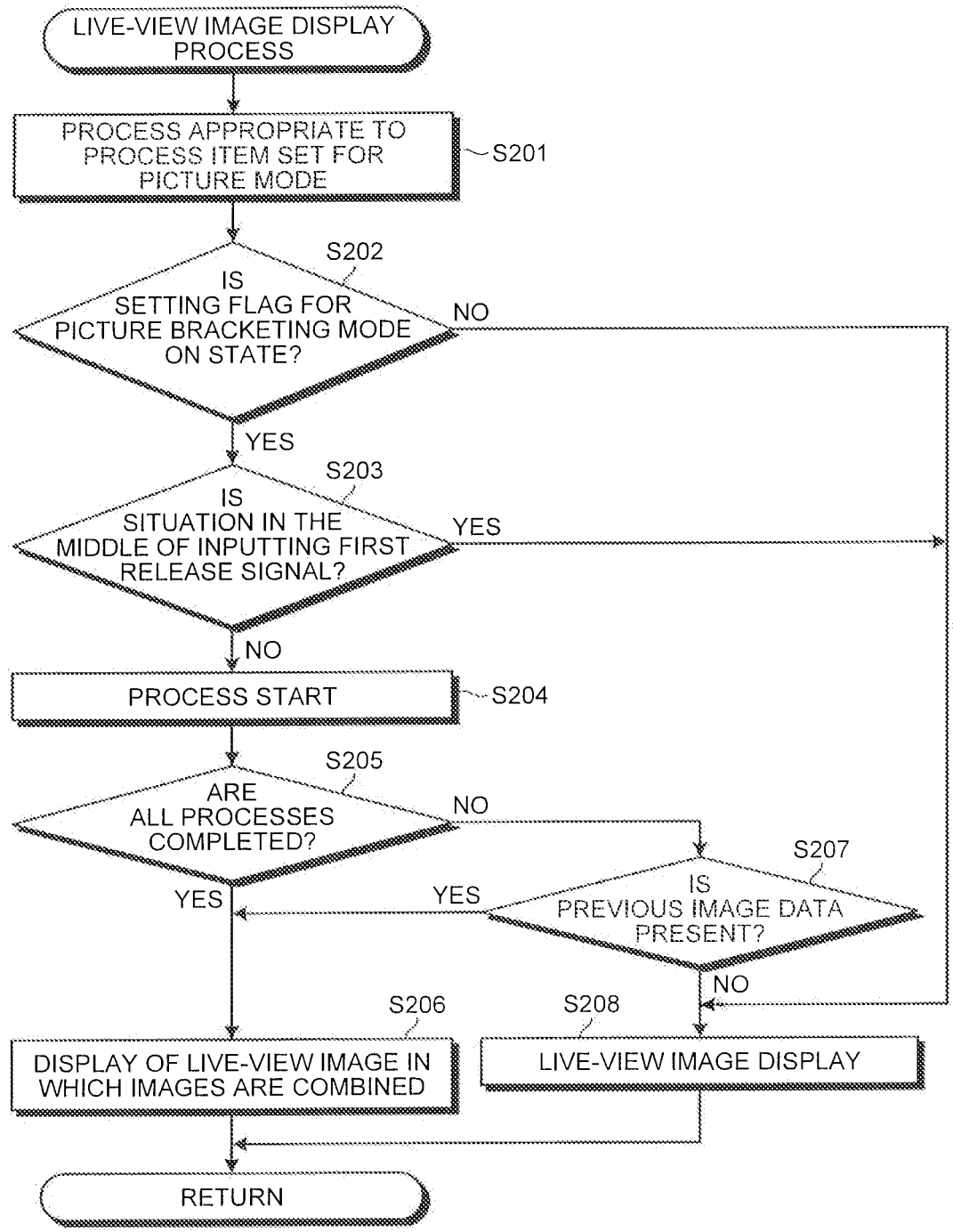
FIG. 7 is a flowchart of an outline of a live-view image display process shown in FIG. 6.

Next, the live-view image display process at step S111 shown in FIG. 6 will be explained. FIG. 7 is a flowchart of an outline of the live-view image display process shown in FIG. 6.

As shown in FIG. 7, the image processor 16 executes a process corresponding to a process item set by the image process setting unit 291 for the picture mode on the image data (step S201). For example, the basic image processor 161 obtains the image data from the SDRAM 25 via the bus 28 and executes the process item, "NATURAL" for example, set by the image process setting unit 291 in the picture mode on the obtained image data to generate finish effect image data.

The control unit 29 then determines whether or not the setting flag for the picture bracketing mode is ON state (step S202). When the control unit 29 determines that the setting flag for the picture bracketing mode is ON state ("Yes" at step S202), the imaging apparatus 1 moves to step S203 which will be explained later. On the other hand, when the control unit 29 determines that the setting, flag for the picture bracketing mode is not ON state ("No" at step S202), the imaging apparatus 1 moves to step S208 which will be explained later. Here, the control unit 29 may determine whether or not the picture bracketing mode is set in the imaging apparatus 1 by determining whether or not any process item other than that set in the picture mode are set in the basic image processor 161 or the special effect image processor 162 for the picture bracketing mode.

At step S203, the control unit 29 determines whether or not the first release signal is in the middle of being input via the release switch 202 (step S203). Specifically, the control unit 29 determines whether or not the release switch 202 is in the state of being halfway depressed by the user. When the control unit 29 determines that the first release signal is in the middle of being input ("Yes" at step S203), the imaging apparatus 1 moves to step S208 which will be explained later. On the other hand, when the control unit 29 determines that the first release signal is not in the middle of being input ("No" at step S203), the imaging apparatus 1 moves to step S204 which will be explained later.

At step S204, the image processor 16 obtains the image data from the SDRAM 25 via the bus 28 and starts a process corresponding to the process item set in the picture bracketing mode on the obtained image data (step S204). For example, when process items "VIVID", "FANTASTIC FOCUS", and "TOY PHOTO" are set in the picture bracketing mode, the image processor 16 executes processes for the "VIVID", "FANTASTIC FOCUS", and "TOY PHOTO" sequentially on the obtained image data. Specifically, the basic image processor 161 executes a process corresponding to the process item "VIVID" on the obtained image data to generate finish effect image data. The special effect image processor 162 generates special effect image data obtained by executing the process item "FANTASTIC FOCUS" and special effect image data obtained by executing the process item "TOY PHOTO". Though the order of the process items explained above is assumed to be determined in advance, it may be arbitrarily changed.

The control unit 29 then determines whether or not the image processor 16 has completed all of the plurality of process items set in the picture bracketing mode on the image data (step S205). Specifically, the control unit 29 determines whether or not plural pieces of finish effect image data or special effect image data obtained by the execution, by the image processor 16, of the plurality of process items set in the picture bracketing mode are recorded in the SDRAM 25. When the control unit 29 determines that the image processor 16 has completed all of the plurality of process items set in the picture bracketing mode on the image data ("Yes" at step S205), the imaging apparatus 1 moves to step S206 which will be explained later. On the other hand, when the control unit 29 determines that the image processor 16 has not completed all of the plurality of process items set in the picture bracketing mode on the image data ("No" at step S205), the imaging apparatus 1 moves to step S207 which will be explained later.

At step S206, the display controller 293 combines a plurality of images corresponding to the plurality of respective process items set in the picture bracketing mode to the live-view image corresponding with the image data on which the process item set in the picture mode is executed and controls the display unit 21 to display the composite images (step S206). After that, the imaging apparatus 1 returns to the main routine shown in FIG. 6.

Figure 8:
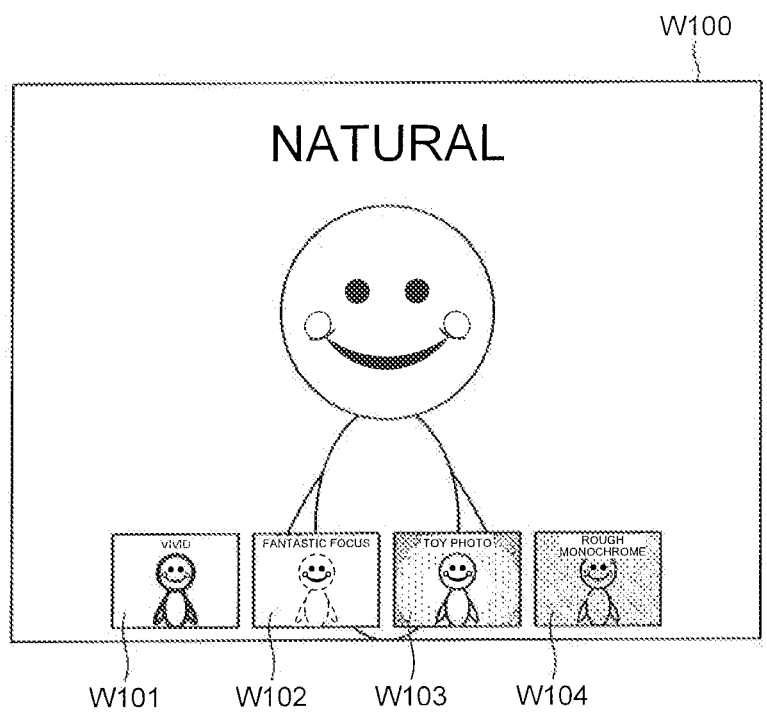
FIG. 8 shows an example of a live-view image that a display controller controls the display unit to display.

FIG. 8 shows an example of the live-view image that the display controller 293 controls the display unit 21 to display. In FIG. 8, one typical image is shown among live-view images continuously displayed in the display unit 21.

As shown in FIG. 8, the display controller 293 superimposes, as thumbnail images, respective images W101 to W104 generated appropriate to the plurality of process items set in the image processor 16 in the picture bracketing mode on a live-view image W100 corresponding to the image data on which the process item set in the picture mode is executed by the image processor 16. Besides, the display controller 293 executes a control of superimposing and displaying "NATURAL" as information concerning the name of the process item of the live-view image W100 displayed in the display unit 21.

In the image W101 in FIG. 8, a contour of the subject is shown by a thick line to express the process item "VIVID" In the image W102, a contour of the subject is shown by a dashed line to express the process item "FANTASTIC FOCUS". Besides, in the image W103, shading is provided around the subject and a noise (dot) is added around the subject to express the process item "TOY PHOTO". Moreover, in the image W104, a noise (dot) is superimposed on an entirety of the image to express the process item "ROUGH MONOCHROME". While respective images W101 to W104 are displayed on the live-view image W100 in FIG. 8, the display controller 293 may control the display unit 21 to make a display in such an order in which the image processor 16 has completed processes corresponding to respective process items. Moreover, the images W101 to W104 may not be obtained by executing processes corresponding to respective process items by the image processor 16 on the same image data (asynchronous). Furthermore, the display controller 293 may superimpose and display information concerning names of respective process items of the images W101 to W104, letters, icons, and the like for example, on the respective images W101 to W104.

At step S205, the case where the control unit 29 determines that the image processor 16 has not completed all of the plurality of process items set in the picture bracketing mode on the image data ("No" at step S205) will be explained. In this case, the control unit 29 determines whether or not there is previous image data on which a process among process items which are processes corresponding to process items set in the picture bracketing mode and whose processes are not completed is previously executed by the image processor 16 (step S207). For example, the control unit 29 determines whether or not previous special effect image data on which a special effect process among the plurality of special effect processes which are set in the picture bracketing mode and whose processes are not completed is previously executed by the image processor 16 is recorded in the SDRAM 25. When the control unit 29 determines that such previous image data is present ("Yes" at step S207), the imaging apparatus 1 moves to step S206. On the other hand, when the control unit 29 determines that such previous image data is not present ("No" at step S207), the imaging apparatus 1 moves to step S208.

At step S208, the display controller 293 controls the display unit 21 to display a live-view image corresponding to the image data on which the process corresponding to the process item set in the picture mode is executed by the image processor 16. After that, the imaging apparatus 1 returns the main routine shown in FIG. 6.

Figure 9:
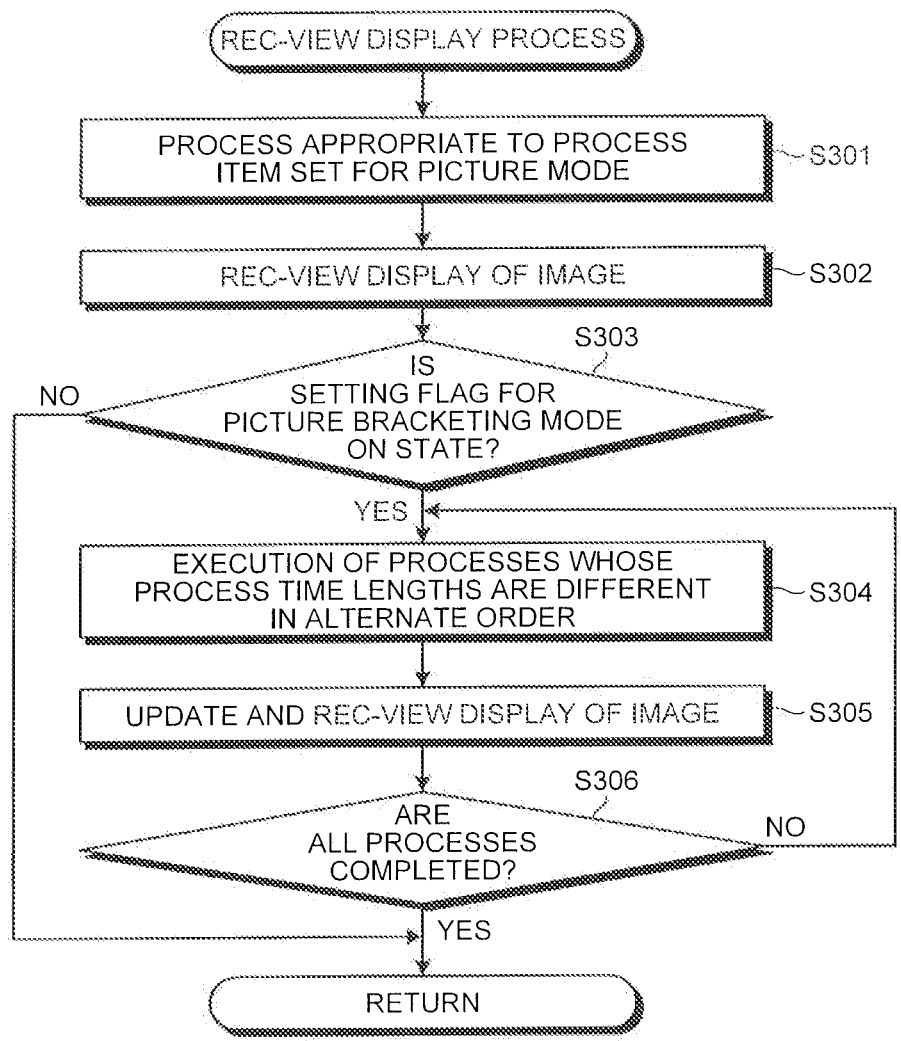
FIG. 9 is a flowchart of an outline of the rec-view display process shown in FIG. 6.

Next, the rec-view display process at step S114 in FIG. 6 will be explained. FIG. 9 is a flowchart of an outline of the rec-view display process shown in FIG. 6.

As shown in FIG. 9, the image processor 16 executes an image process corresponding to the process item set in the picture mode on the image data (step S301). Specifically, the image processor 16 obtains image data from the SDRAM 25 via the bus 28, executes a process corresponding to the process item set by the image process setting unit 291 in the picture mode on the obtained image data, and outputs the processed data to the SDRAM 25.

The display controller 293 then controls the display unit 21 to execute a rec-view display of an image corresponding to the image data on which the process corresponding to the process item set in the picture mode is executed by the image processor 16 only for a predetermined time (two seconds, for example) (step S302). Thus, the user is able to check the shot content right after the shooting.

After that, the control unit 29 determines whether or not the setting flag for the picture bracketing mode is ON state (step S303). When the control unit 29 determines that the setting flag for the picture bracketing mode is ON state ("Yes" at step S303), the imaging apparatus 1 moves to step S304. On the other hand, when the control unit 29 determines that the setting flag for the picture bracketing mode is not ON state ("No" at step S303), the imaging apparatus 1 returns to the main routine shown in FIG. 6.

At step S304, the image process controller 292 refers to the image process information table T1 recorded in the image process information recorder 263 of the flash memory 26 and controls the image processor 16 to execute respective processes corresponding to the plurality of process items set by the image process setting unit 291 in the picture bracketing mode in such an order that process time lengths of image processes are different alternately.

Figure 10:
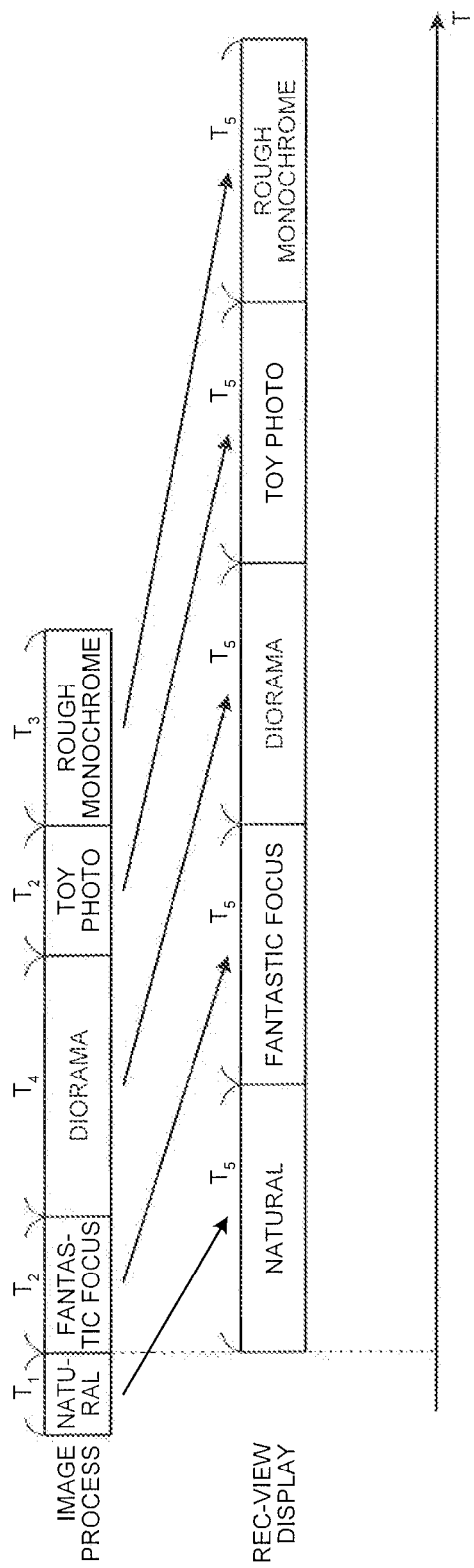
FIG. 10 shows an outline of a time chart when an image process controller controls an image processor to execute a plurality of special effect processes and finish effect processes on image data.

FIG. 10 shows a time chart when the image process controller 292 controls the image processor 16 to execute a plurality of special effect processes and finish effect processes on image data. In FIG. 10, the image process setting unit 291 is configured to set a finish effect process corresponding to the process item "NATURAL" in the picture bracketing mode and set respective special effect processes corresponding to the process items process items "FANTASTIC FOCUS", "TOY PHOTO", "ROUGH MONOCHROME", and "DIORAMA".

In FIG. 10, a process time of the finish effect process corresponding to the process item "NATURAL" is $T_1$, a process time of the special effect process corresponding to the process item "FANTASTIC FOCUS" is $T_2$, a process time of the special effect process corresponding to the process item "TOY PHOTO" is $T_2$, a process time of the special effect process corresponding to the process item "ROUGH MONOCHROME" is $T_3$, a process time of the special effect process corresponding to the process item "DIORAMA" is $T_4$, and a display time during which an image is displayed in the rec-view is $T_5$. A relation of process times of respective process items and the display time in the rec-view display satisfies an expression "$T_1<T_2<T_3<T_4<T_5$".

As shown in FIG. 10, the image process controller 292 refers to the image process information table T1 (see FIG. 3) recorded in the image process information recorder 263 of the flash memory 26 and controls the image processor 16 to execute the processes corresponding to the process items set in the picture bracketing mode by changing the order depending on lengths of the process times. Specifically, the image process controller 292 controls the image processor 16 to execute, after controlling the image processor 16 to execute the process item "NATURAL" whose process time is the shortest, the process item "FANTASTIC FOCUS" whose process time is the second shortest as shown in FIG. 10. The image process controller 292 then controls the image processor 16 to execute, after controlling the image processor 16 to execute the process item "DIORAMA" whose process time is the longest, the process item "TOY PHOTO" whose process time is the third shortest. After that, the image process controller 292 controls the image processor 16 to execute the process item. "ROUGH MONOCHROME".

In this manner, the image process controller 292 refers to the image process information table T1 recorded in the image process information recorder 263 of the flash memory 26 and controls the image processor 16 to execute the respective processes corresponding to the plurality of process items set by the image process setting unit 291 in the picture bracketing mode in the order depending on the lengths of the process times. By this configuration, the image processor 16 executes a process whose process time is long while the display unit 21 executes the rec-view display of an image. As a result of this, the display controller 293 is able to update an image to be displayed in rec-view smoothly at predetermined intervals. Moreover, since the image process controller 292 controls the image processor 16 to make the execution in such an order that lengths of process times are different alternately, there is no need for temporarily recording an image whose process has been completed in the SDRAM 25 when the process execution is made in an ascending order in the process time length. Therefore, the image process controller 292 is able to suppress a content to be recorded temporarily in the SDRAM 25 compared to the case in the ascending order in the process time length.

After step S304, the display controller 293 controls the display unit 21 to execute the rec-view display of images corresponding to respective pieces of image data on which processes for the plurality of process items are executed by the image processor 16 while executing an update at predetermined intervals (every two seconds, for example) (step S305).

Figure 11:
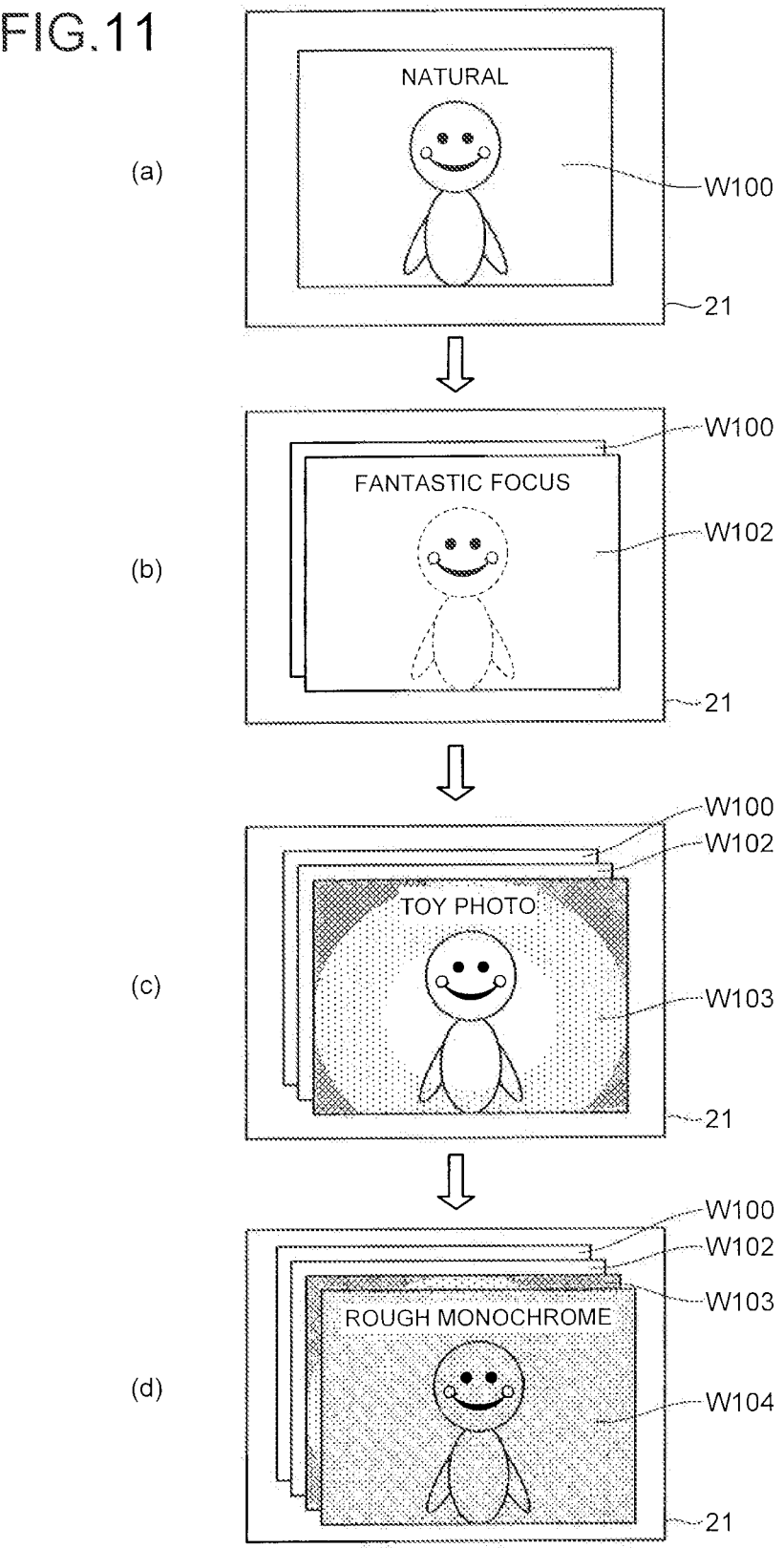
FIG. 11 is an explanatory view of a method of displaying an image that the display controller controls the display unit to display in rec-view.

FIG. 11 is an explanatory view of a method of displaying an image that the display controller 293 controls the display unit 21 to display in the rec-view.

As shown in FIG. 11, the display controller 293 controls the display unit 21 to sequentially display, by superimposing with a gradual shift from the left on the display window of the display unit 21, a plurality images generated by the image processor 16 (FIG. 11(a)→FIG. 11(b)→FIG. 11(c)→FIG. 11(d)). Specifically, though images may be superimposed without a shift, the provision of a shift allows grasping how many images are completed through bracketing. Furthermore, the display controller 293 controls the display unit 21 to superimpose and display information concerning names of the process items executed on the images sequentially displayed in the display unit 21 (NATURAL→FANTASTIC FOCUS→TOY PHOTO→ROUGH MONOCHROME).

Thus, it is possible for the user to check images on which processes corresponding to the process items set in the picture bracketing mode are executed one by one without operating the reproduction switch 206 for every reproduction of image data. Besides, an image on which a special effect process is executed produces an effect in shading and feathering beyond an assumption by the user and thereby possibly goes beyond the scope of the assumption by the user. Therefore, by checking the image in the rec-view displayed in the display unit 21, the user is able to determine whether or not to execute a shooting again in a moment. Moreover, since a relation between the effect of the special effect process and the name of the process item of the special effect process becomes definite, the user is able to grasp intuitively a special effect process the user likes or a special effect process the user does not like even in the case where a plurality of special effect process images are displayed in a short time in a random order.

After step S305, the control unit 29 determines whether or not the image processor 16 has completed all of the plurality of process items set in the picture bracketing mode on the image data (step S306). Specifically, the control unit 29 determines whether or not plural pieces of finish effect image data or special effect image data on which the plurality of process items set in the picture bracketing mode are executed by the image processor 16 are recorded in the SDRAM 25. When the control unit 29 determines that the image processor 16 has completed all of the plurality of process items set in the picture bracketing mode on the image data ("Yes" at step S306), the imaging apparatus 1 returns to the main routine shown in FIG. 6. On the other hand, when the control unit 29 determines that the image processor 16 has not completed all of the plurality of process items set in the picture bracketing mode on the image data ("No" at step S306), the imaging apparatus 1 returns to step S304.

According to the first embodiment explained so far, the display controller 293 controls the display unit 21 to display a live-view image and a plurality of processed images corresponding to the plural pieces of image process data that the image process controller 292 controls the image processor 16 to generate. As a result of this, the user is able to intuitively grasp a visual effect of an image to be shot before shooting images on which the plurality of respective special effect processes are executed by one shooting operation while watching images displayed in the display unit 21.

Moreover, according to the first embodiment, the display controller 293 controls the display unit 21 to display a plurality of processed image corresponding to plural pieces of image process data that the image process controller 292 controls the image processor 16 to generate right after the shooting only for a predetermined time. As a result of this, the user is able to easily check, without switching a mode of the imaging apparatus 1 to the reproduction mode, a plurality of images on which a plurality of respective special effect processes are executed by one shooting operation while watching images displayed in the display unit 21.

First Modification of the First Embodiment

In the first embodiment explained above, it is possible to change the position where a plurality of special effect images corresponding to plural pieces of special effect image data generated by the image processor 16 are superimposed on a live-view image that the display controller 293 controls the display unit 21 to display.

Figure 12:
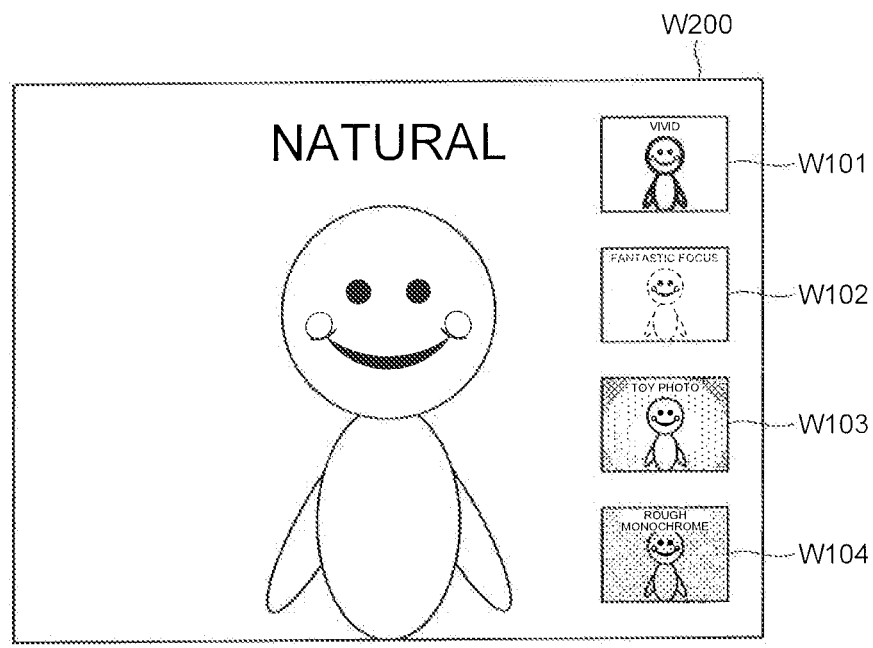
FIG. 12 shows an example of a live-view image that a display controller according to a first modification of the first embodiment of the present invention controls the display unit to display.

FIG. 12 shows an example of a live-view image that the display controller 293 according to a first modification of the first embodiment of the present invention controls the display unit 21 to display.

As shown in FIG. 12, the display controller 293 may reduce images W101 to W104 generated by the image processor 16 and control the display unit 21 to arrange longitudinally and display them in a right area on a live-view image W200. Moreover, the display controller 293 may superimpose and display "NATURAL" as information concerning a name of a process item of the live-view image W200 displayed in the display unit 21. Furthermore, the display controller 293 may superimpose and display information, letters, icons, and the like, for example, concerning names of process items of the images W101 to W104, on the respective images W101 to W104.

Second Modification of the First Embodiment

In the first embodiment explained above, it is possible to change the sizes of a plurality of superimposed special effect images to be different from each other on a live-view image that the display controller 293 controls the display unit 21 to display.

Figure 13:
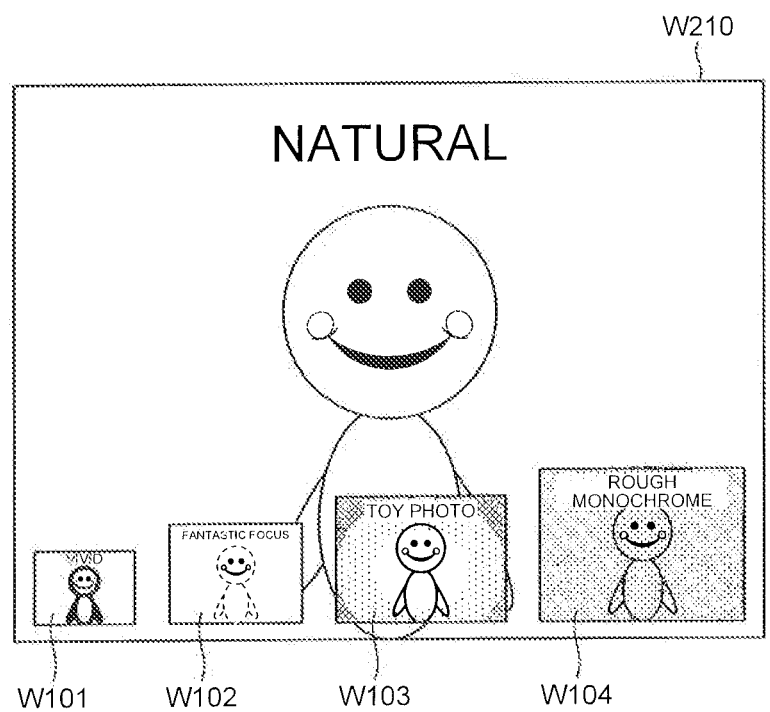
FIG. 13 shows an example of a live-view image that a display controller according to a second modification of the first embodiment of the present invention controls the display unit to display.

FIG. 13 shows an example of a live-view image that the display controller 293 according to a second modification of the first embodiment of the present invention controls the display unit 21 to display.

As shown in FIG. 13, the display controller 293 controls a reduction ratio of an image having a higher frequency of usage by the user to be lower and controls the display unit 21 to display, by superimposing on a live-view image W210, the images W101 to W104 generated by the image processor 16. Thus, it is possible to obtain the same advantage as the first embodiment explained above and to grasp a special effect process whose frequency of usage by the user is high more intuitively. Moreover, the display controller 293 may superimpose and display "NATURAL" as information concerning the name of the process item of the live-view image W210 displayed in the display unit 21. Furthermore, the display controller 293 may superimpose and display information, letters, icons, and the like, concerning the names of the process items of the respective images W101 to W104 on the respective images W101 to W104. Thus, since a relation be the effect of the special effect process and the name of the process item of the special effect process becomes definite, the user is able to grasp intuitively a special effect process the user likes or a special effect process the user does not like even in the case where a plurality of special effect process images are displayed in a short time in random order.

Third Modification of the First Embodiment

In the first embodiment explained above, it is possible to display a composite image in the display unit 21 by combining a live-view image that the controller 293 controls the display unit 21 to display with a plurality of special effect images generated by the image processor 16.

Figure 14:
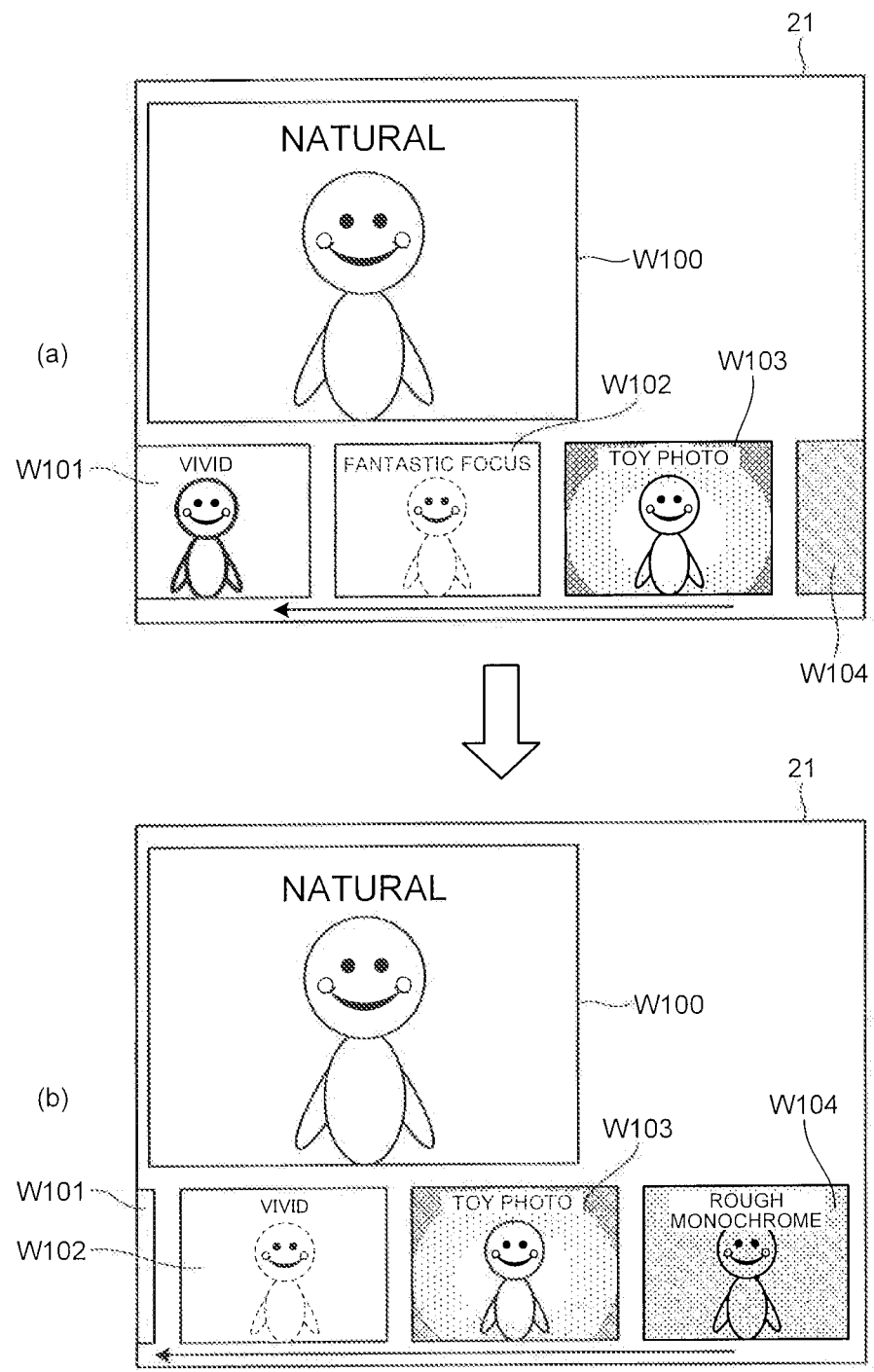
FIG. 14 shows an example of a live-view image that a display controller according to a third modification of the first embodiment of the present invention controls the display unit to display.

FIG. 14 shows an example of a live-view image that the display controller 293 according to a third modification of the first embodiment of the present invention controls the display unit 21 to display.

As shown in FIG. 14, the display controller 293 controls the display unit 21 to display the images W101 to 104 generated by the image processor 16 while moving (scrolling) them from a right side to a left side of the display window in the display unit 21 (FIG. 14(a)→FIG. 14(b)), and controls the display unit 21 to display the same live-view image 100 as the first embodiment explained above by reducing the size thereof. Thus, it is possible to obtain the same advantage as the first embodiment explained above and to check images on which the special effect processes or the finish effect processes are executed while comparing them with the live-view image W100. Moreover, the display controller 293 may superimpose and display "NATURAL" as information concerning the name of the process item of the live-view image W100 displayed in the display unit 21. Furthermore, the display controller 293 may superimpose and display information, letters, icons, and the like, concerning the names of the processes of the respective images W101 to W104 on the respective images W101 to W104.

Second Embodiment

A second embodiment of the present invention will be explained next. The second embodiment of the present invention has a difference only in the rec-view display process, which is the operation by the imaging apparatus 1 according to the first embodiment explained above, and has the same configuration as the imaging apparatus according to the first embodiment explained above in the components of the imaging apparatus. Therefore, only a rec-view display process as an operation of an imaging apparatus according to a second embodiment of the present invention will be explained below.

Figure 15:
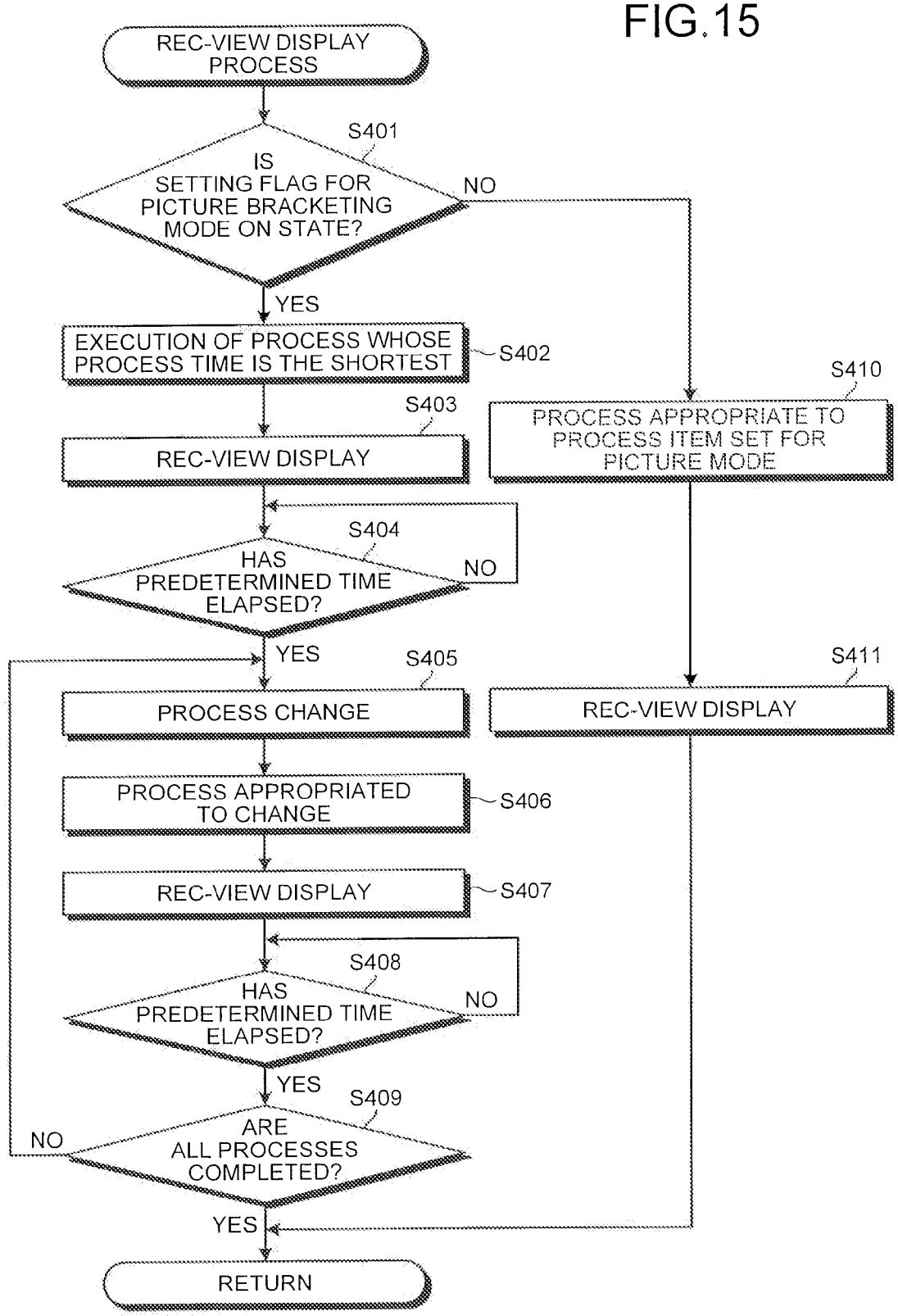
FIG. 15 is a flowchart of an outline a rec-view display process which is an operation of an imaging apparatus according to a second embodiment of the present invention.

FIG. 15 is a flowchart of an outline a rec-view display process (step S114 in FIG. 6) executed by an imaging apparatus 1 according to the second embodiment.

As shown in FIG. 15, a case where the setting flag for the picture bracketing mode in the imaging apparatus 1 is ON state ("Yes" at step S401)" will be explained. In this case, the image process controller 292 refers to the image process information table T1 recorded in the image process information recorder 263 and controls the image processor 16 to execute a process whose process time is the shortest among processes corresponding to a plurality of process items set in the picture mode and the picture bracketing mode (step S402).

The display controller 293 then controls the display unit 21 to execute the rec-view display of an image corresponding to the image data generated by the image processor 16 (step S403).

After that, the control unit 29 determines whether or not a predetermined time (two seconds, for example) has elapsed after the rec-view display of the image in the display unit 21 (step S404). When the control unit 29 determines that the predetermined time has not elapsed ("No" at step S404), the control unit 29 repeats the determination at step S404. On the other hand, when the control unit 29 determines that the predetermined time has elapsed ("Yes" at step S404), the imaging apparatus 1 moves to step S405 which will be explained later.

At step S405, the image process controller 292 changes a process corresponding to a process item set in the image processor 16 by the image process setting unit 291 to a process appropriate to a process item which is set in the picture bracketing mode and has not been processed yet (step S405), and controls the image processor 16 to execute a process corresponding to a process item appropriate to the change (step S406).

The display controller 293 then controls the display unit 21 to display an image corresponding to the image data on which the image process is executed by the image processor 16 in the rec-view (step S407).

The control unit 29 then determines whether or not the predetermined time (two seconds, for example) has elapsed after the rec-view display of the image in the display unit 21 (step S408). When the control unit 29 determines that the predetermined time has not elapsed ("No" at step S408), the control unit 29 repeats the determination at step S408. On the other hand, when the control unit 29 determines that the predetermined time has elapsed ("Yes" at step S408), the control unit 29 determines whether or not all of the processes corresponding to the plurality of process items set in the image processor 16 by the image process setting unit 291 in the picture mode and the picture bracketing mode have been completed (step S409). When the control unit 29 determines that all of the processes corresponding to the plurality at process items have not been completed ("No" at step S409), the imaging apparatus 1 returns to step S405. On the other hand, when the control unit 29 determines that all of the processes corresponding to the plurality of process items have been completed ("Yes" at step S409), the imaging apparatus 1 returns to the main routine shown in FIG. 6.

Next, a case where the setting flag for the picture bracketing mode in the imaging apparatus 1 is not ON state ("No" at step S401) will be explained. In this case, the image process controller 292 controls the image processor 16 to execute a process corresponding to the process item set by the image process setting unit 291 in the picture mode on the image data (step S410).

The display controller 293 then controls the display unit 21 to execute the rec-view display of the image corresponding to the image data on which the image process is executed by the image processor 16 (step S411). After that, the imaging apparatus 1 returns to the main routine shown in FIG. 6.

In the second embodiment of the present invention explained above, the image process controller 292 refers to the image process information table T1 recorded in the image process information recorder 263 and controls the image processor 16 to first execute a process whose process time is the shortest among processes corresponding to a plurality of process items set in the image processor 16 by the image process setting unit 291 in the picture mode and the picture bracketing mode. By this configuration, it is possible to shorten an interval to the time when the display unit 21 first executes the rec-view display. As a result of this, since being able to check the image on which the image process is executed in the display unit 21 right after the shooting, the user is able to determine promptly whether or not re-shooting is needed.

Third Embodiment

Next, a third embodiment of the present invention will be explained. An imaging apparatus according to a third embodiment of the present invention is different from the imaging apparatus explained above in the configuration of the flash memory. Besides, an operation executed by the imaging apparatus according to the third embodiment of the present invention is different from the embodiments explained above in the live-view display process and the rec-view display process. Therefore, a live-view display process and a rec-view display process which are the operation by the imaging apparatus according to the third embodiment of the present invention will be explained blow after explaining a configuration different from the embodiments explained above. Here, the same part will be assigned with the same reference symbol in the description through the accompanying drawings.

FIG. 16 is a block diagram of a configuration of a flash memory provided in an imaging apparatus 1 according to the third embodiment of the present invention. As shown in FIG. 16, a flash memory 300 is provided with the program recorder 261, the special effect process information recorder 262, and an image process information recorder 301.

The image process information recorder 301 records image process information in which a plurality of special effect processes and finish effect processes which can be executed by the image processor 16 each are associated with visual information.

Here, the image process information recorded in the image process information recorder 301 will be explained. FIG. 17 shows an example of an image process information table recorded in the image process information recorder 301.

In an image process information table T2 shown in FIG. 17, finish effect processes and special effect processes which can be executed by the image processor 16 on image data are listed. Besides, each of the finish effect processes and the special effect processes is associated with plural pieces of visual information and listed. For example, when a finish effect process set in the image processor 16 is "NATURAL", "NONE" for visual effect, "MIDDLE" for intensity, "MIDDLE" for contrast, and "WHITE" for white balance (WB) are listed. Besides, when a special effect process set in the image processor 16 is "FANTASTIC FOCUS", "SOFT FOCUS" for visual effect, "MIDDLE" for intensity, "LOW" for contrast, and "WHITE" for white balance are listed. Here, the visual effect indicates an effect which results from an image process and can be intuitively grasped by the user when the user looks at a shot image.

In this manner, each of the finish effect processes and the special effect processes is associated with visual information and listed in the image process information table T2.

Next, a live-view image display process executed by the imaging apparatus 1 according to the third embodiment will be explained. FIG. 18 is a flowchart of an outline of a live-view image display process (step S111 in FIG. 6) executed by the imaging apparatus 1 according to the third embodiment.

Its shown in FIG. 18, a case where the setting flag for the picture bracketing mode in the imaging apparatus 1 is ON state ("Yes" at step S501) will be explained. In this case, the control unit 29 determines whether or not image data (one frame) generated via a shooting operation of the imaging apparatus 1 is initial image data (step S502). Here, the initial image data indicates image data generated via a shooting operation by an electronic shutter right after the picture bracketing mode is set in the imaging apparatus 1. When the control unit 29 determines that the image data generated via a shooting operation of the imaging apparatus 1 is initial image data ("Yes" at step S502), the imaging apparatus 1 moves to step S503 which will be explained later. On the other hand, when the control unit 29 determines that the image data generated via a shooting operation of the imaging apparatus 1 is not initial image data ("No" at step S502), the imaging apparatus 1 moves to step S504 which will be explained later.

At step S503, the image process setting unit 291 refers to the image process information table T2 recorded in the image process information recorder 301 and sets an order of processes corresponding to respective process items which have the image processor 16 execute a plurality of process items set in the picture mode and the picture bracketing mode (step S503). Specifically, the image process setting unit 291 refers to the image process information table T2 recorded in the image process information recorder 301 and sets an order of the processes so that all elements in the visual information are not successive. When the plurality of process items set in the picture mode and the picture bracketing mode are "VIVID", "FANTASTIC FOCUS", "TOY PHOTO", and "ROUGH MONOCHROME", for example, the image process setting unit 291 sets, since the "FANTASTIC FOCUS" and the "TOY PHOTO" have the same information "MIDDLE" for intensity, the order of the processes to be executed by the image processor 16 to be "VIVID"→"FANTASTIC FOCUS"→"ROUGH MONOCHROME"→"TOY PHOTO" to avoid a succession of these two processes.

The image process controller 292 then causes the image processes set in the image processor 16 by the image process setting unit 291 to be executed on the image data (step S504).

After that, the display controller 293 controls the display unit 21 to display a live-view image corresponding to the image data on which the processes are executed by the image processor 16 (step S505).

Figure 19:
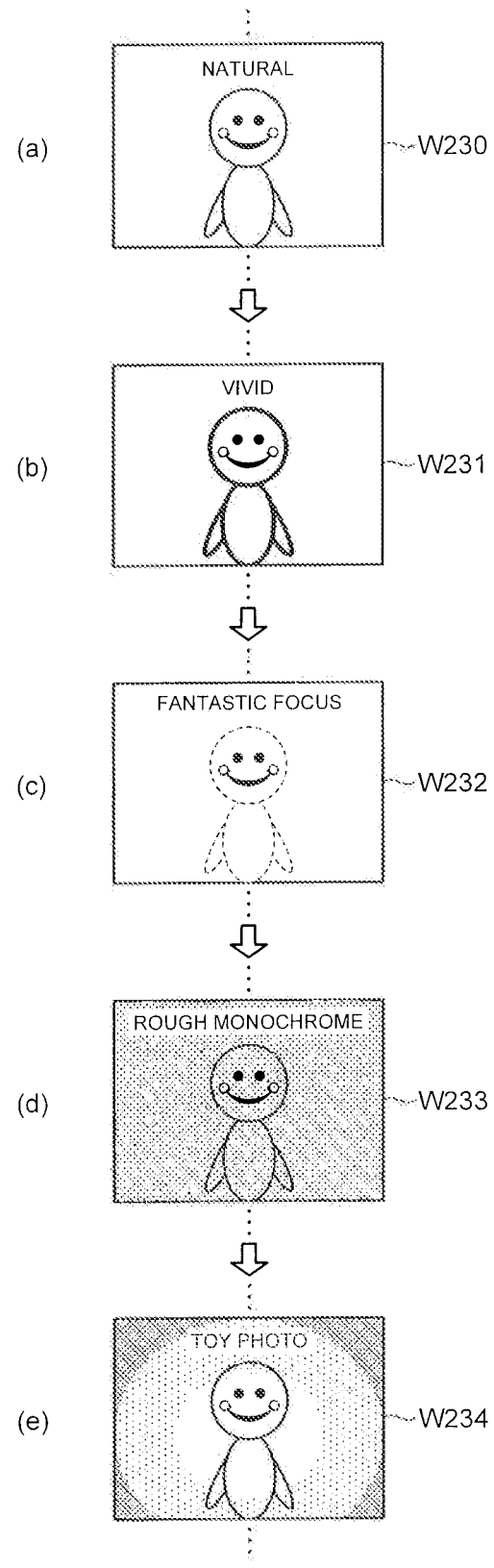
FIG. 19 shows an example of a live-view image that a display controller according to the third embodiment of the present invention controls the display unit to display.

FIG. 19 shows an example of a live-view image that the display controller 293 controls the display unit 21 to display. In FIG. 19, typical images W230 to W234 on which processes corresponding to the respective process items are executed by the image processor 16 among live-view images sequentially displayed in the display unit 21 in a chronological order are shown. It is assumed that there are a plurality of images are present in-between among the images W230 to W234. Besides, the processes corresponding to the same process items as those on the images W101 to W104 explained above are executed on the images W231 to W234.

As shown in FIG. 19, the display controller 293 controls the display unit 21 to sequentially display live-view images corresponding to image data on which the processes corresponding to the process items are executed by the image processor 16 in a chronological order in accordance with the order of the processes set in the manner explained above by the image process setting unit 291 (FIG. 19(a)→FIG. 19(b)→FIG. 19(c)→FIG. 19(d)→FIG. 19(e)). Besides, the display controller 293 executes a control of superimposing and displaying information concerning the names of the process items executed on respective live-view images sequentially displayed in the display unit 21 ("NATURAL"→"VIVID"→"FANTASTIC FOCUS"→"ROUGH MONOCHROME"→"TOY PHOTO").

In this manner, by the sequential switching of the live-view images displayed in the display unit 21, the user is able to grasp intuitively effects of the processes corresponding to the process items set in the picture bracketing mode. Moreover, the user is able to grasp intuitively effects among images since the display controller 293 controls the display unit 21 to display live-view images in the order in which images look visually different. Furthermore, since the relation between the effects of the special effect processes and the names of the process items of the special effect processes becomes definite, the user is able to grasp intuitively a special effect process the user likes or a special effect process the use does not like even in the case where a plurality of special effect process images are displayed in a short time in a random order.

After step S505, the control unit 29 determines whether or not a predetermined time has elapsed in the image process being executed by the image processor 16 on the live-view image displayed in the display unit 21 (step S506). When the control unit 29 determines that the predetermined time has elapsed in the image process being executed by the image processor 16 ("Yes" at step S506), the imaging apparatus 1 moves to step S507. On the other hand, when the control unit 29 determines that the predetermined time has not elapsed in the image process being executed by the image processor 16 ("No" at step S506), the imaging apparatus 1 returns to the main routine shown in FIG. 6.

At step 507, the image process setting unit 291 changes the process that the image processor 16 is made to execute in accordance with the order set at step S503. After that, the imaging apparatus 1 returns to the main routine shown in FIG. 6.

Next, a case where the setting flag for the picture bracketing mode in the imaging apparatus 1 is not ON state ("No" at step S501) will be explained. In this case, the imaging apparatus 1 executes steps S508 and S509 and returns to the main routine shown in FIG. 6. Here, the steps S508 and S509 respectively correspond to the steps S410 and S411 explained in FIG. 15 and therefore an explanation thereof will be omitted here.

Figure 20:
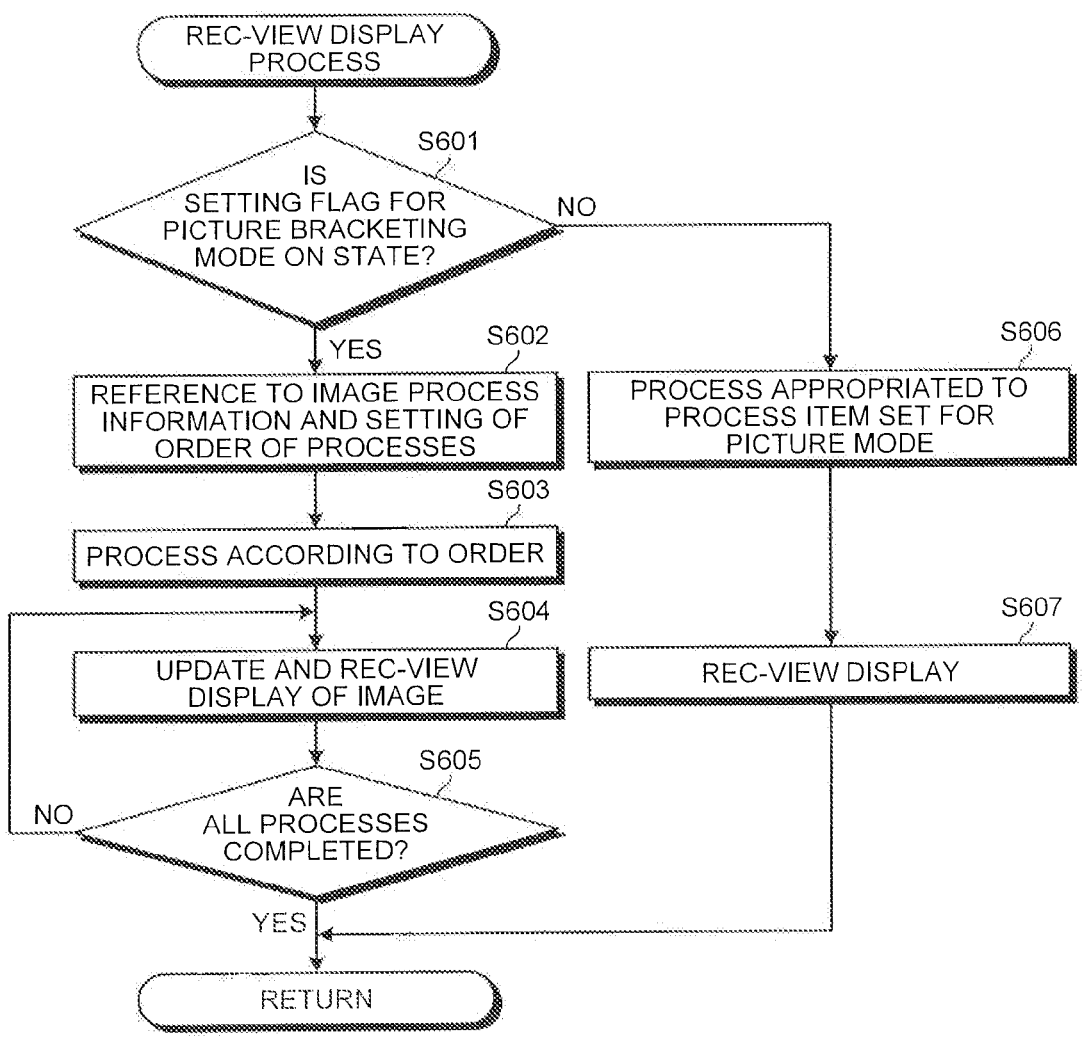
FIG. 20 is a flowchart of an outline of a rec-view display process by the imaging apparatus according to the third embodiment of the present invention.

Next, a rec-view display process executed by the imaging apparatus 1 according to the third embodiment will be explained. FIG. 20 is a flowchart of an outline of a rec-view display process (step S114 in FIG. 6) executed by the imaging apparatus 1 according to the third embodiment.

As shown in FIG. 20, a case where the setting flag for the picture bracketing mode in the imaging apparatus 1 is ON state ("Yes" at step S601) will be explained. In this case, the image process setting unit 291 refers the image process information table T2 recorded in the image process information recorder 301 and sets an order of the processes corresponding to the plurality of process items set in the picture mode and the picture bracketing mode (step S602). Specifically, the image process setting unit 291 refers to the image process information table T2 recorded in the image process information recorder 310 and sets an order or the processes so that all elements in the visual information are not successive.

The image process controller 292 then controls the image processor 16 to execute the respective processes corresponding to the plurality of process items in accordance with the order of the processes set by the image process setting unit 291 on the image data (step S603). For example, the image processor 16 executes the process items in the order "VIVID"→"FANTASTIC FOCUS"→"ROUGH MONOCHROME"→"TOY PHOTO". By this configuration, the imaging apparatus 1 is capable of generating plural pieces of image data on which the plurality of special effect processes and the finish effect processes are executed by the image processor 16.

The display controller 293 then executes an update of respective images corresponding to the plural pieces of image data on which the plurality of special effect processes or finish effect processes are executed by the image processor 16 for every predetermined time (two seconds, for example) and controls the display unit 21 to execute the rec-view display (step S604). Specifically, the display controller 293 controls the display unit 21 to display, in the rec-view for every predetermined time, each image corresponding to each of the plural pieces of image data generated via the plurality of special effect processes or finish effect processes executed by the image processor 16 on the shot image data, as shown in FIG. 19. By this configuration, the user is able to check an image generated via the special effect processes or the finish effect processes executed on the shot image by the rec-view display without a reproduction display of the shot image by setting the reproduction mode in the imaging apparatus 1 whenever an image is shot.

After that, the control unit 29 determines whether or not the image processor 16 has completed all of the processes corresponding to the plurality of process items set by the image process setting unit 291 (step S605). When the control unit 29 determines that all of the processes have been completed ("Yes" at step 605), the imaging apparatus 1 returns to the main routine shown in FIG. 6. On the other hand, when the control unit 29 determines that air of the processes have not been completed ("No" at step S605), the imaging apparatus 1 returns to step S604.

Next, a case where the setting flag for the picture bracketing mode in the imaging apparatus 1 is not ON state ("No" at step S601) will be explained. In this case, the imaging apparatus 1 executes steps S606 and S607 and the imaging apparatus 1 returns to the main routine shown in FIG. 6. Here, the steps S606 and S607 respectively correspond to the steps S410 and S411 explained in FIG. 15 and therefore an explanation thereof will be omitted here.

According to the third embodiment of the present invention explained so far, the image process setting unit 291 refers to the image process information table T2 recorded by the image process information recorder 301 and sets in the image processor 16 processes corresponding to the plurality of process items set in the picture mode and the picture bracketing mode in a different order so that all elements in the visual information are not successive, and the display controller 293 controls the display unit 21 to display live-view images corresponding to the plural pieces of image data to which the plurality of special effect processes and finish effect processes are executed by the image processor 16. By this configuration, the user is able to perform a shooting while looking at a live-view image displayed in the display unit 21 and checking differences in visual effects of the special effect processes and the finish effect processes set in the picture mode and the picture bracketing mode easily.

According to the third embodiment, the image process setting unit 291 refers to the image process information table T2 recorded by the image process information recorder 301 and sets in the image processor 16 respective processes corresponding to the plurality of process items set in the picture mode and the picture bracketing mode in a different order so that all elements in the visual information are not successive, and the display controller 293 controls the display unit 21 to execute the rec-view display of, in an order in which processes are completed, images corresponding to plural pieces of image data on which the plurality of special effect processes and finish effect processes are executed by the image processor 16. By this configuration, the user is able to check the differences in visual effects of the special effect processes and the finish effect processes set in the picture mode and the picture bracketing mode easily while looking at an image displayed in the rec-view in the display unit 21 without a reproduction display of the shot image by setting the reproduction mode in the imaging apparatus 1.

First Modification of the Third Embodiment

In the third embodiment explained above, the display controller 293 may change a method of displaying a live-view image corresponding to image data on which a process is executed by the image processor 16.

Figure 21:
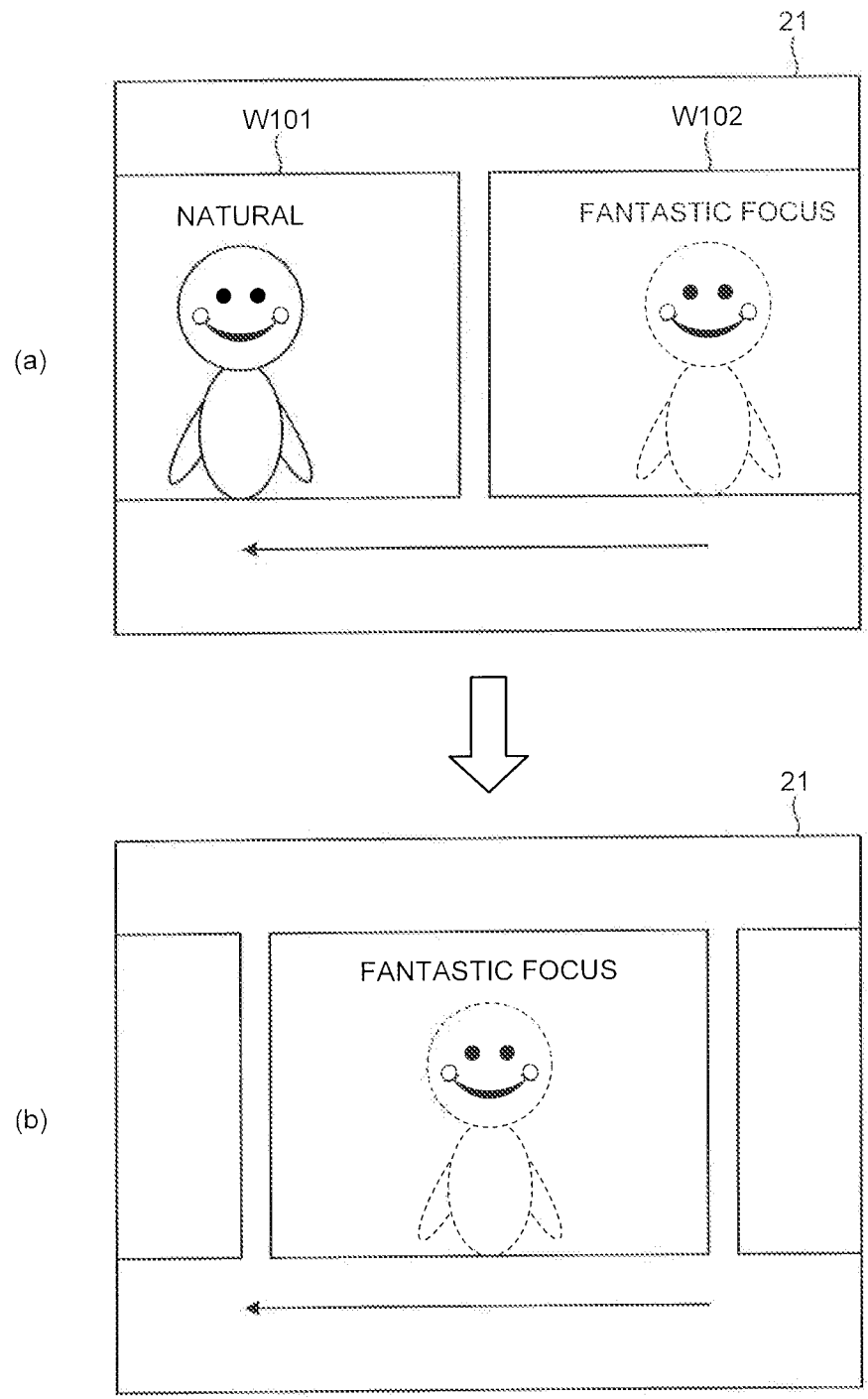
FIG. 21 shows an example of a live-view image that a display controller according to a first modification of the third embodiment of the present invention controls the display unit to display.

FIG. 21 shows an example a live-view image that the display controller 293 according to a first modification of the third embodiment of the present invention controls the display unit 21 to display. In FIG. 21, one typical image among live-view images sequentially displayed in the display unit 21 along a chronological order is shown.

As shown in FIG. 21, the display controller 293 controls the display unit 21 to display live-view images corresponding to the image data on which special effect processes and finish effect processes are executed by the image processor 16 while scrolling (moving) the display window from the right to the left in the display unit 21 (FIG. 21(a)→FIG. 21(b)). In this case, the image processor 16 generates two pieces of image data on which processes corresponding to process items set in the picture bracketing node are executed. By this configuration, the user is able to perform a shooting while comparing visual effects of the special effect processes or the finish effect processes set in the picture mode and the picture bracketing mode. Besides, the display controller 293 may control the display unit 21 to sequentially display, in the rec-view, images corresponding to image data on which the special effect processes or the finish effect processes are executed by the image processor 16 with the display window of the display unit 21 scrolled (moved) from the right to the left. Moreover, the display controller 293 may execute a control of displaying a name of a process item of a special effect process or a finish effect process which is executed on the image displayed in the display unit 21.

Fourth Embodiment

Next, a fourth embodiment of the present invention will be explained. A fourth embodiment of the present invention has a difference only in the rec-view display process executed by the imaging apparatus according to the first embodiment explained above. Therefore, only a rec-view display process executed by an imaging apparatus according to the fourth embodiment of the present invention will be explained below.

Figure 22:
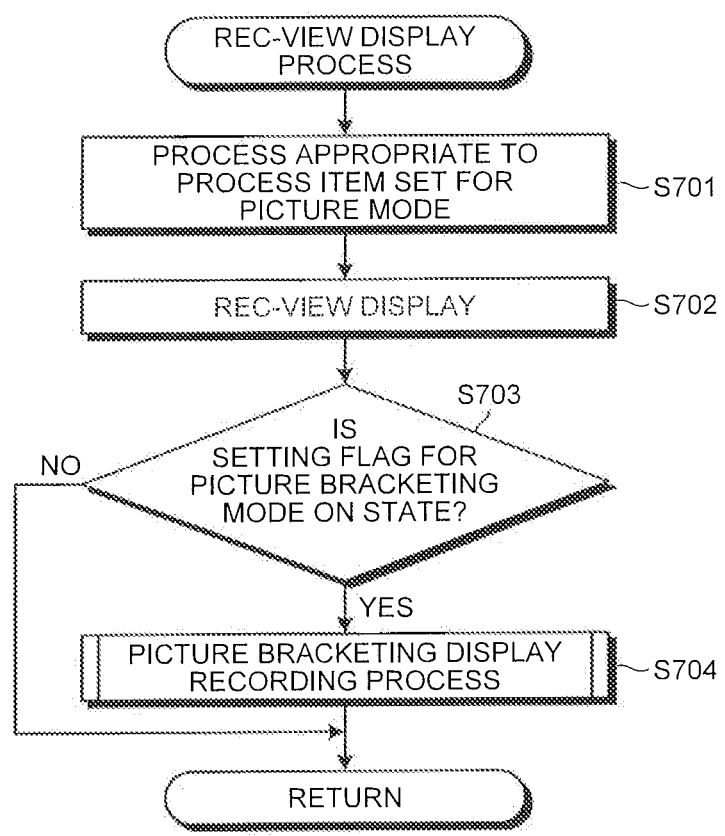
FIG. 22 is a flowchart of an outline of a rec-view display process by an imaging apparatus according to a fourth embodiment of the present invention.

FIG. 22 is a flowchart of an outline of a rec-view display process (step S114 in FIG. 6) executed by an imaging apparatus according to the fourth embodiment of the present invention.

As shown in FIG. 22, the image process controller 292 controls the image processor 16 to execute a process appropriate to a process item set in the image processor 16 in the picture mode by the image process setting unit 291 (step S701).

The display controller 293 then controls the display unit 21 to display an image corresponding to the image data on which the process corresponding to the process item is executed by the image processor 16 for a predetermined time (two seconds, for example) in the rec-view (step S702).

After that, the control unit 29 determines whether or not the setting flag for the picture bracketing mode in the imaging apparatus 1 is ON state (step S703). When the control unit 29 determines that the setting flag for the picture bracketing mode in the imaging apparatus 1 is ON state ("Yes" at step S703), the imaging apparatus 1 executes a picture bracketing display recording process in which a rec-view display of respective images corresponding to plural pieces of image data on which respective processes corresponding to the plurality of process items set in the image processor 16 in the picture bracketing mode by the image process setting unit 291 are executed is made on a live-view image displayed in the display unit 21 (step S704). A detail of the picture bracketing display recording process will be explained later. The imaging apparatus 1 returns to the main routine shown in FIG. 6 after step S704.

At step S703, a case where the setting flag for the picture bracketing mode in the imaging apparatus 1 is not ON state ("No" at step S703) will be explained. In this case, the imaging apparatus 1 returns to the main routine shown in FIG. 6.

Figure 23:
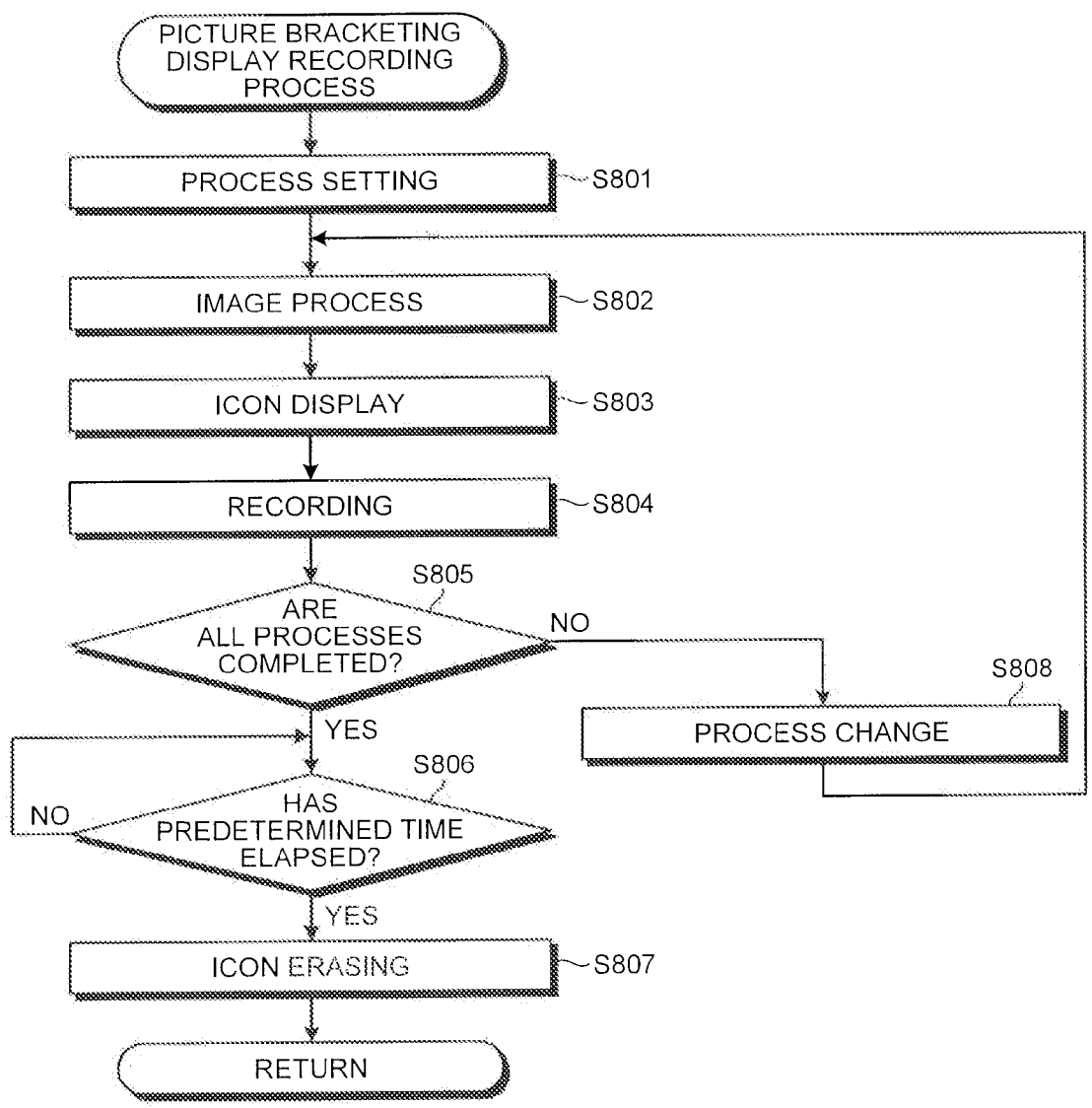
FIG. 23 is a flowchart of an outline of the picture bracketing display recording process shown.

Next, the picture bracketing display recording process at step S704 shown in FIG. 22 will be explained. FIG. 23 is a flowchart of an outline of the picture bracketing display recording process.

As shown in FIG. 23, image process setting unit 291 sets in the image processor 16 processes corresponding to process items set in the picture bracketing mode (step S801).

The image process controller 292 then controls the image processor 16 to execute the process corresponding to the process item set by the image process setting unit 291 on the image data (step S802).

After that, the display controller 293 reduces (resizes) the images corresponding to the image data on which the special effect processes or the finish effect processes are executed by the image processor 16 by a predetermined magnification and executes a control of superimposing and displaying the reduced images as icons on the live-view image displayed in the display unit 21 (step S803). Specifically, the display controller 293 controls the display unit 21 to display images on which the same process as shown in FIG. 8 are executed. When the display unit 21 displays reduced images obtain by reducing images corresponding to plural pieces of image data on which the plurality of image processes set in the picture bracketing mode are executed on the live-view image, the display controller 293 may control the display unit 21 to display icons instead of the reduced images.

The image process controller 292 then controls the SDRAM 25 to record the image data on which the processes corresponding to the process items are executed by the image processor 16 (step S804).

After that, the control unit 29 determines whether or not the image processor 16 has completed all of the processes set by the image process setting unit 291 (step S805). When the control unit 29 determines that all of the processes set by the image process setting unit 291 have been completed ("Yes" at step S805), the imaging apparatus 1 moves to step S806 which will be explained later. On the other hand, when the control unit 29 determines that all of the processes set by the image process setting unit 291 have not been completed ("No" at step S805), the imaging apparatus 1 moves to step S808 which will be explained later.

At step S806, the control unit 29 determines whether or not a predetermined time (three seconds, for example) has elapsed after superimposing and displaying the icons on the live-view image displayed in the display unit 21 (step S806). When the control unit 29 determines that the predetermined time has not elapsed ("No" at step S806), the control unit 29 repeats the determination at step S806. On the other hand, when the control unit 29 determines that the predetermined time has elapsed ("Yes" at step S806), the imaging apparatus 1 moves to step S807.

The display controller 293 then erases all of the icons superimposed and displayed on the live-view image displayed in the display unit 21 (step S807) and the imaging apparatus 1 returns to the main routine shown in FIG. 6.

At step S805, a case where the control unit 29 determines that all of the processes set by the image process setting unit 291 have not been completed ("No" at step S805) will be explained. In this case, the image process setting unit 291 changes a process that the image processor 16 is made to execute depending on process items which are set in the picture bracketing mode and have not been executed yet (step S808), and the imaging apparatus 1 returns to step S802.

According to the fourth embodiment of the present invention explained so far, the display controller 293 reduces images corresponding to image data on which special effect processes or finish effect processes are executed by the image processor 16 by a predetermined magnification and executes a control of superimposing and displaying the reduced image as icons on the live-view image displayed in the display unit 21. By this configuration, the display controller 293 is capable of controlling the display unit 21 to display a live-view image. As a result of this, the user is able to adjust an angle of field and a composition to be shot while checking the image on which a process is executed.

Besides, according to the fourth embodiment, it is possible to check visual effects of the processes corresponding to the respective process items set in the picture mode and the picture bracketing mode while looking at the icons on the live-view image displayed in the display unit 21 without a reproduction display of the shot image by setting the reproduction mode in the imaging apparatus 1. As a result of this, the user is able to determine whether or not re-shooting is needed promptly.

Fifth Embodiment

Next, a fifth embodiment of the present invention will be explained. The fifth embodiment is different from the first embodiment in the process executed by the imaging apparatus. Therefore, only a process to be executed by an imaging apparatus according to the fifth embodiment will be explained below. Here, the same part as that in the first embodiment explained above will be assigned with the same reference symbol in the explanation.

Figure 24:
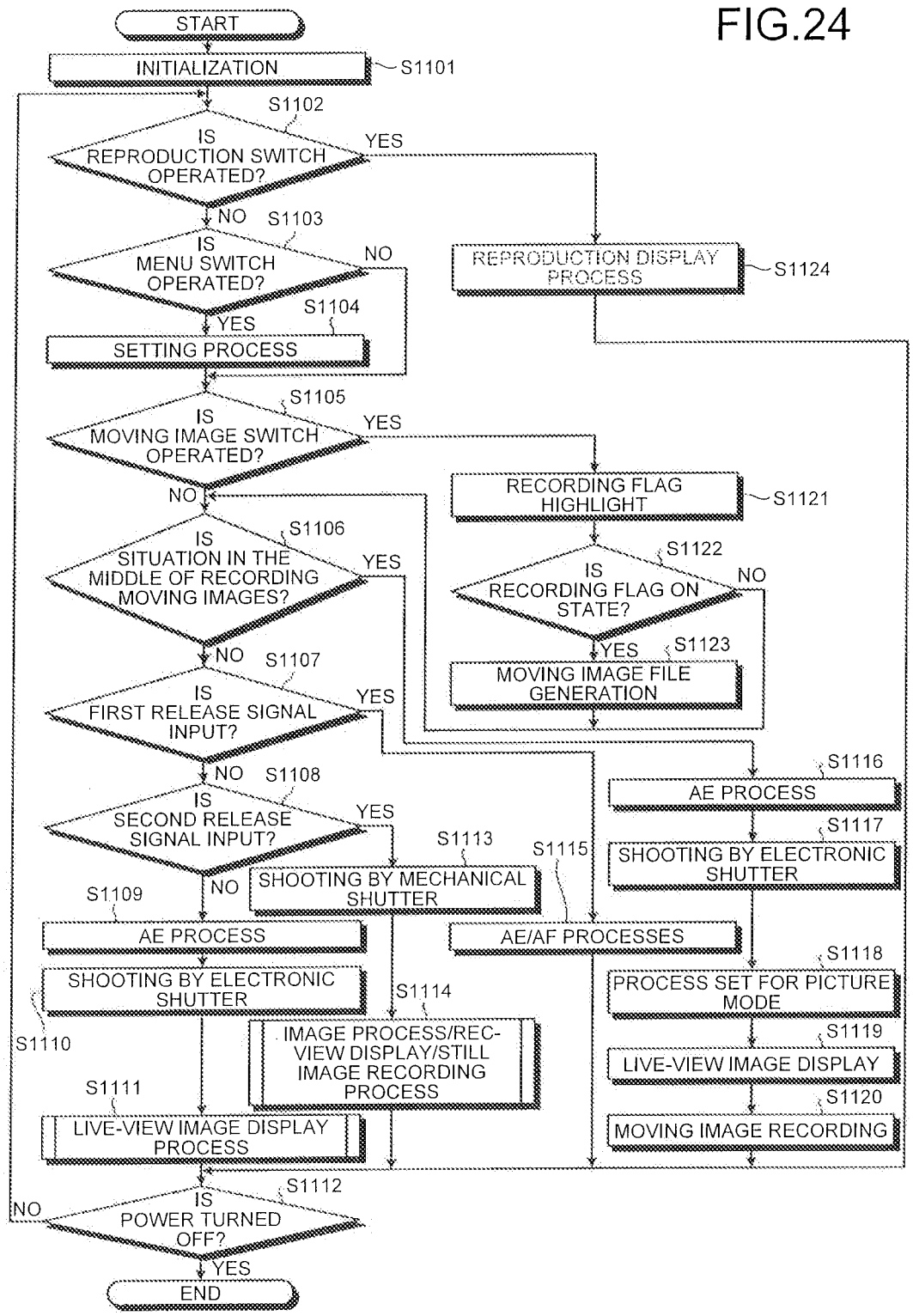
FIG. 24 is a flowchart of an outline of a process executed by an imaging apparatus according to a fifth embodiment of the present invention.

FIG. 24 is a flowchart of an outline of a process executed by an imaging apparatus 1 according to the fifth embodiment.

As shown in FIG. 24, when the power source switch 201 is operated by the user and the power of the imaging apparatus is turned on, the control unit 29 initializes the imaging apparatus 1 (step S1101). Specifically, the control unit 29 executes an initialization of turning the recording flag that indicates being in the middle of recording moving images to OFF state. The recording flag becomes ON state while shooting moving images and OFF state while not shooting moving images.

Then, when the menu switch 205 is operated ("Yes" at step S1103) without the operation of the reproduction switch 206 ("No" at step S1102), the imaging apparatus 1 displays the menu window W1 explained above (see FIG. 4), executes a setting process of setting various conditions of the imaging apparatus 1 in response to a selecting operation by the user (step S1104), and moves to step S1105.

On the other hand, when the menu switch 205 is not operated ("No" at step S1103) without the operation of the reproduction switch 206 ("No" at step S1102), the imaging apparatus 1 moves to step S1105.

The control unit 29 then determines whether or not the moving image switch 207 is operated (step S1105). When the control unit 29 determines that the moving image switch 207 is operated ("Yes" at step S1105), the imaging apparatus 1 moves to step S1121 which will be explained later. On the other hand, when the control unit 29 determines that the moving image switch 207 is not operated ("No" at step S1105), the imaging apparatus 1 moves to step S1106 which will be explained later.

At step S1106, when the first release signal is input from the release switch 202 ("Yes" at step S1107) in the situation where the imaging apparatus 1 is not in the middle of recording moving images ("No" at step S1106), the imaging apparatus 1 moves to step S1115 which will be explained later. On the other hand, when the first release signal is not input via the release switch 202 ("No" at step S1107), the imaging apparatus 1 moves to step S1108 which will be explained later.

At step S1108, a case where the second release signal is not input via the release switch 202 ("No" at step S1108) will be explained. In this case, the control unit 29 controls the AE processor 17 to execute an AE process of adjusting exposure (step S1109).

The control unit 29 then drives the imaging element driver 13 to execute a shooting by the electronic shutter (step S1110).

After that, the imaging apparatus 1 executes the live-view image display process by which the display unit 21 is made to display a live-view image corresponding to image data generated by the imaging element 12 by the shooting by the electronic shutter (step S1111). Specifically when the picture mode is set by the image process setting unit 291, the imaging apparatus 1 makes the image processor 16 execute an image process corresponding to the process item set in the picture mode on the shot image data and makes the display unit 21 display a live-view image corresponding to the finish effect image data. When the picture bracketing mode is set by the image process setting unit 291, the imaging apparatus 1 makes the image processor 16 execute a plurality of image processes corresponding to the process items set in the picture bracketing mode on the shot image data and makes the display unit 21 perform a display by combining the live-view image corresponding to the image data on which the process item set in the picture mode is executed with a plurality of images appropriate to the plurality of respective process items set in the picture bracketing mode.

The control unit 29 then determines whether or not the power of the imaging apparatus 1 is turned off by the operation of the power source switch 201 (step S1112). When the control unit 29 determines that the power of the imaging apparatus 1 is turned off ("Yes" at step S1112), the imaging apparatus 1 ends the process. On the other hand, when the control unit 29 determines that the power of the imaging apparatus 1 is not turned off ("No" at step S1112), the imaging apparatus 1 returns to step S1102.

At step S1108, a case where the second release signal is input from the release switch 202 ("Yes" step S1108) will be explained. In this case, the control 29 drives the shutter driver 11 and the imaging element driver 13 to execute a shooting by the mechanical shutter (step S1113).

The imaging apparatus 1 then executes an image process/rec-view display/still image recording process in which the set image process is executed on the shot image data and the rec-view display is executed only for a predetermined time (three seconds, for example), then the image compression decompression unit 19 is made to compress the image data in the JEPG format, and the storage medium 23 is made to record the compressed image data (step S1114). A detail of the image process/rec-view display/still image recording process will be explained later. After step S1114, the imaging apparatus 1 moves to step S1112.

At step S1107, a case where the first release signal is input from the release switch 202 ("Yes" at step S1107) will be explained. In this case, the control unit 29 controls the AE processor 17 to execute an AE process of adjusting exposure and the AF processor 18 to execute an AF process of adjusting a point of focus (step S1115). After that, the imaging apparatus 1 moves to step S1112.

At step S1106, a case where the imaging apparatus 1 is in the middle of recording moving images ("Yes" at step S1106) will be explained. In this case, the control unit 29 controls the AE processor 17 to execute the AE process of adjusting exposure (step S1116).

The control unit 29 then drives the imaging element driver 13 to execute a shooting by the electronic shutter (step S1117).

After that, the image process controller 292 controls the image processor 16 to execute a process corresponding to the process item set in the picture mode on the image data (step S1118). For example, when the process item "VIVID" of the finish processes is set in the picture mode, the image process controller 292 controls the basic image processor 161 to execute a finish process corresponding to the "VIVID" on the image data. Besides, when the process item "FANTASTIC FOCUS" of the special effect processes is set in the picture mode, the image process controller 292 controls the special effect image processor 162 to execute a special effect process corresponding to the "FANTASTIC FOCUS" on the image data.

The display controller 293 then controls the display unit 21 to display a live-view image corresponding to the image data on which the image process is executed by the image processor 16 (step S1119).

After that, the control unit 29 controls the image compression decompression unit 19 to compress the image data and controls the storage medium 23 to record the compressed image data a moving image file generated therein as moving images (step S1120). After that, the imaging apparatus 1 moves to step S1112.

At step S1105, a case where the moving image switch 207 is operated ("Yes" at step S1105) will be explained. In this case, the control unit 29 highlights the recording flag indicating being at ON state and in the middle of recording moving images (step S1121).

The control unit 29 then determines whether or not the recording flag recorded in the SDRAM 25 is ON state (step S1122). When the control unit 29 determines that the recording flag is ON state ("Yes" at step S1122), the control unit 29 generates, in the storage medium 23, a moving image file for recording image data in the storage medium 23 in a chronological order (step S1123), and the imaging apparatus 1 moves to step S1106. On the other hand, when the control unit 29 determines that the recording flag is not ON state ("No" at step S1122), the imaging apparatus 1 moves to step S1106.

At step S1102, a case where the reproduction switch 206 is operated ("Yes" at step S1102) will be explained. In this case, the display controller 293 executes a reproduction display process of obtaining image data from the storage medium 23 via the bus 28 and the memory I/F 24 and controlling the image compression decompression unit 19 to decompress the obtained image data and the display unit to display the image data (step S1124). After that, the imaging apparatus 1 moves to step S1112.

Figure 25:
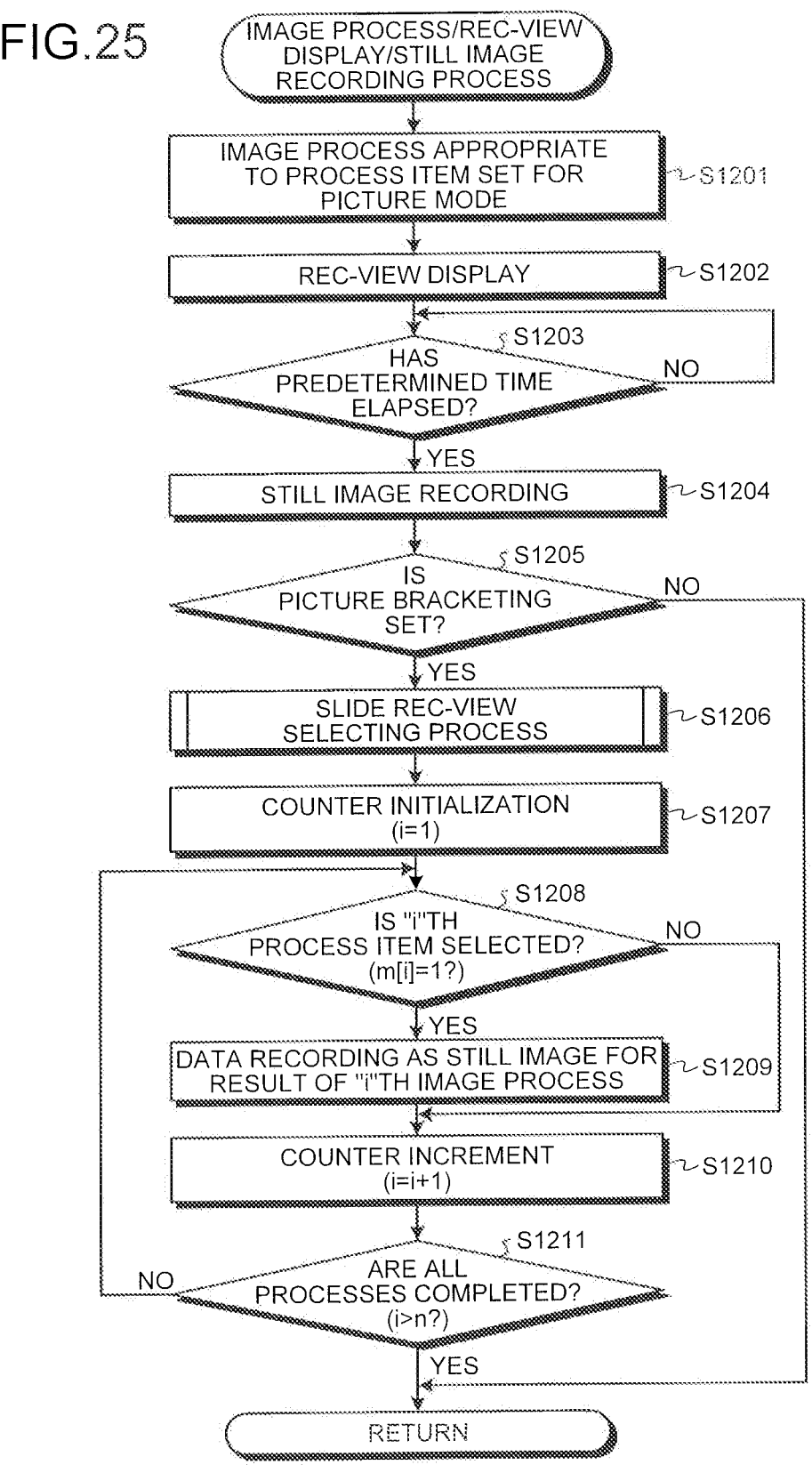
FIG. 25 is a flowchart of an outline of the image process/rec-view display/still image recording process in FIG. 24.

Next, the image process rec-view display/still image recording process at step S1114 in FIG. 24 will be explained. FIG. 25 is a flowchart of an outline of the image process/rec-view display/still image recording process explained with reference to FIG. 24.

As shown in FIG. 25, the image processor 16 executes an image process appropriate to the process item set in the cure mode on the image data (step S1201). Specifically, the image processor 16 obtains image data (raw data) from the SDRAM 25 via the bus 28, executes a process appropriate to the process item set by the image process setting unit 291 in the picture mode on the obtained image data, and outputs the image data to the SDRAM 25.

The display controller 293 then controls the display unit 21 to display an image corresponding to the image data on which the process appropriate to the process item set in the picture mode is executed by the image processor 16 in the rec-view (step S1202).

After that, the control unit 29 determines whether or not a predetermined time (three seconds, for example) has elapsed after the display unit 21 executes the rec-view display of the image (step S1203). When the control unit 29 determines that the predetermined time has elapsed after the display unit 21 executes the rec-view display of the image ("Yes" at step S1203), the imaging apparatus 1 moves to step S1204. On the other hand, when the control unit 29 determines that the predetermined time has not elapsed after the display unit 21 executes the rec-view display of the image ("No" at step S1203), the imaging apparatus 1 continues this determination.

At step S1204, the control unit 29 controls the image compression decompression unit 19 to compress the image data on which the image process is executed by the image processor 16 in the JEPG format and the storage medium 23 to record the compressed image data as a still image. Here, control unit 29 may control the storage medium 23 to record the image data compressed in the JEPG format by the image compression decompression unit 19 by making the compressed image data associated with raw data on which no image process is executed by the image processor 16.

The control unit 29 then determines whether or not the picture bracketing mode is set (step S1205). Specifically, the control unit 29 determines whether or not the setting flag for the picture bracketing mode is ON state. When the control unit 29 determines that the picture bracketing mode is set ("Yes" step S1205), the imaging apparatus 1 moves to step S1206 which will be explained later. On the other hand, when the control unit 29 determines that the picture bracketing mode is not set ("No" at step S1205), the imaging apparatus 1 returns to the main routine in FIG. 24.

At step S1206, slide rec-view selecting process of selecting a process items set in the picture bracketing mode is executed (step S1206).

Figure 26:
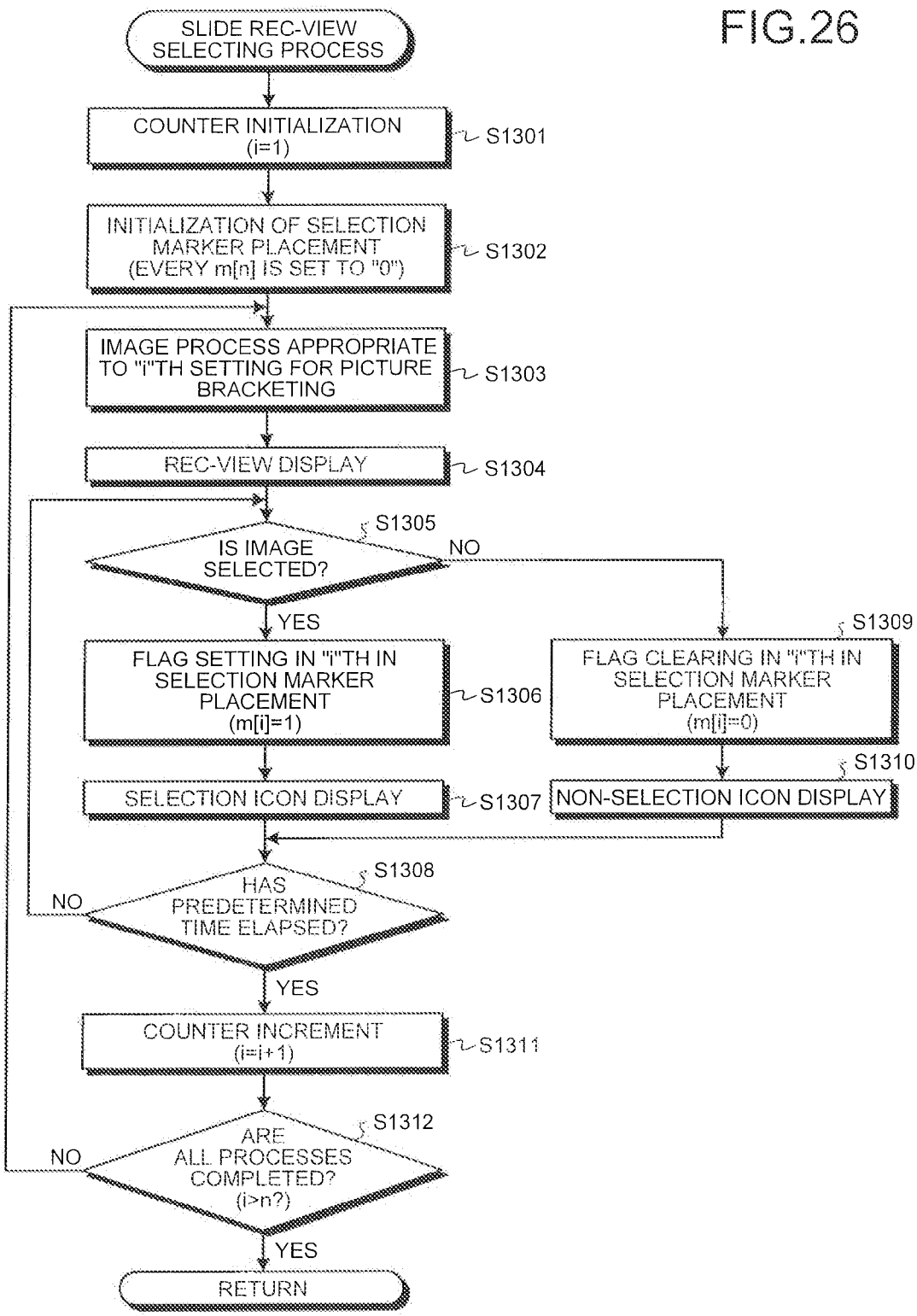
FIG. 26 is flowchart of an outline of the slide rec-view selecting process in FIG. 25.

FIG. 26 is a flowchart of an outline of the slide rec-view selecting process at step S1206 in FIG. 25.

As shown in FIG. 26, the control unit 29 initializes a counter which indicates an order of the process items set in the picture bracketing mode (step S1301). Specifically, the control unit 29 initializes the counter indicating the order of the process items set in the picture bracketing mode (i=1).

The control unit 29 then initializes a selection marker placement (step S1302). Specifically, the control unit 29 sets the recording flag to the effect that an image is to be recorded as a still image as OFF state (0) with respect to every process item (m[n]) set in the picture bracketing mode. Here, the symbol "n" indicates the total number of process items of the special effect processes set in the picture bracketing mode and the symbol "m" indicates a state of the recording flag of each process item.

After that, the control unit 29 controls the image processor 16 to execute an image process appropriate to the "i"th setting in the picture bracketing on the image data (step S1303). On this occasion, the control unit 29 records (stores) processed image data on which the image process appropriate to the "i"th setting in the picture bracketing is executed by the image processor 16 in the SDRAM 25.

The display controller 293 then controls the display unit 21 to display, in the rec-view, a processed image corresponding to the processed image data on which the image process appropriate to the "i"th setting in the picture bracketing is executed by the image processor 16 (step S1304).

After that, the control unit 29 determines whether or not the processed image displayed in the rec-view in the display unit 21 is selected via the touchscreen 208 or the operation switch 204 (step S1305). When the processed image displayed in the rec-view in the display unit 21 is selected ("Yes" at step S1305), the control unit 29 sets the recording flag (m[i]=1) at the "i"th of the selection marker placement (step S1306).

The display controller 293 then controls the display unit 21 to display a selection icon indicating being selected (step S1307).

After that, the control unit 29 determines whether or not a predetermined time (two seconds, for example) has elapsed after the display unit 21 executes the rec-view display of the processed image corresponding to the processed image data on which the image process is executed by the image processor 16 (step S1308). When the control unit 29 determines that the predetermined time has elapsed after the display unit 21 executes the rec-view display of the processed image corresponding to the processed image data on which the image process is executed by the image processor 16 ("Yes" at step S1308), the imaging apparatus 1 moves to step S1311 which will be explained later. On the other hand, when the control unit 29 determines that the predetermined time has not elapsed after the display unit 21 executes the rec-view display of the processed image corresponding to the processed image data on which the image process is executed by the image processor 16 ("No" at step S1308), the imaging apparatus 1 returns to step S1305.

At step S1305, a case where the processed image displayed in the rec-view in the display unit 21 is not selected ("No" at step S1305) will be explained. In this case, the control unit 29 sets the "i"th recording flag in the selection marker placement as being clear (m[i]=0) (step S1309).

The display controller 293 then controls the display unit 21 to display a non-selection icon indicating not being selected (step S1310) and the imaging apparatus 1 moves to step S1308.

Figure 27:
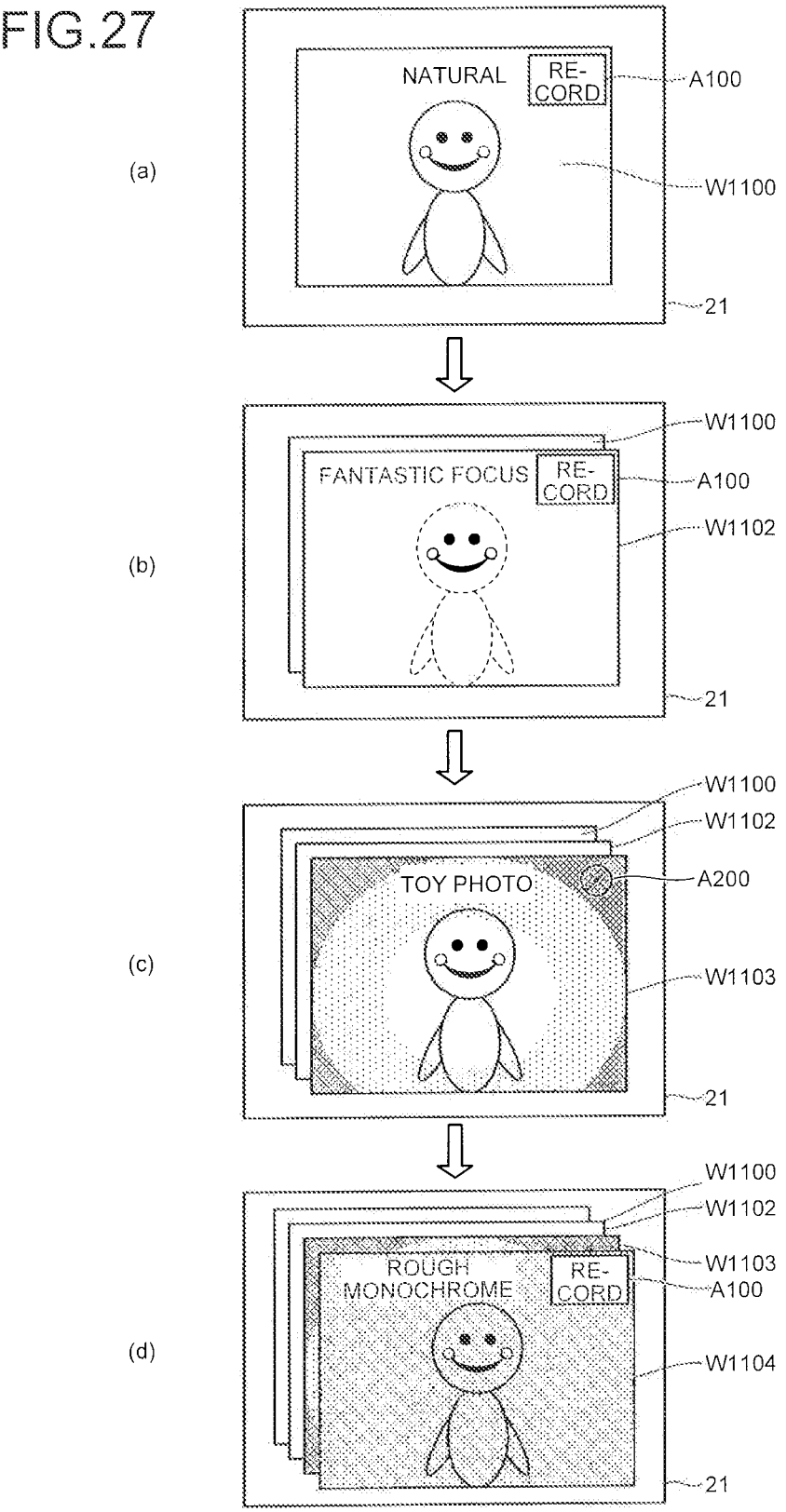
FIG. 27 shows an example of a rec-view image that a display controller controls the display unit to display in the slide rec-view selecting process executed by the imaging apparatus according to the fifth embodiment of the present invention.

FIG. 27 shows an example of a rec-view image that the display controller 293 controls the display unit 21 to display in the slide rec-view selecting process. In FIG. 27, a case where the number of process items set in the picture bracketing is four will be explained.

As shown in FIG. 27, the display controller 293 controls the display unit 21 to sequentially display, by superimposing with a gradual shift from the left on the display window of the display unit 21, processed images W1100 to W1104 generated by the image processor 16 (FIG. 27(*a*)→FIG. 27(*b*) →FIG. 27(*c*)→FIG. 27(*d*)).

In the case shown in FIG. 27, when an instruction signal of executing a selection is input via the touchscreen 208 or the operation switch 204, the display controller 293 controls the display unit 21 to superimpose and display a selection icon A100 on a current image. Specifically, when the instruction signal of selecting the processed image W1100 is input from the operation switch 204 in a situation where the display unit 21 is made to display the processed image W1100, the display controller 293 controls the display unit 21 to superimpose and display the selection icon A100 on the processed image W1100. Besides, when the instruction signal of selecting the processed image W1103 is not input from the operation switch 204 in a situation where the display unit 21 is made to display the processed image W1103, the display controller 293 controls the display unit 21 to superimpose and display a non-selection icon A200 on the processed image W1103. Moreover, the display controller 293 may execute a control of superimposing and displaying information concerning the names of the process items executed on the processed images sequentially displayed in the display unit 21 ("NATURAL"→"FANTASTIC FOCUS"→"TOY PHOTO"→ "ROUGH MONOCHROME").

In FIG. 27, each time when the touchscreen 208 is touched or the operation switch 204 is operated by the user, the control unit 29 executes a switching between selection and non-selection. This configuration allows changing a setting regarding selection as long as it is within a predetermined time even when the user mistakes. Besides, an initial setting may be a state where all of the process items in the picture bracketing are selected. Moreover, an initial setting may be a state where no process items in the picture bracketing is selected. This setting allows only the rec-view display of a processed image in the display unit 21 unless the user operates. While the display controller 293 controls the display unit 21 to display, by superimposing with a gradual shift, the images W1100 to W1103 an FIG. 27, the display controller 293 may control the display unit 21 to display, by switching on the same display area of the display unit 21 for every predetermined time, the images W1100 to W1103.

In the processed image W1101 in FIG. 27, a contour of the subject is shown by a dashed line to express the process item "FANTASTIC FOCUS". Besides, in the processed image W1102, shading is provided around the subject and a noise (dot) is added around the subject to express the process item "TOY PHOTO". Moreover, in the processed image W1103, a noise (dot) is superimposed on an entirety of the image to express the process item "ROUGH MONOCHROME".

At step S1311, the control unit 29 increments a counter of the selected process item in the picture bracketing (i=i+1) and determines whether or not all of the processes for the process items set in the picture bracketing have been completed (i>n?) (step S1312). When the control unit 29 determines that all of the processes for the process items set in the picture bracketing have been completed ("Yes" at step S1312), the imaging apparatus 1 returns the image process/rec-view display/still image recording process in FIG. 25. On this occasion, the control unit 29 records a content of the recording flag of the selection marker placement [m] in the SDRAM 25. Besides, the image processor 16 may execute a next image process while the display unit 21 executes the rec-view display of a processed image. On the other hand, when the control unit 29 determines that all of the processes for the process items set in the picture bracketing have not been completed ("No" at step S1312), the imaging apparatus 1 returns to step S1303. On this occasion, the image processor 16 may execute a next image process while the display unit 21 executes the rec-view display of a processed image. Moreover, a next image process may be cancelled while the display unit 21 executes the rec-view display of a processed image, and when a planned image process to be processed is cancelled in the middle, remaining image processes may be executed and the selection or non-selection for the remaining image processes may be set without executing the rec-view display of the cancelled image process.

Returning to FIG. 25, an explanation from step S1207 will be made. At step S1207, the control unit 29 initializes a counter of a process item in the picture bracketing selected in the slide rec-view selecting process (i=1).

The control unit 29 then determines whether or not a selection of recording the "i"th process item as a still image (m[i]= 1?) is made (step S1208). Specifically, the control unit 29 determines whether or not the recording flag indicating a recording as a still image is set with respect to the current processed item. When the control unit 29 determines that the selection of the recording as a still image is made with respect to the "i"th process item ("Yes" at step S1208), the imaging apparatus 1 moves to step S1209. On the other hand, when the control unit 29 determines that the selection of the recording as a still image is not made with respect to the "i"th process item ("No" at step S1208), the imaging apparatus 1 moves to step S1210.

At step S1209, the image process controller 292 records processed image data corresponding to a result of the "i"th image process as a still image in the storage medium 23.

After that, the control unit 29 increments a counter (i=i+1) of the selected process item in the picture bracketing (step S1210) and determines whether or not all of the processes for the selected process items in the picture bracketing have been completed (i>n?) (step S1211). When the control unit 29 determines that all of the processes for the selected process items in the picture bracketing have been completed. ("Yes" at step S1211), the imaging apparatus 1 returns to the main routine in FIG. 24. On the other hand, when the control unit 29 determines that all of the processes for the selected process items in the picture bracketing have not been completed ("No" at step S1211), the imaging apparatus 1 returns to step S1208.

According to the fifth embodiment of the present invention explained so far, it is possible to set a process item in the picture bracketing regarding the picture bracketing mode while checking the rec-view display of each processed image displayed right after the shooting in the display unit 21 and to record a desired processed image in the storage medium 23.

Besides, according to the fifth embodiment of the present invention, it is possible, by checking the rec-view display of a processed image displayed right after the shooting in the display unit 21, to set and change the picture bracketing while determining whether or not a desired finish result is obtained easily.

First Modification of the Fifth Embodiment

Figure 28:
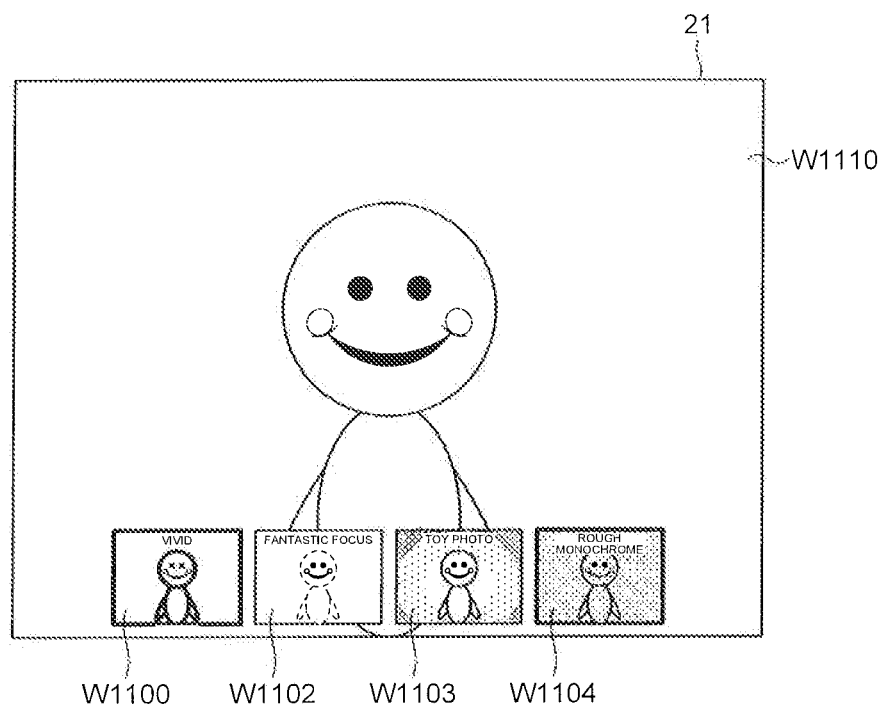
FIG. 28 is an explanatory view of a method of displaying, in rec-view, an image displayed in the display unit according to a first modification of the fifth embodiment of the present invention.

In the fifth embodiment, is possible to change the rec-view display of an image displayed in the display unit 21. FIG. 28 is an explanatory view of a method of displaying, in rec-view, an image displayed in the display unit according to a first modification of the fifth embodiment.

As shown in FIG. 28, the display controller 293 may control the display unit 21 to execute a rec-view display of, by superimposing on a live-view image W1110, processed images W1100 to W1104 generated by the image processor 16. On this occasion, when any one of the processed images W1100 to W1104 is selected via the touchscreen 208 or the operation switch 204, the display controller 293 may control the display unit 21 to display information which indicates recording as a still image with respect to the selected processed image. For example, when the user touches the processed image W1100 and the processed image w1104 via the touchscreen 208, the display unit 21 is controlled to display the processed image W1100 and the processed image W1104 with their outer edges thick as information to the effect of recording as a still image.

According to the first modification of the fifth embodiment of the present invention explained above, the user is able to perform a setting and a change regarding the picture bracketing intuitively while performing a comparison with other processed images.

In the first modification of the fifth embodiment, the display controller 293 may not only thicken an outer edge of a processed image which selected by the user and is to be recorded as a still image but also highlight the selected processed image or display an icon and the like on the processed image.

Second Modification of the Fifth Embodiment

Next, a second modification of the fifth embodiment of the present invention will be explained. A second modification of the fifth embodiment has a difference in the slide rec-view selecting process according to the fifth embodiment explained above. Therefore, a slide rec-view selecting process according to the second modification of the fifth embodiment will be explained below. Here, the same part as that in the first embodiment explained above will be assigned with the same reference symbol in the explanation.

Figure 29:
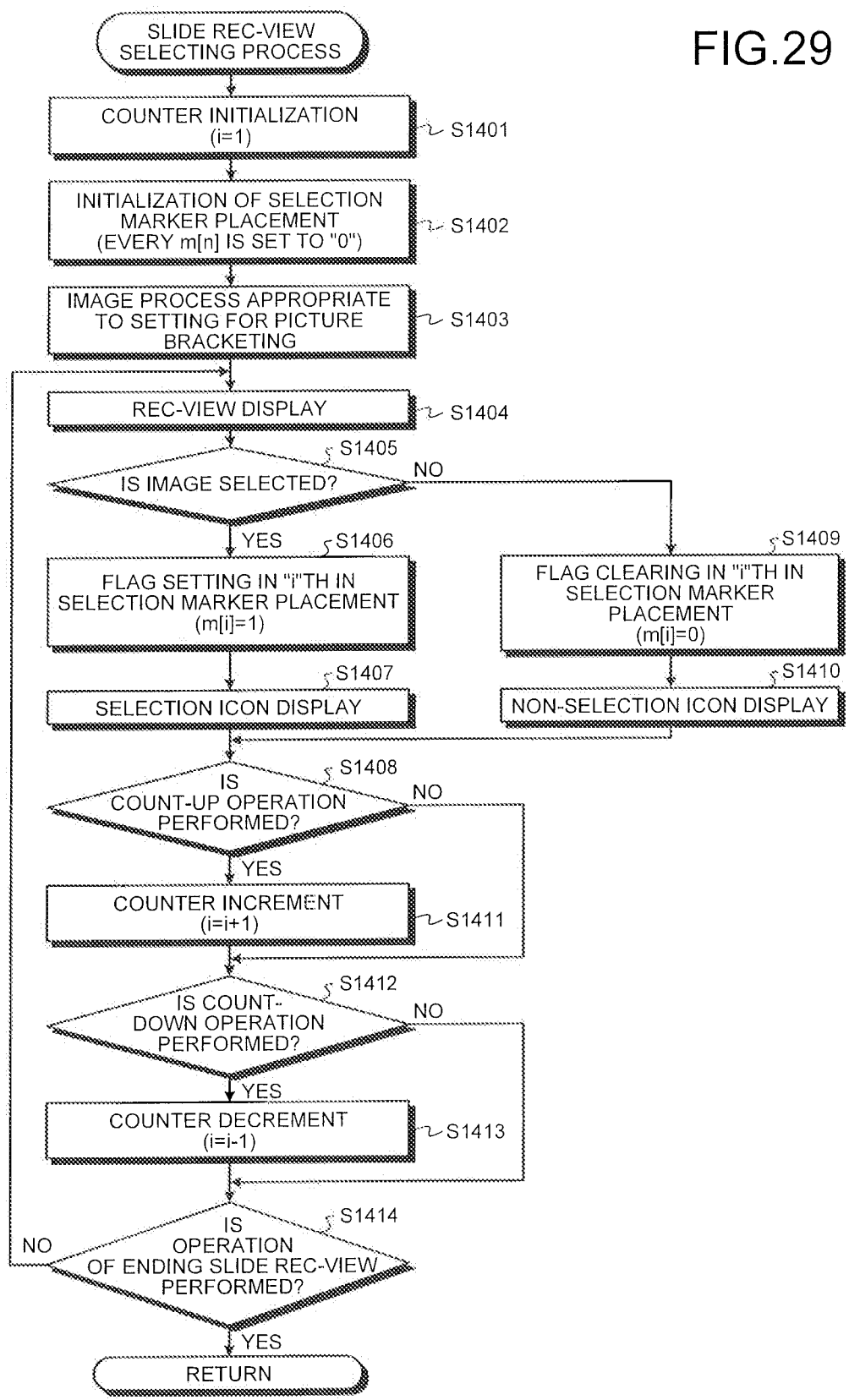
FIG. 29 is a flowchart of an outline of a slide rec-view selecting process executed by an imaging apparatus according to a second modification of the fifth embodiment of the present invention.

FIG. 29 is a flowchart of an outline of a slide rec-view selecting process (step S1206 in FIG. 25) executed by an imaging apparatus 1 according to the second modification of the fifth embodiment.

In FIG. 29, steps S1401 and S1402 respectively correspond to steps S1301 and S1302 in FIG. 26.

At step S1403, the control unit 29 controls the image processor 16 to execute image processes of all the process items appropriate to the setting in the picture bracketing on the image data (step S1403). Specifically, when "NATURAL", "FANTASTIC FOCUS", "TOY PHOTO", and "ROUGH MONOCHROME" are set for the picture bracketing, the control unit 29 controls the image processor 10 to execute all the process items to generate four processed images on which respective image processes are executed.

The display controller 293 then controls the display unit 21 to execute the rec-view display of, by sequentially switching for every predetermined time, all the processed images generated by the image processor 16 (see the images W1100 to W1103 in FIG. 27, for example) (step S1404).

Steps S1405 to S1407 respectively correspond to steps S1305 to 1307 in FIG. 26. Besides, steps S1409 and S1410 respectively correspond to steps S1309 and S1310 in FIG. 29.

At step S1408, the control unit 29 determines whether or not a count-up operation is executed. Specifically, the control unit 29 determines whether or not the up switch 204a of the operation switch 204 or the left switch 204c of the operation switch 204 is operated, or whether or not the lens operation unit 35 is rotated leftward. When the control unit 29 determines that the count-up operation is executed ("Yes" at step S1408), the imaging apparatus 1 moves to step S1411. On the other hand, when the control unit 29 determines that the count-up operation not executed ("No" at step S1408), the imaging apparatus 1 moves to step S1412.

At step S1411, the control unit 29 increments a counter of the selected process item in the picture bracketing (i=i+1).

The control unit 29 then determines whether or not a count-down operation is executed (step S1412). Specifically, when the control unit 29 determines that the count-down operation, in which whether or not the down switch 204b of the operation switch 204 or the right switch 204d of the operation switch 204 is operated, or whether or not the lens operation unit 35 is rotated rightward is determined, is executed ("Yes" at step S1412), the control unit 29 decrements the counter of the selected process item in the picture bracketing (i=i−1) (step S1413). After step S1413, the imaging apparatus 1 moves to step S1414.

At step S1412, the control unit 29 determines that the count-down operation is not executed ("No" at step S1412), the imaging apparatus 1 moves to step S1414.

The control unit 29 then determines whether or not a slide rec-view ending operation is executed (step S1414). Specifically, the control unit 29 determines whether or not the first release signal is input in response to halfway depressing of the release switch 202, whether or not an instruction signal of instructing an end of the slide rec-view is input in response to the operation of the menu switch 205, and whether or not a predetermined time (three seconds, for example) has elapsed after the last operation by the user. When the control unit 29 determines that the slide rec-view ending operation is executed ("Yes" at step S1414), the imaging apparatus 1 returns to the image process/rec-view display/still image recording process in FIG. 24. On this occasion, the control unit 29 records a content of the recording flag of the selection marker placement [m] in the SDRAM 25. On the other hand, when the control unit 29 determines that the slide rec-view ending operation is not executed ("No" at step S1414), the imaging apparatus 1 returns to step S1404.

According to the second modification of the fifth embodiment explained above, the user is able to execute a setting and a change regarding the picture bracketing easily while executing a shooting by the imaging apparatus 1.

Sixth Embodiment

Next, a sixth embodiment of the present invention will be explained. A sixth embodiment has a difference in the setting process according to the fifth embodiment explained above. Therefore, a setting process according to the sixth embodiment will be explained below. Here, the same part as that in the first embodiment explained above will be assigned with the same reference symbol in the explanation.

Figure 30:
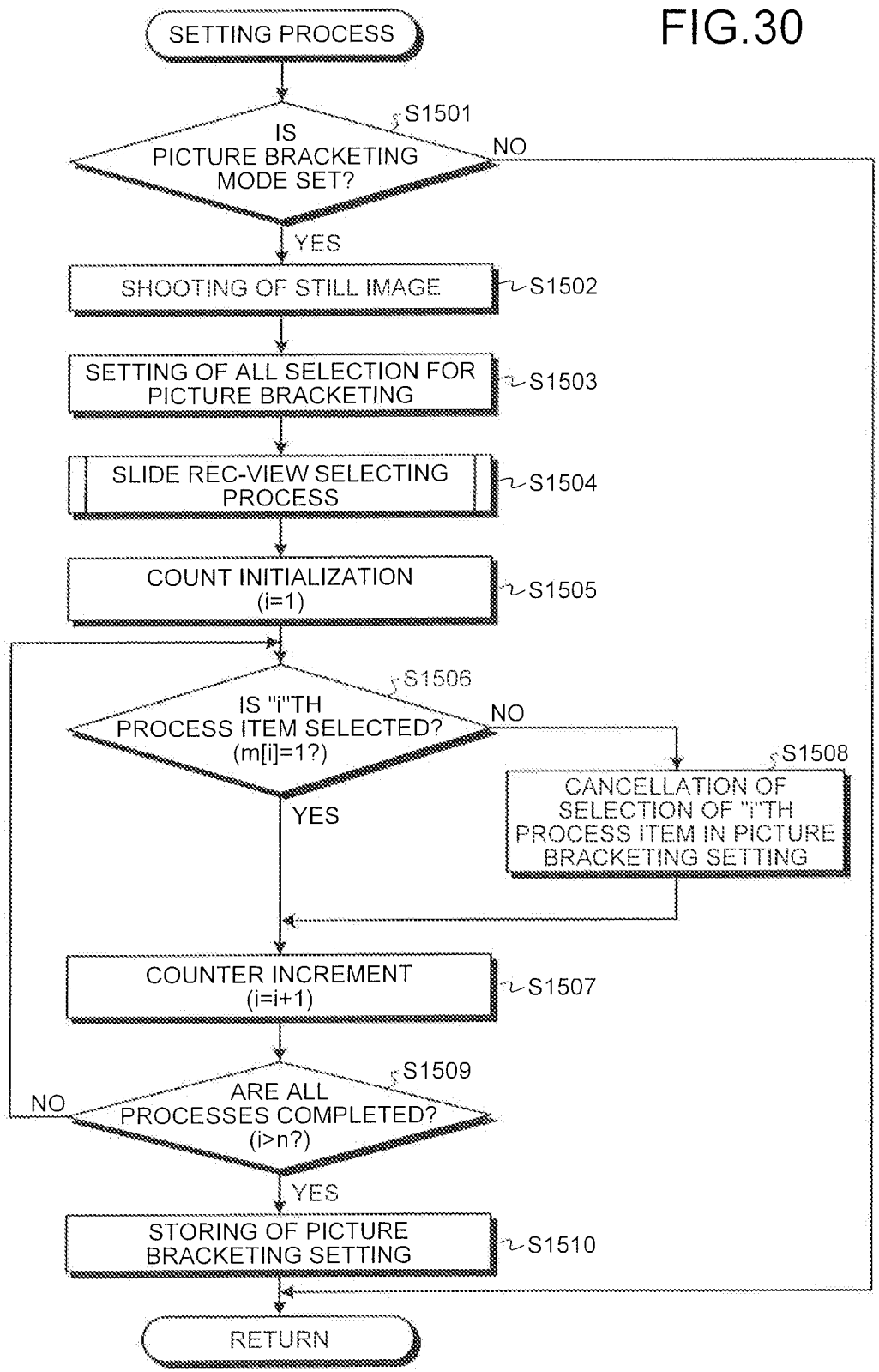
FIG. 30 is a flowchart of an outline of a setting process executed by an imaging apparatus according to a sixth embodiment of the present invention.

FIG. 30 is a flowchart of an outline of a setting process executed an imaging apparatus 1 according to the sixth embodiment, being a flowchart of an outline of a picture bracketing setting process. Specifically, this process is executed by the imaging apparatus 1 without displaying in the display unit 21 the picture bracketing mode selecting window W6 (see FIG. 5(c)) when the user operates and confirms the determination switch 204e of the operation switch 204 when the ON icon A51 is selected and highlighted in the display in the situation where the display unit 21 displays the picture bracketing setting window W5 (FIG. 5(b)).

As shown in FIG. 30, the control unit 29 determines whether or not the picture bracketing mode is set (step S1501). For example, the control unit 29 determines whether or not an instruction signal of setting the picture bracketing mode in the imaging apparatus 1 is input via the operation of the determination switch 204e of the operation switch 204 by the user when the ON icon A51 is selected and highlighted in the display in the situation where the display unit 21 displays the picture bracketing mode setting window W5 (see FIG. 5(b)). When the control unit 29 determines that the picture bracketing mode is set ("Yes" at step S1501), the imaging apparatus 1 moves to step S1502. On the other hand, when the control unit 29 determines that the picture bracketing mode is not set ("No" at step S1501), the imaging apparatus 1 returns to a state shown in FIG. 5(b).

The imaging apparatus 1 then executes a still image shooting (step S1502). In this case, image data (raw data) obtained via the shooting is recorded in the SDRAM 25.

After that, the control unit 29 sets all selection for the process items in the picture bracketing (step S1503).

The imaging apparatus 1 then executes the slide rec-view selecting process (see FIG. 26 or FIG. 29) of selecting a process item set in the picture bracketing (step S1504).

After that, the control unit 29 initializes a counter (i=1) of the process item in the picture bracketing selected in the slide rec-view selecting process (step S1505).

The control unit 29 then determines whether not a selection of recording as a still image ((m[i]=1?)) is made with respect to the "i"th process item (step S1506). When the control unit 29 determines that the selection of recording as a still image is made with respect to the "i"th process item ("Yes" at step S1506), the imaging apparatus 1 moves to step S1507.

The image process controller 292 then increments a counter (i=i+1) of the selected process item in the picture bracketing (step S1507). After that, the imaging apparatus 1 moves to step S1509.

When the control unit 29 determines that the selection of recording as a still image is not made with respect to the "i"th process item ("No" at step S1506), the imaging apparatus 1 moves to step S1508.

The image process controller 292 then cancels the selection of the "i"th process item in the picture bracketing setting (step S1508). For example, when the "FANTASTIC FOCUS" is not selected as a process item to be recorded as a still image in the slide rec-view selecting process in the situation where the "FANTASTIC FOCUS" is selected in the picture bracketing by the user, the image process controller 292 cancels the "FANTASTIC FOCUS" from process items in the picture bracketing. After step S1508, the imaging apparatus 1 moves to step S1507.

At step S1509, the control unit 29 determines whether or not all the processes for the selected process items in the picture bracketing have been completed (i>n?). When the control unit 29 determines that all the processes for the selected process items in the picture bracketing have been completed ("Yes" at step S1509), the imaging apparatus 1 moves to step S1510. On the other hand, when the control unit 29 determines that all the processes for the selected process items the picture bracketing have not been completed ("No" at step S1509), the imaging apparatus 1 returns to stop S1506.

At step S1510, the control unit 29 records the setting for the picture bracketing in the flash memory 26. This allows the setting for the picture bracketing to be reflected in a next start-up of the imaging apparatus 1, too. After step S1510, the imaging apparatus 1 returns to the state where the display unit 21 displays the picture bracketing mode setting window W5 shown in FIG. 5(b) and returns to the main routine in FIG. 24.

According to the sixth embodiment of the present invention explained so far, processed images corresponding to respective process items set in the picture bracketing mode are displayed before the user executes shooting. This configuration allows the user to intuitively grasp process items each to be recorded as a still image in the picture bracketing by using actual processed images and to easily determine the process item to record as a still image in the picture bracketing mode before executing a shooting.

Seventh Embodiment

Next, a seventh embodiment of the present invention will be explained. A seventh embodiment is different from the embodiments explained above in the image process/rec-view display/still image recording process. Therefore, an image process/rec-view display/still image recording process according to the seventh embodiment will be explained below. Here, the same part as that in the first embodiment explained above will be assigned with the same reference symbol in the explanation.

Figure 31:
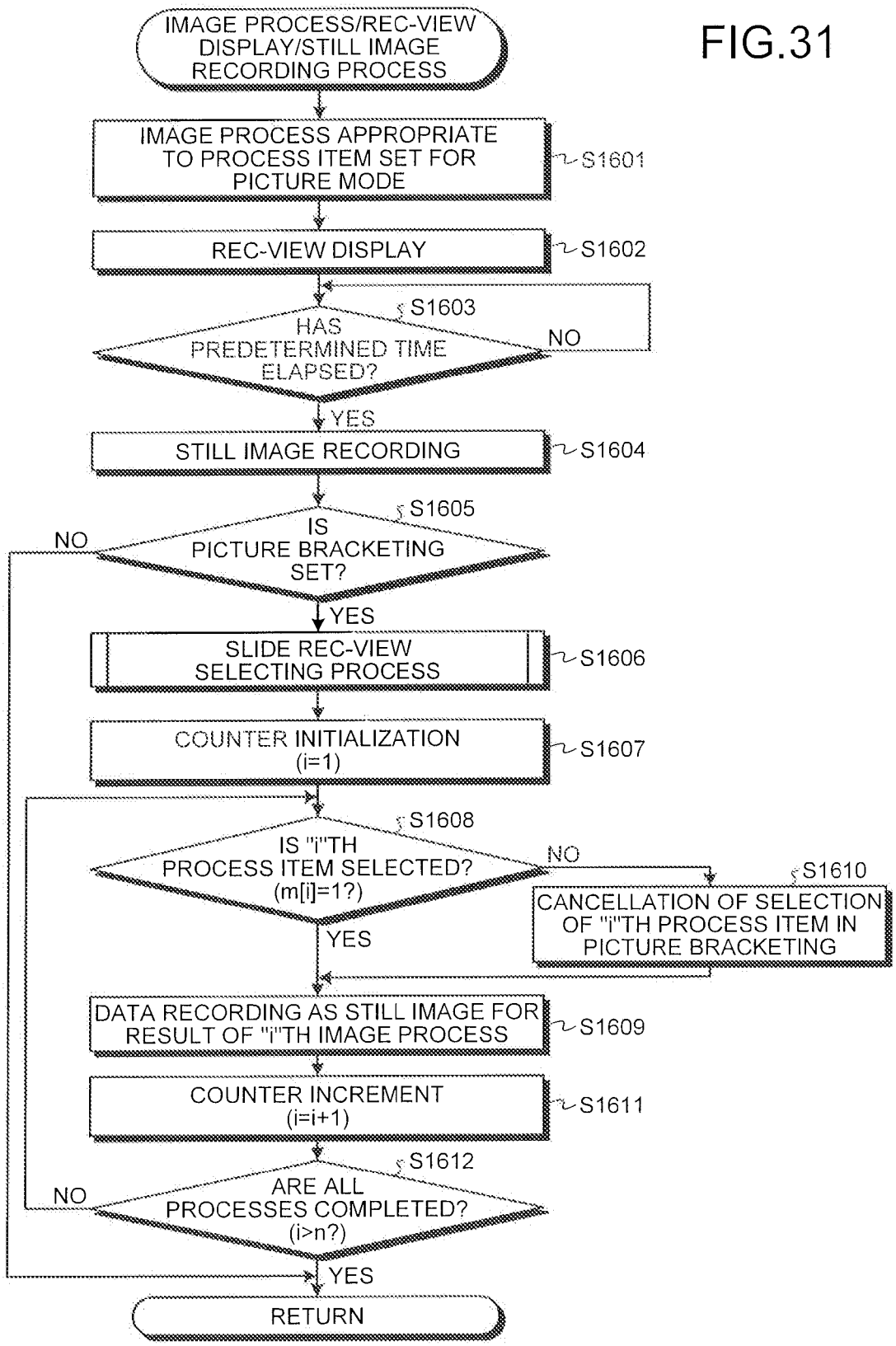
FIG. 31 is a flowchart of an outline of an image process/rec-view display/still image recording process executed by an imaging apparatus accord to a seventh embodiment of the present invention.

FIG. 31 is a flowchart of an outline of an image process/rec-view display/still image recording process (step S1114 in FIG. 24) executed by an imaging apparatus 1 according to the seventh embodiment.

In FIG. 31, steps S1601 to S1609 respectively correspond to steps S1201 to S1209 in FIG. 25.

At step S1610, the image process controller 292 cancels "i"th process item which is not selected in the setting for the picture bracketing. Specifically, the image process controller 292 cancels the "i"th process item in the picture bracketing selection from the setting for the picture bracketing to be recorded as a still image. In this case, the image process controller 292 records information of the cancellation in the flash memory 26. By this configuration, the imaging apparatus 1 will not execute the cancelled process item in a next shooting in the picture bracketing. After step S1610, the imaging apparatus 1 moves to step S1609.

Steps S1611 and S1612 respectively correspond to steps S1210 and S1211 in FIG. 25.

According to the seventh embodiment of the present invention explained so far, while recording all of the process items set in the picture bracketing mode each as a still image, a process item corresponding to the processed image hot selected in the rec-view display is cancelled from a next picture bracketing setting. This configuration allows the user to intuitively grasp process items to record as a still image in the picture bracketing by using actual processed images and only desired process items in the picture bracketing to be reflected in the next shooting.

While the image process controller 292 only cancels the not selected "i"th process item from the setting for the picture bracketing in the seventh embodiment, the processed image for the not selected process item may not be recorded besides in the storage medium 23.

Eighth Embodiment

Next, an eighth embodiment of the present invention will be explained. An eighth embodiment is different from the embodiments explained above in the image process/rec-view display/still image recording process. Therefore, an image process/rec view display still image recording process according to the eighth embodiment will be explained below. Here, the same part as that in the first embodiment explained above will be assigned with the same reference symbol in the explanation.

Figure 32:
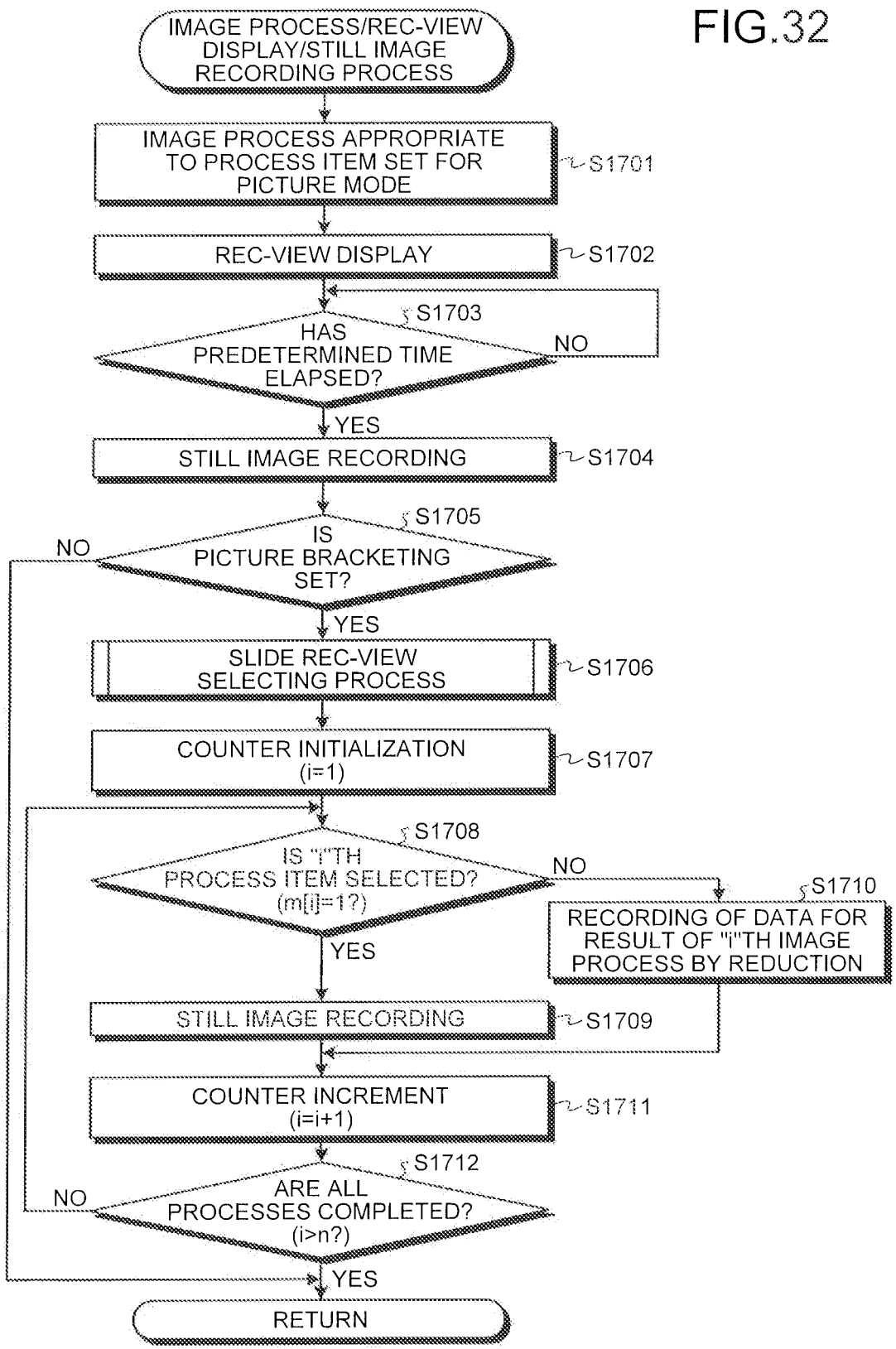
FIG. 32 is a flowchart of an outline of an image process/rec-view display/still image recording process executed by an imaging apparatus according to an eighth embodiment of the present invention.

FIG. 32 is a flowchart of an outline of an image process/rec-view display/still image recording process (step S1114 in FIG. 24) executed by an imaging apparatus 1 according to the eighth embodiment.

In FIG. 32, steps S1701 to S1709 respectively correspond to steps S1201 to S1209 in FIG. 25.

At step S1710, the image process controller 292 records, by controlling the image processor 16 to reduce, an amount of processed image data corresponding to a result of the not selected "i"th image process. Specifically, the image process controller 292 reduces the amount of data of the result of the "i"th image process and records it in the storage medium 23 by controlling the image processor 16 to execute a resizing process, into a VGA size, an SVGA size, and the like, for example, on the processed image data corresponding to the result of the "i"th image process which is not selected. Here, while the image process controller 292 reduces the size of the processed image data, the image process controller 292 may control the image processor 16 to execute a trimming of a main subject or a center part of an image, a high compression by changing a compression rate of a processed image, or the like to reduce the amount of data corresponding to the processed image.

Steps S1711 and S1712 respectively correspond to steps S1210 and S1211 in FIG. 25.

According to the eighth embodiment of the present invention explained so far, a process item which is not selected in the setting for the picture bracketing in the review display is reduced and recorded in the storage medium 23. Thus, it is possible to save a storage capacity of the storage medium 23.

Ninth Embodiment

Next, a ninth embodiment of the present invention will be explained. A ninth embodiment is different from the embodiments explained above in the image process/rec-view display/still image recording process. Therefore, an image process/rec-view display/still image recording process according to the ninth embodiment will be explained below. Here, the same part as that in the first embodiment explained above will be assigned with the same reference symbol in the explanation.

Figure 33:
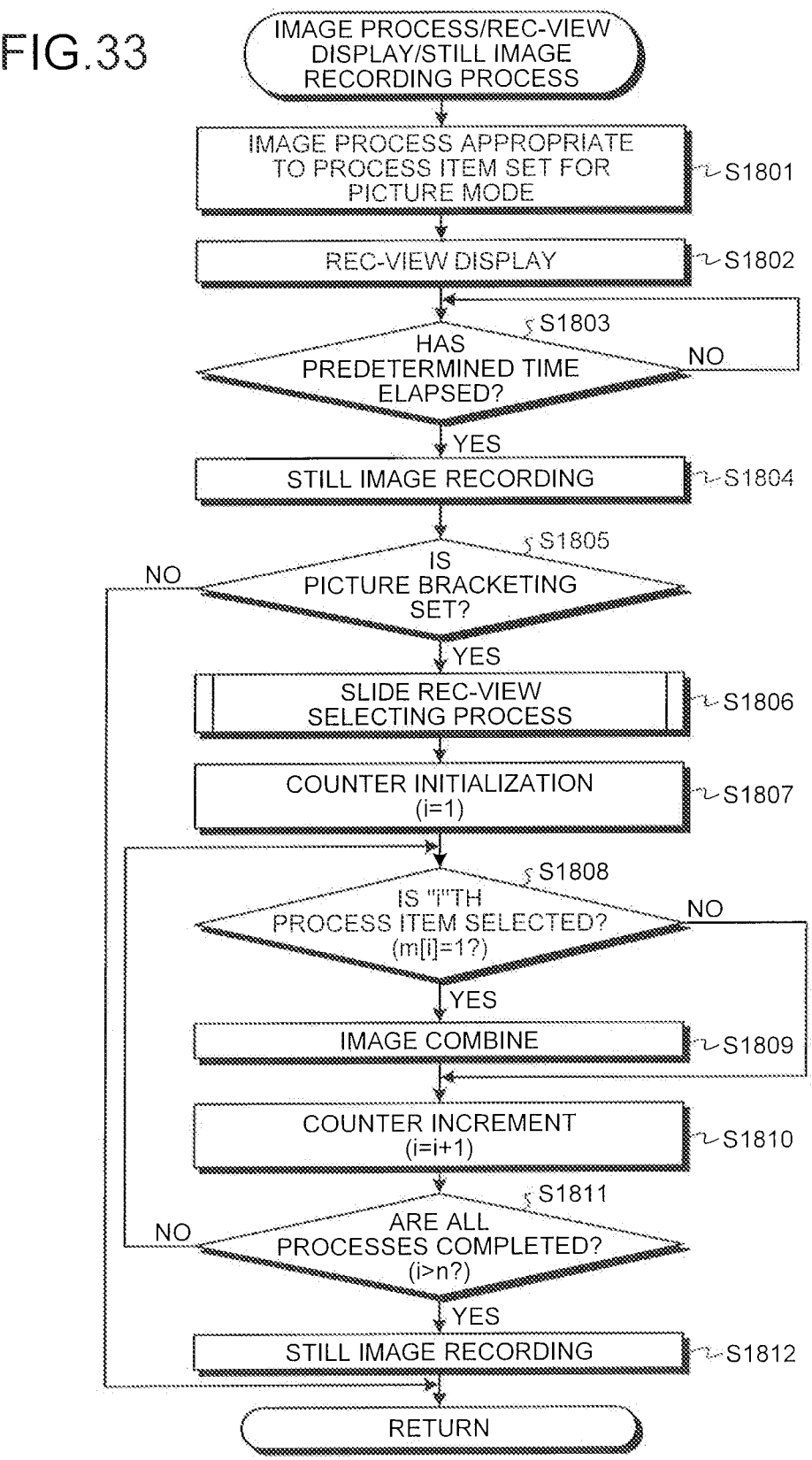
FIG. 33 is a flowchart of an outline of an image process/rec-view display/still image recording process executed by an imaging apparatus according to a ninth embodiment of the present invention.

FIG. 33 is a flowchart of an outline of an image process/rec-view display/still image recording process (step S1114 in FIG. 24) executed by an imaging apparatus 1 according to the ninth embodiment.

In FIG. 33, steps S1801 to step S1808 respectively correspond to steps S1201 to S1208 in FIG. 25.

At step S1809, the image process controller 292 controls, based on a positional signal indicating a touch position input from the touchscreen 208 in the rec-view display, the image processor 16 to execute an image composition in which a processed image in an area corresponding to the touch position is combined with a processed image corresponding to another process item.

Figure 34:
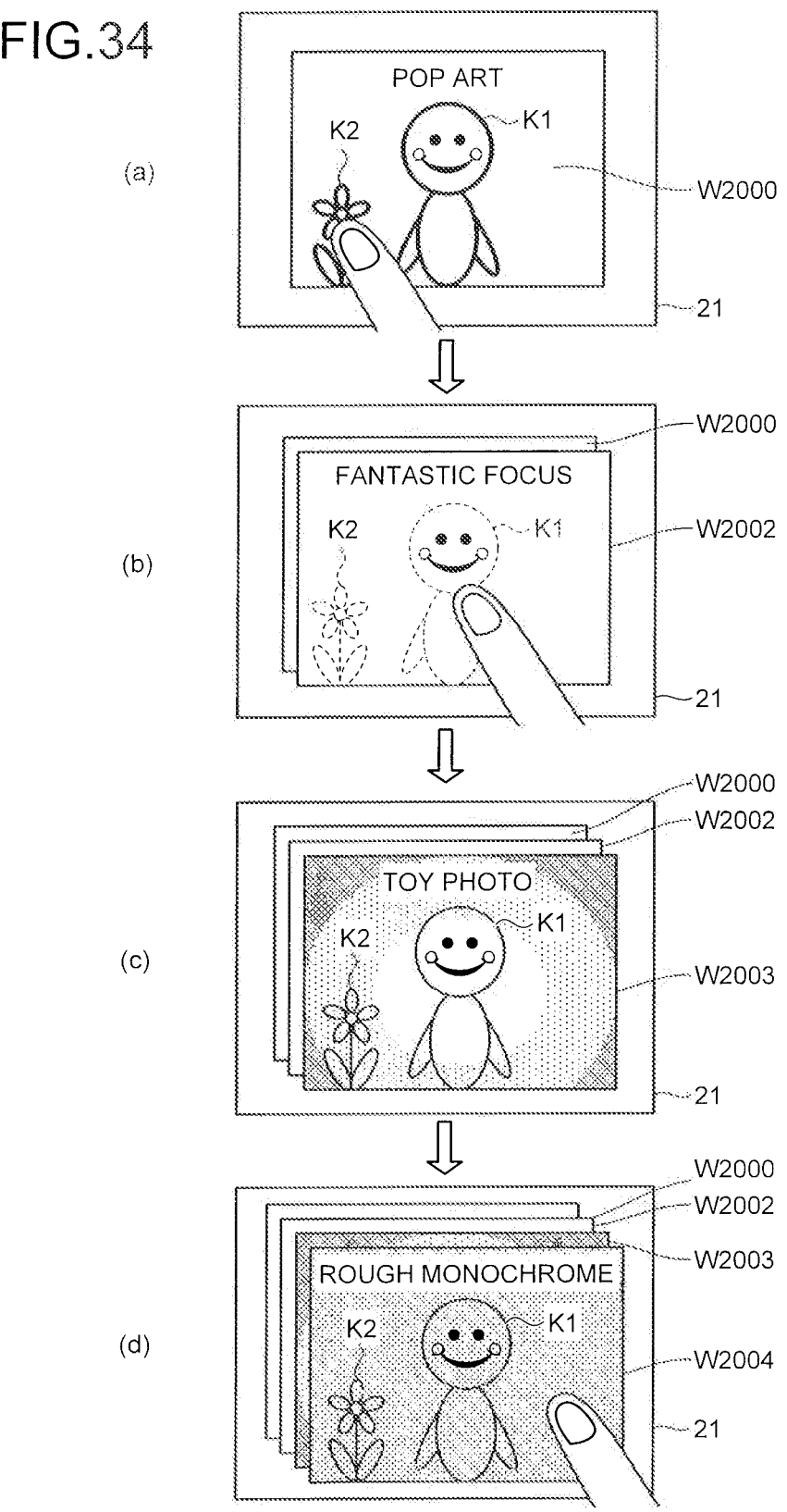
FIG. 34 shows an example of a composite image generated by an image processor of the imaging apparatus according to the ninth embodiment of the present invention by combining images in response to a positional signal input through a touchscreen.

FIG. 34 shows an ample of a composite image generated by the image processor 16 by combining images depending on a positional signal input through the touchscreen 208. In FIG. 34, a case where the number of process items set in picture bracketing is four will be explained.

As shown in FIG. 34, when the user touches a subject K2 via the touchscreen 208 in a situation where the display unit 21 displays a processed image W2000 (FIG. 34(a)), the image process controller 292 sets an area including a position corresponding to a positional signal input from the touchscreen 208 (an area of the subject K2, for example) as an area whose image composition is to be executed by the image processor 16 and sets a process item (POP ART) in the picture bracketing in the image processor 16.

When the user touches a subject K1 via the touchscreen 208 in a situation where the display unit 21 displays a processed image W2002 (FIG. 34(b)), the image process controller 292 then sets an area including a position corresponding to a positional signal input from the touchscreen 208 (an area of the subject K1, for example) as an area whose image composition is to be executed by the image processor 16 and sets, for this set area, a process item (FANTASTIC FOCUS) in the picture bracketing in the image processor 16.

After that, when no positional is input from the touchscreen 208 within a predetermined time in a situation where the display unit 21 displays a processed image W2003 (FIG. 34(c)), the image process controller 292 does not set an area whose image composition is not to be executed by the image processor 16 and shifts to a next image display.

When the user touches a background except for the subject K1 and the subject K2 via the touchscreen 208 in a situation where the display unit 21 displays a processed image W2004 (FIG. 34(d)), the image process controller 292 then sets a background area including a position corresponding to a positional signal input from the touchscreen 208 (except for the areas of the subject K1 and the subject K2, for example) as an area whose image composition is to be executed by the image processor 16 and sets, for this set area, a process item (ROUGH MONOCHROME) in the picture bracketing in the image processor 16.

Figure 35:
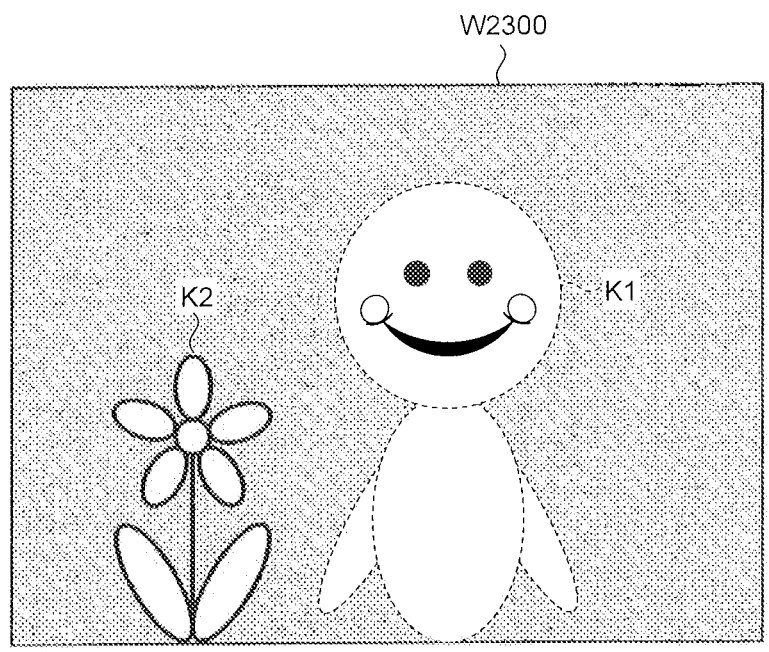
FIG. 35 shows an example of a composite image generated by the image processor of the imaging apparatus according to the ninth embodiment of the present invention.

In this manner, the image process controller 292 sets an area whose image composition is to be executed by the image processor 16 and a process item in response to a positional signal input from the touchscreen 208 in the situation where the display unit 21 executes the rec-view display of each of the processed images W2000 to W2004. By this setting, the image processor 16 generates a composite image W2300 in which the areas and process items selected in respective processed images W2000 to W2004 are combined as own in FIG. 35.

Returning to FIG. 33, an explanation from step S1810 will be continued. Steps S1810 and S1811 respectively correspond to steps S1210 and S1211 in FIG. 25.

The image process controller 292 then records the composite image W2300 generated by the image processor 16 as a still image in the storage medium 23 (step S1812). After that, the imaging apparatus 1 returns to the main routine in FIG. 24.

According to the ninth embodiment of the present invention explained so far, an area appropriate to a positional signal input from the touchscreen 208 in the rec-view display of each image is set as an area whose image composition is to be executed and a current process item in the picture bracketing is set in the image processor 16 for the set area. By this setting, it is possible to generate and records in the storage medium 23 one composite image in which respective special effects set in the picture bracketing are executed on respective areas that the user desires.

Besides, according to the ninth embodiment, it is possible to save a storage capacity of the storage medium 23 since one composite image is generated and recorded in the storage medium 23 by combining processed images corresponding to process items set in the picture bracketing.

Other Embodiments

In the embodiments explained so far, information of various types recorded in the program recorder, the special effect process information recorder, and the image process information recorder may be updated or rewritten by making a connection to an external processor such as a personal computer, a server, and the like via the Internet. This configuration enables the imaging apparatus to execute a shooting in combination with a newly added shooting mode, special effect processes, and finish effect processes.

Besides, the kinds of special effect processes are not limited to the contents explained above and it is possible to add, for example, art, ball, color mark, cube, mirror, mosaic, sepia, black-and-white, wave, ball frame, balloon, dramatic tone, gentle sepia, rock, oil painting, water color painting, sketch, and the like in the embodiments explained above.

Moreover, while one image processor is provided in the imaging apparatus in the embodiments explained above, the number of image processor is not limited and two image processors may be provided, for example.

Moreover, the image process setting unit 291 may cancel or change a special effect process set the image processor 16 in response to the operation of the shooting mode changing switch and the lens operation unit in the embodiments explained above.

Moreover, while the display of a live-view image displayed in the display unit is explained in the embodiments explained above, the present invention may be applied in an external electronic viewfinder which is detachable to the main body unit 2, for example.

Moreover, while the display of a live-view image displayed in the display unit is explained in the embodiments explained above, an electronic viewfinder may be provided separately form the display unit in the main body unit 2 and the present invention may be applied in the electronic viewfinder.

Moreover, while the lens unit is detachably attached to the main body unit in the embodiments explained above, the lens unit and the main body unit may be integrally formed.

Moreover, while the imaging apparatus is explained as a digital single-lens digital camera in the embodiments explained above, the present invention may be applied to electronic devices of various kinds provided with a shooting function such as a digital video camera, a camera-equipped mobile phone, and a personal computer.

Though expressions like "first", "after that", "then", and the like are used to show a context of processes among steps in the explanation for flowcharts in the description of the present invention, the sequence of processes necessary for carrying out the present invention will not be defined uniquely by those expressions. That is to say, the sequence of the processes in the flowcharts shown in the description of the present invention can be changed in a scope with consistency. In addition, the processes may be executed at the same time (in parallel).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An imaging apparatus, comprising:
   an imaging unit that captures an image of a subject and executes a photoelectric conversion to generate electronic image data;
   a display unit that displays an image corresponding to the image data;

an image processor that executes a special effect process of producing a visual effect on the image data in combination with a plurality of image processes to generate processed image data;

a release input unit that accepts an input of a release signal of instructing the imaging apparatus to execute shooting;

an image process controller that, when there are plural kinds of special effect processes to be executed by the image processor, controls the image processor to execute the plural kinds of special effect processes on one piece of the image data generated right after the acceptance of the input of the release signal and to generate plural pieces of processed image data; and a display controller that controls the display unit to display, for a predetermined time, one of an image corresponding to the one piece of the image data and at least one processed image corresponding to at least a part of the plural pieces of processed image data generated by the image processor;

wherein the display controller controls the display unit to display the plurality of pieces of processed image data by superimposing the plurality of pieces of processed image data on the image corresponding to the one piece of the image data and moving display positions of the plurality of pieces of processed image data on a display window of the display unit.

2. The imaging apparatus according to claim 1, further comprising:

an input unit that accepts an input of an instruction signal of instructing a special effect process to be executed by the image processor; and an image process setting unit that sets a special effect process to be executed by the image processor in response to the instruction signal input by the input unit.

3. The imaging apparatus according to claim 2, wherein the display controller controls the display unit to display the processed images in an order in which the image processor generates the plural pieces of image process data.

4. The imaging apparatus according to claim 3, wherein the display controller controls the display unit to display the processed images with shift from one image to another on a display window.

5. The imaging apparatus according to claim 4, wherein the display controller controls the display unit to superimpose and display information about a name of a process item of the processed image displayed in the display unit.

6. The imaging apparatus according to claim 5, further comprising:

an image process recorder that records image process information in which the plurality of special effect processes which can be executed by the image processor are associated with respective process times, wherein the image process controller refers to the image process information recorded by the image process recorder and controls the image processor to execute the plurality of special effect processes set by the image process setting unit in an order in which time lengths of respective processes are different alternately.

7. The imaging apparatus according to claim 5, further comprising:

an image process recorder that records image process information in which the plurality of special effect processes which can be executed by the image processor are associated with respective process times, wherein the image process controller refers to the image process information recorded by the image process recorder and controls the image processor to execute the special effect processes in an ascending order in process time length among the plurality of special effect processes set in the image processor by the image process setting unit.

8. The imaging apparatus according to claim 5, further comprising:

an image process recorder that records image process information in which the plurality of special effect processes which can be executed by the image processor are associated with visual information, wherein the image process controller refers to the image process information recorded by the image process recorder and controls the image processor to execute the plurality of special effect processes set by the image process setting unit in an order in which the visual information is different.

9. The imaging apparatus according to claim 8, wherein the visual information includes at least one of visual effect, intensity, contrast, and white balance.

10. The imaging apparatus according to claim 1, wherein the display controller controls the display unit to display reduced images obtained by reducing the processed images.

11. The imaging apparatus according to claim 10, wherein the display controller erases the reduced images displayed in the display unit after an elapse of a predetermined time.

12. The imaging apparatus according to claim 1, wherein the image processes to be executed in combination in the special effect process include at least one of feathering process, shading addition process, noise superimposition process, and image composition process.

13. The imaging apparatus according to claim 1, further comprising an input unit at accepts an input of an instruction signal of selecting any one of the processed images displayed in the display unit, wherein the image process controller executes a predetermined process on the selected processed image in response to the instruction signal input by the input unit.

14. The imaging apparatus according to claim 13, further comprising a recorder that records the image data and the processed image data, wherein the predetermined process is a recording process of recording processed image data corresponding to the selected processed image in the recorder.

15. The imaging apparatus according to claim 13, further comprising a recorder that records the image data and the processed image data, wherein the predetermined process is a recording process of reducing to be less than an amount of the image data and recording in the recorder an amount of processed image data corresponding to the selected processed image.

16. The imaging apparatus according to claim 13, wherein the predetermined process is a cancelling process of cancelling the special effect process executed on the selected processed image among the special effect processes set in the image processor by the image process setting unit.

17. The imaging apparatus according to claim 13, wherein the predetermined process is a composition process of combining the selected processed image with another image.

18. An imaging method executed by an imaging apparatus provided with an imaging unit that captures an image of a subject and executes a photoelectric conversion to generate electronic image data, and a display unit that displays an image corresponding to the image data, the imaging method comprising:

generating processed image data via a special effect process of producing a visual effect on the image data in combination with a plurality of image processes;

accepting an input of a release signal of instructing the imaging apparatus to execute shooting;

generating plural pieces of processed image data, when there are plural kinds of special effect processes, via the plural kinds of special effect processes on one piece of the image data generated right after the acceptance of the input of the release signal; and wherein the display unit displays the plurality of pieces of processed image data by superimposing the plurality of pieces of processed image data on the image corresponding to the one piece of the image data and moving display positions of the plurality of pieces of processed image data on a display window of the display unit.

19. A non-transitory computer-readable storage medium with an executable program stored thereon, wherein the program instructs a processor provided in an imaging apparatus including an imaging unit that captures an image of a subject and executes a photoelectric conversion to generate electronic image data, and a display unit that displays an image corresponding to the image data to execute:

generating processed image data via a special effect process of producing a visual effect on the image data in combination with a plurality of image processes;

accepting an input of a release signal of instructing the imaging apparatus to execute shooting;

generating plural pieces of processed image data, when there are plural kinds of special effect processes, via the plural kinds of special effect processes on one piece of the image data generated right after the acceptance of the input of the release signal; and controlling the display unit to display, for a predetermined time, one of an image corresponding to the one piece of the image data and at least one processed image corresponding to at least a part of the plural pieces of processed image data;

wherein the display unit displays the plurality of pieces of processed image data by superimposing the plurality of pieces of processed image data on the image corresponding to the one piece of the image data and moving display positions of the plurality of pieces of processed image data on a display window of the display unit.

20. An imaging apparatus, comprising:

an imaging unit that captures an image of a subject and executes a photoelectric conversion to generate electronic image data;

a display unit that displays an image corresponding to the image data;

an image processor that executes a special effect process of producing a visual effect on the image data in combination with a plurality of image processes to generate processed image data;

a release input unit that accepts an input of a release signal of instructing the imaging apparatus to execute shooting;

an image process controller that, when there are plural kinds of special effect processes to be executed by the image processor, controls the image processor to execute the plural kinds of special effect processes on one piece of the image data generated right after the acceptance of the input of the release signal and to generate plural pieces of processed image data; and a display controller that controls the display unit to display, for a predetermined time, one of an image corresponding to the one piece of the image data and at least one processed image corresponding to at least a part of the plural pieces of processed image data generated by the image processor;

wherein the display controller controls the display unit to simultaneously superimpose and shift display positions of the plurality of pieces of processed image data and the image corresponding to the one piece of the image data on a display window of the display unit.

* * * * *